(12) United States Patent
Yang et al.

(10) Patent No.: US 9,379,413 B2
(45) Date of Patent: Jun. 28, 2016

(54) ELECTROLYTE SOLVENT FOR CATHODE ACTIVE MATERIAL COMPOSED OF LITHIUM OXO ACID SALT, ELECTROLYTE SOLUTION FOR CATHODE ACTIVE MATERIAL COMPOSED OF LITHIUM OXO ACID SALT, AND LITHIUM ION SECONDARY BATTERY

(75) Inventors: Li Yang, Shanghai (CN); Shaohua Fang, Shanghai (CN)

(73) Assignee: SHOEI CHEMICAL INC., Tokyo (JP)

( * ) Notice: Subject to any disclaimer, the term of this patent is extended or adjusted under 35 U.S.C. 154(b) by 265 days.

(21) Appl. No.: 14/006,504

(22) PCT Filed: Mar. 23, 2012

(86) PCT No.: PCT/JP2012/057495
§ 371 (c)(1),
(2), (4) Date: Sep. 20, 2013

(87) PCT Pub. No.: WO2012/133174
PCT Pub. Date: Oct. 4, 2012

(65) Prior Publication Data
US 2014/0011099 A1  Jan. 9, 2014

(30) Foreign Application Priority Data
Mar. 25, 2011 (CN) .......................... 2011 1 0074386

(51) Int. Cl.
| H01M 10/056 | (2010.01) |
| H01M 10/0525 | (2010.01) |
| H01M 10/0568 | (2010.01) |
| H01M 10/0569 | (2010.01) |

(52) U.S. Cl.
CPC ........ *H01M 10/056* (2013.01); *H01M 10/0525* (2013.01); *H01M 10/0568* (2013.01); *H01M 10/0569* (2013.01); *Y02E 60/122* (2013.01)

(58) Field of Classification Search
CPC .......... H01M 10/056; H01M 10/0568; H01M 10/0569
See application file for complete search history.

(56) References Cited

U.S. PATENT DOCUMENTS

| 4,482,713 A | 11/1984 | Strickler |
| 6,291,763 B1 * | 9/2001 | Nakamura ................... 136/256 |
| 2007/0009801 A1 * | 1/2007 | Inagaki et al. ........... 429/231.95 |

FOREIGN PATENT DOCUMENTS

| CN | 1503778 | 6/2004 |
| CN | 1677740 | 10/2005 |
| CN | 101510622 | 8/2009 |
| CN | 101853959 | 10/2010 |
| JP | 58-10542 A | 1/1983 |
| JP | 04-349365 A | 12/1992 |
| JP | 11-207355 A | 8/1999 |
| JP | 2004-146346 A | 5/2004 |

(Continued)

OTHER PUBLICATIONS

Machine translation of TWI 359127 B.*

(Continued)

*Primary Examiner* — Jonathan Jelsma
(74) *Attorney, Agent, or Firm* — Lucas & Mercanti, LLP

(57) ABSTRACT

An electrolyte solvent for a cathode active material composed of lithium oxo acid salt. The solvent is used for a lithium ion secondary battery using the lithium oxo acid salt as a cathode material. The electrolyte solvent includes an ammonium ion which includes two or more alkoxyalkyl groups.

9 Claims, 48 Drawing Sheets

¹H NMR:

(56) References Cited

FOREIGN PATENT DOCUMENTS

| | | |
|---|---|---|
| JP | 2010-62573 A | 3/2010 |
| JP | 2011-142095 A | 7/2011 |
| TW | 200519068 | 3/2012 |
| WO | WO 02/076924 A1 | 10/2002 |
| WO | WO 2005/042466 A1 | 5/2005 |

OTHER PUBLICATIONS

International Search Report of PCT/JP2012/057495 dated Jun. 19, 2012.

Japanese IPRP and English translation thereof, International Application PCT/JP2012/057495. Date of issuance: Oct. 1, 2013.

* cited by examiner

1H NMR

ELECTROLYTE SOLVENT FOR CATHODE ACTIVE MATERIAL COMPOSED OF LITHIUM OXO ACID SALT, ELECTROLYTE SOLUTION FOR CATHODE ACTIVE MATERIAL COMPOSED OF LITHIUM OXO ACID SALT, AND LITHIUM ION SECONDARY BATTERY

CROSS REFERENCE TO RELATED APPLICATION

This application is a 371 of PCT/JP2012/057495 filed on Mar. 23, 2012, which claims the priority of Chinese Patent Application No. 201110074386.7 filed on Mar. 25, 2011, both applications are incorporated herein by reference in their entirety.

TECHNICAL FIELD

The present invention relates to an electrolyte solvent for a cathode active material composed of lithium oxo acid salt and an electrolyte solution for a cathode active material composed of lithium oxo acid salt, which can be used for a lithium ion secondary battery using lithium oxo acid salt as a cathode active material, and a lithium ion secondary battery.

BACKGROUND ART

An ionic liquid (also called as an ion liquid) is a salt composed of a cation and anion, which liquid is a compound having a melting point approximately equal to or lower than an ambient temperature, and has variety of characteristics such as flame resistance, non-volatility, high thermal stability, and so on. As an example of such ionic liquid, there has been known a quaternary ammonium salt disclosed in Patent Literature 1. The quaternary ammonium salt includes one(1) to four alkoxyalkyl groups as substituent groups thereof, and it is described that such ionic liquid is used as an antibiotic, a cation active cleaning agent, an emulsifying agent for protection and corrosion prevention of architectural structures and for refining of ores, or dyeing auxiliary.

In addition, since the ionic liquid has good flame resistance and thermal stability, it can be used also as an electrolyte solvent of an electrochemical device, for example, as an electrolyte solvent for a lithium ion secondary battery. Thus, by using the ionic liquid as the electrolyte solvent, improvement of electrochemical stability, namely, improvement of stability as a battery can be expected.

As examples of actually using the ionic liquid as the electrolyte solvent, there have been known Patent Literatures 2 to 4, which are relevant to ionic liquids of quaternary ammonium salts.

In this regard, however, though the claims of Patent Literature 2 describe including a quaternary ammonium salt in which one(1) to four substituent groups thereof are alkoxyalkyl groups, there are only examples, obtained by conducting actual experiments, where the quaternary ammonium salt includes only one(1) alkoxyalkyl group as substituent group thereof. Thus, the cases that two or more substituent groups are alkoxyalkyl groups have not been confirmed. Additionally, an example of a cathode active material for the lithium ion secondary battery, which has been confirmed in the examples, is only lithium cobalt oxide. Although lithium cobalt oxide is widely used as the cathode active material for the lithium ion secondary battery, it is expensive because cobalt is a rare metal. Moreover, there is a problem that lithium cobalt oxide has poor thermal stability and is likely to degrade and release oxygen when temperature becomes high. For these reasons, there have been needs for the cathode active material which is inexpensive and has good thermal stability.

Recently, as the cathode active material which meets the above needs in stead of lithium cobalt oxide, lithium oxo acid salt (oxo acid salts of lithium) such as lithium iron phosphate and lithium iron silicate has attracted attention. Lithium oxo acid salt is composed of relatively inexpensive elements, and has good thermal stability. Accordingly, lithium oxo acid salt is expected to be used as the cathode active material for the secondary battery, as the material which is inexpensive, has high level of safety, and can obtain high capacity depending on the composition thereof.

PRIOR ART LITERATURES

Patent Literatures

Patent Literature 1: Japanese Patent Laid-Open Publication No. S58-10542
Patent Literature 2: WO 02/076924 A1
Patent Literature 3: Japanese Patent Laid-Open Publication No. H4-349365
Patent Literature 4: Japanese Patent Laid-Open Publication No. H11-207355

SUMMARY OF INVENTION

Problem to be Solved by Invention

As described above, though Patent Literatures 2 describes utilizing the ionic liquid as the electrolyte solution for the lithium ion secondary battery, the cathode active material for the lithium ion secondary battery mentioned in Patent Literatures 2 is only lithium cobalt oxide, and there is no description or suggestion about what kind of ionic liquid is preferably used in the case that lithium oxo acid salt is used as the cathode active material.

Incidentally, Patent Literature 3 includes no description about using alkoxyalkyl groups as substituent groups, and Patent Literature 4 merely describes the case that only one(1) substituent group is an alkoxyalkyl group.

Thus, an electrolyte solvent (ionic liquid) suitable for the case that lithium oxo acid salt is used as the cathode active material has not been found.

The present invention is made in view of the above circumstances, and an object of the present invention is to provide an electrolyte solvent for the cathode active material composed of lithium oxo acid salt, and an electrolyte solution for the cathode active material composed of lithium oxo acid salt, which can be used for the lithium ion secondary battery including lithium oxo acid salt as the cathode active material, lithium oxo acid salt providing excellent coulombic efficiency and discharge capacity, and to provide a lithium ion secondary battery using the above electrolyte solvent/solution.

Means for Solving the Problems

According to the invention of claim 1, there is provided an electrolyte solvent for a cathode active material composed of lithium oxo acid salt, which solvent is used for a lithium ion secondary battery using lithium oxo acid salt as the cathode active material, the electrolyte solvent including: an ammonium ion which includes two or more alkoxyalkyl groups as substituent groups.

According to the invention of claim 2, there is provided the electrolyte solvent for the cathode active material composed of lithium oxo acid salt according to claim 1, wherein the ammonium ion is represented by the following general formula (1).

[Formula 1]

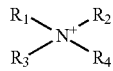

(1)

(wherein: substituent group $R_1$ represents an alkyl group including one or more and five or less carbons, or an alkoxyalkyl group including two or more and four or less carbons; substituent group $R_2$ represents an alkyl group including one or more and five or less carbons, or an alkoxyalkyl group including two or more and four or less carbons; substituent group $R_3$ represents an alkoxyalkyl group including two or more and four or less carbons; and substituent group $R_4$ is an alkoxyalkyl group including two or more and four or less carbons.)

According to the invention of claim 3, there is provided the electrolyte solvent for the cathode active material composed of lithium oxo acid salt according to claim 1, wherein the ammonium ion is represented by the following general formula (2).

[Formula 2]

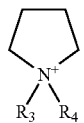

(2)

(wherein: substituent group $R_3$ represents an alkoxyalkyl group including two or more and four or less carbons; and substituent group $R_4$ represents an alkoxyalkyl group including two or more and four or less carbons.)

According to the invention of claim 4, there is provided the electrolyte solvent for the cathode active material composed of lithium oxo acid salt according to claim 1, wherein the ammonium ion is represented by the following general formula (3).

[Formula 3]

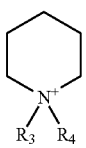

(3)

(wherein: substituent group $R_3$ represents an alkoxyalkyl group including two or more and four or less carbons; and substituent group $R_4$ represents an alkoxyalkyl group including two or more and four or less carbons.)

According to the invention of claim 5, there is provided the electrolyte solvent for the cathode active material composed of lithium oxo acid salt according to claim 1, wherein the ammonium ion is represented by the following general formula (4).

[Formula 4]

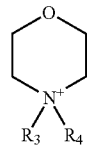

(4)

(wherein: substituent group $R_3$ represents an alkoxyalkyl group including two or more and four or less carbons; and substituent group $R_4$ represents an alkoxyalkyl group including two or more and four or less carbons.)

According to the invention of claim 6, there is provided the electrolyte solvent for the cathode active material composed of lithium oxo acid salt according to claim 2, wherein substituent group $R_2$ is an alkoxyalkyl group including three or four carbons.

According to the invention of claim 7, there is provided the electrolyte solvent for the cathode active material composed of lithium oxo acid salt according to claim 6, wherein substituent group $R_1$ is a methoxyethyl group, a methoxypropyl group, an ethoxyethyl group, or an alkyl group including two or more and five or less carbons, substituent group $R_2$ is a methoxyethyl group or an ethoxyethyl group, and each of substituent groups $R_3$ and $R_4$ is a methoxyethyl group.

According to the invention of claim 8, there is provided the electrolyte solvent for the cathode active material composed of lithium oxo acid salt according to any one of claims 2 to 5, wherein substituent group $R_1$ is a methyl group or an ethyl group, substituent group $R_2$ is an ethyl group or a butyl group, substituent group $R_3$ is a methoxyethyl group, and substituent group $R_4$ is a methoxyethyl group or an ethoxyethyl group.

According to the invention of claim 9, there is provided the electrolyte solvent for the cathode active material composed of lithium oxo acid salt according to any one of claims 1 to 8, wherein the alkoxyalkyl group includes a terminal alkyl group which contains one or two carbons, and an alkyl group which contains two carbons and is combined with N.

According to the invention of claim 10, there is provided an electrolyte solution for a cathode active material composed of lithium oxo acid salt, the electrolyte solution including: the electrolyte solvent according to any one of claims 1 to 9; and a lithium salt.

According to the invention of claim 11, there is provided a lithium ion secondary battery including: a cathode material; an anode material; a separator; and an electrolyte solution, wherein the cathode material includes lithium oxo acid salt, and the electrolyte solution includes the electrolyte solvent according to any one of claim 1 to 9 or the electrolyte solution according to claim 10.

EFFECT OF INVENTION

According to the present invention, the lithium ion secondary battery which includes lithium oxo acid salt as the cathode active material and has high coulombic efficiency can be obtained. Moreover, the discharge capacity of the cathode active material composed of lithium oxo acid salt can be made high and become stable. Furthermore, the stability of the lithium ion secondary battery becomes remarkably high, and the stability is improved.

MODES FOR CARRYING OUT THE INVENTION

Figure 1:
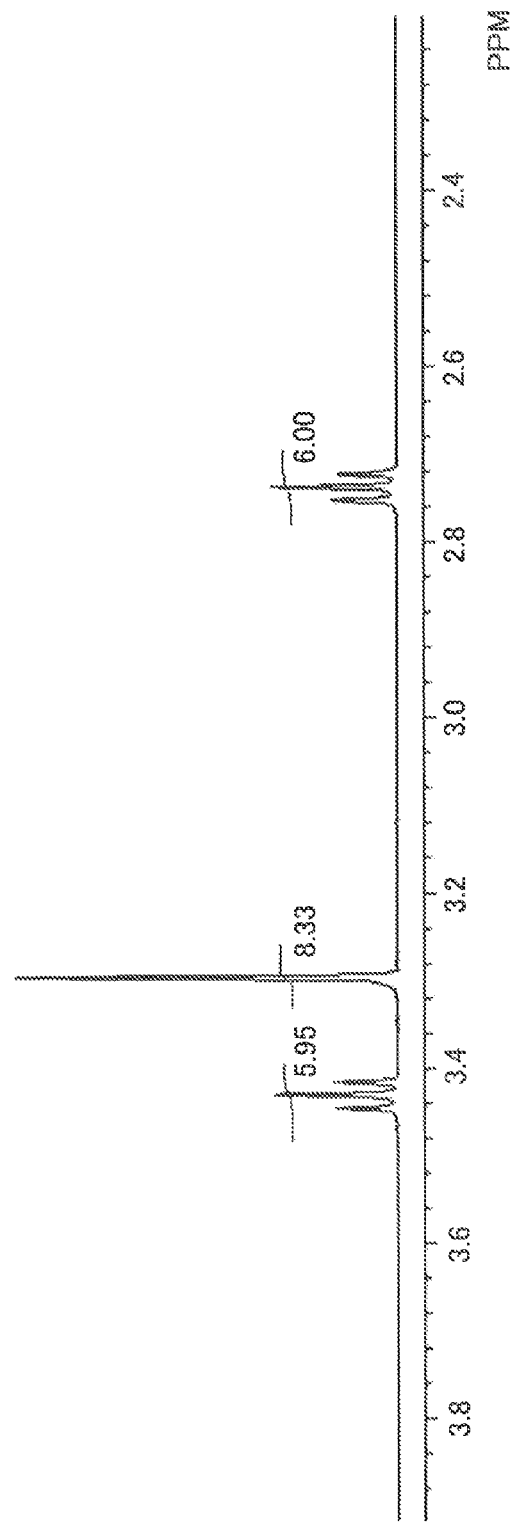
FIG. 1 is a chart illustrating $^1$H-NMR spectrum of raw material amine of Example 2.

The inventors of this application have considered utilization of an ionic liquid including quaternary ammonium ions as an electrolyte solvent, in a lithium ion secondary battery using lithium oxo acid salt as a cathode active material. As a result, it has been found that all ionic liquids including quaternary ammonium ions are not preferable as the electrolyte solvent, and specific quaternary ammonium ions are compatible with the cathode active material composed of lithium oxo acid salt. Specifically, it has been found that coulombic efficiency of the cathode active material composed of lithium oxo acid salt is increased when each quaternary ammonium ion includes two or more alkoxyalkyl groups.

In the case that quaternary ammonium ion includes two or more alkoxyalkyl groups, lithium ions being detached from the cathode active material composed of lithium oxo acid salt due to electrical charge are easily inserted thereinto at the time of electrical discharge. It is presumed that the reasons are that the ionic liquid which contains ammonium ions each including two or more alkoxyalkyl groups can efficiently make contact with lithium oxo acid salt, that lithium salt which is of electrolyte can be easily absorbed onto lithium oxo acid salt, and so on.

Incidentally, the reason why lithium salt can be easily absorbed onto lithium oxo acid salt is considered as described below. Since anions of oxo acid salts are exposed from the surfaces of lithium oxo acid salt, cations are more easily absorbed thereonto in comparison with the case of a surface of a conventional oxide-system cathode active material. Meanwhile, since quaternary ammonium ions are cations, wettability of the ionic liquid including quaternary ammonium ions with respect to the surfaces of lithium oxo acid salt is relatively high in comparison with the case of the surface of the oxide-system cathode active material. However, such ionic liquid is absorbed onto the surfaces of lithium oxo acid salt and prevents the same from absorbing lithium salt, which is of electrolytes. In view of this, by making quaternary ammonium ion include alkoxyalkyl groups, cationic property of quaternary ammonium ion is weaken due to electron-withdrawing of alkoxyalkyl groups, and thereby the absorption force onto the surfaces of lithium oxo acid salt can be reduced. It can be said that when quaternary ammonium ion includes two or more alkoxyalkyl groups, absorption of lithium salt is not prevented while the wettability to lithium oxo acid salt is ensured. Thus, when using the ionic liquid of the present invention as the solvent, interchange reaction of lithium ions in an interface between lithium oxo acid salt and the electrolytes can reversibly occur with ease.

Hereinafter, the electrolyte solvent of the present invention will be described.

The electrolyte solvent (hereinafter simply referred to as the electrolyte solvent) for the cathode active material composed of lithium oxo acid salt according to the present invention is used for a lithium ion secondary battery which uses lithium oxo acid salt as the cathode active material.

The electrolyte solvent of the present invention is an ionic liquid which has ammonium ions each including two or more alkoxyalkyl groups as substituent groups.

Among ammonium ions, the ammonium ion represented by the following general expression (1) is preferable.

[Formula 5]

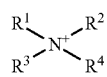
(1)

(wherein: substituent group $R_1$ represents an alkyl group including one or more and five or less carbons, or an alkoxyalkyl group including two or more and four or less carbons; substituent group $R_2$ represents an alkyl group including one or more and five or less carbons, or an alkoxyalkyl group including two or more and four or less carbons; substituent group $R_3$ represents an alkoxyalkyl group including two or more and four or less carbons; and substituent group $R_4$ is an alkoxyalkyl group including two or more and four or less carbons.)

Preferably, in the above general expression (1), substituent group $R_2$ is an alkoxyalkyl group including three or four carbons.

More preferably, in the above general expression (1), substituent group $R_1$ is a methoxyethyl group, a methoxypropyl group, an ethoxyethyl group, or an alkyl group including two or more and five or less carbons; substituent group $R_2$ is a methoxyethyl group or an ethoxyethyl group; and substituent groups $R_3$ and $R_4$ are methoxyethyl groups.

Among ammonium ions each including two or more alkoxyalkyl groups as substituent groups, the ammonium ion represented by the following general expression (2) is preferable because relatively high discharge capacity can be stably obtained.

[Formula 6]

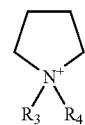
(2)

(wherein: substituent group $R_3$ represents an alkoxyalkyl group including two or more and four or less carbons; and substituent group $R_4$ represents an alkoxyalkyl group including two or more and four or less carbons.)

Among ammonium ions each including two or more alkoxyalkyl groups as substituent groups, the ammonium ion represented by the following general expression (3) is preferable because relatively high discharge capacity can be stably obtained.

[Formula 7]

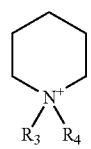
(3)

(wherein: substituent group $R_3$ represents an alkoxyalkyl group including two or more and four or less carbons; and substituent group $R_4$ represents an alkoxyalkyl group including two or more and four or less carbons.)

Among ammonium ions each including two or more alkoxyalkyl groups as substituent groups, the ammonium ion represented by the following general expression (4) is preferable because relatively high discharge capacity can be stably obtained.

[Formula 8]

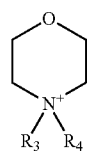
(4)

(wherein: substituent group $R_3$ represents an alkoxyalkyl group including two or more and four or less carbons; and substituent group $R_4$ represents an alkoxyalkyl group including two or more and four or less carbons.)

Among ammonium ions each including two or more alkoxyalkyl groups as substituent groups, the ammonium ion represented by the following general expression (5) is preferable because relatively high discharge capacity can be stably obtained.

[Formula 9]

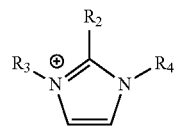

(5)

(wherein: substituent group $R_2$ represents an alkyl group including one or more and five or less carbons, or an alkoxyalkyl group including two or more and four or less carbons; substituent group $R_3$ represents an alkoxyalkyl group including two or more and four or less carbons; and substituent group $R_4$ represents an alkoxyalkyl group including two or more and four or less carbons.)

Preferably, in the general expressions (1) to (5), substituent group $R_1$ is a methyl group or an ethyl group; substituent group $R_2$ is an ethyl group or a butyl group; substituent group $R_3$ is a methoxyethyl group; and substituent group $R_4$ is a methoxyethyl group or an ethoxyethyl group.

Incidentally, preferably, in the general expressions (1) to (5), alkoxyalkyl group includes a terminal alkyl group which contains one or two carbons, and an alkyl group which contains one or two carbons and is combined with N.

A counter ion of quaternary ammonium ion of the present invention is an anion. For example, there can be adopted bis(trifluoromethylsulfonyl)imide (TFSI), bis(fluorosulfonyl)imide (FSI-), tetrafluoroborate, hexafluorophosphate, tris(trifluoromethylsulfonyl)methide (FSM), and so on.

As the cathode active material composed of lithium oxo acid salt of the present invention, for example, there can be adopted $LiMPO_4$ and derivatives obtained by the elemental substitution and the composition change of lithium metal phosphate which is of a basic structure; $Li_2MSiO_4$ and derivatives obtained by the elemental substitution and the composition change of lithium metal silicate which is of a basic structure; and $LiMBO_3$ and derivatives obtained by the elemental substitution and the composition change of lithium metal borate which is of a basic structure. Here, M mainly includes a transition metal element such as Fe, Mn, Ni and Co, in each of which a valence is changed.

Next, a method for producing the electrolyte solvent (ionic liquid) will be described.

The method for producing the electrolyte solvent of the present invention generally causes alkylamines react with alkoxyalkyl halides in an autoclave or under reflux to parepare quaternary ammonium halide salts. Through ion exchange between halides of ammonium halide salts and counter ions which are to be the ionic liquid, the electrolyte solvent (ionic liquid) of the present invention can be obtained.

Next, the electrolyte solution for the lithium ion secondary battery of the present invention will be described.

The electrolyte solution of the present invention includes the above-described electrolyte solvent and lithium salt (supporting electrolyte). In other words, the electrolyte solution is obtained by dissolving lithium salt in the electrolyte solvent, and indicates ion conductivity when lithium salt is ionized.

As lithium salt, for example, there can be adopted: fluoro sulfonic acid represented by $LiClO_4$, $LiBF_4$, $LiPF_6$, $LiCF_3CO_2$, $LiAsF_6$, $LiSbF_6$, $LiB_{10}Cl_{10}$, or $LiOSO_2C_nF_{2n+1}$ (n is positive integer of 6 or less); imide salt represented by $LiN(SO_2CnF_{2n+1})(SO_2C_mF_{2m+1})$ (each of m and n is positive integer of 6 or less); methide salt represented by $LiC(SO_2C_pF_{2p+1})(SO_2C_qF_{2q+1})(SO_2C_rF_{2r+1})$ (each of p, q, and r is positive integer of 6 or less); and Li salts including lower aliphatic carboxylic acid lithium, $LiAlCl_4$, LiCl, LiBr, LiI, chloroborane lithium, and lithium tetraphenylborate, and one type or two or more types of these lithium salts can be mixed to be used. Especially, the electrolyte solution in which $LiBF_4$, $LiPF_6$, and $LiN(SO_2CF_3)(SO_2CF_3)$ are dissolved is preferable.

Next, the lithium ion secondary battery of the present invention will be described.

In the lithium ion secondary battery of the present invention, though not illustrated, a cathode and an anode are separated from each other by a separator. The electrolyte solution of the present invention fills up a battery chamber surrounded by a cathode current collector of the cathode and an anode current collector of the anode. External circuits are connected to the cathode and the anode when they are used as the secondary battery.

The cathode is generally produced by applying paste, which is obtained by creating a slurry from a cathode active material, a conductive additive, and a binding agent, with a dispersion medium, to the cathode current collector by a coater, and then making the dispersion medium vaporize.

The conductive additive is not particularly limited as long as it is a substantially chemically-stable electrically conductive material. For example, there can be adopted carbon materials including: graphite such as natural graphite (flake graphite, etc.) and artificial graphite; acetylene black; ketjen black; carbon blacks such as channel black, furnace black, lamp black, and thermal black; carbon fibers; and the like, as well as conductive fibers such as metal fibers; fluorocarbons; powders of metal such as aluminum; zinc oxides; conductive whiskers such as potassium titanate; conducive metal oxides such as titanium oxide; organic conductive materials such as a polyphenylene derivative; and the like. Each of these can be used singly, or two or more types thereof can be used simultaneously. Among them, the carbon materials such as acetylene black, ketjen black and carbon black are particularly preferable.

The binding agent (also referred to as a bonding agent or binder) has a role in making the active material, the conductive additive, and the like bonded to one another. The binding agent of the present invention is the one generally used when producing the cathode of the lithium ion secondary battery. The binding agent which is chemically and electrochemically stable with respect to the electrolyte and its solvent of the lithium ion secondary battery is preferable. The binding agent can be either thermoplastic resin or thermosetting resin. For example, there can be adopted: polyolefin such as polyethylene and polypropylene; fluorine resin such as polytetrafluoroethylene (PTFE), polyvinylidene fluoride (PVDF), a tetrafluoroethylene-hexafluoroethylene copolymer, a tetrafluoroethylene-hexafluoropropylene copolymer (FEP), a tetrafluoroethylene-perfluoroalkylvinylether copolymer (PFA), a vinylidene fluoride-hexafluoropropylene copolymer, a vinylidene fluoride-chlorotrifluoroethylene copolymer, an ethylene-tetrafluoroethylene copolymer (ETFE resin), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, and a vinylidene fluoride-perfluoromethyl vinyl ether-tetrafluoroethylene copolymer; styrene-butadiene rubber (SBR); an ethylene-acrylic acid copolymer or a $Na^+$ ion-crosslinked body of the copolymer concerned; an ethylene-methacrylic acid copolymer or a $Na^+$ ion-crosslinked body of the copolymer concerned; an ethylene-methyl acrylate copolymer or a $Na^+$ ion-crosslinked body of the copolymer concerned; an ethylene-methyl methacrylate copolymer or a Na$^+$ ion-crosslinked body of the copolymer concerned; carboxymethylcellulose; and the like. Moreover, these can also be used in combination of one another. Among these materials, PVDF and PTFE are particularly preferable.

The cathode current collector is conductive metal foil. For example, there can be adopted foil of aluminum or aluminum alloy, or foil of copper, nickel, or stainless steel (SUS).

The anode is the one in which the binding agent (also referred to as a bonding agent or binder) is contained in an anode active material according to needs. The anode active material of the anode just needs to be capable of doping/de-doping metal lithium or Li ions. As the one capable of doping/de-doping the Li ions, for example, there can be adopted carbon materials such as graphite, pyrolytic carbons, cokes, glassy carbons, sintered bodies of organic polymer compounds, meso-carbon microbeads, carbon fibers, and activated carbons. Moreover, as the anode active material, there can also be used compounds including: alloys of Si, Sn, In, or the like; oxides of Si, Sn, Ti, or the like, by which electrical charge/discharge can be performed at a low potential approximate to that of the case of Li; and nitrides of Li and Co, such as $Li_{2.6}Co_{0.4}N$. It is also possible to substitute a part of graphite with metal, oxide or the like, which can form an alloy with Li. In the case of using graphite as the anode active material, a voltage at the time of full charge can be regarded as approximately 0.1 volt with lithium taken as a reference, and accordingly, for the sake of convenience, a potential of the cathode can be calculated by a voltage obtained by adding 0.1 volt to a battery voltage. It therefore becomes easy to control a charge potential of the cathode.

As the anode material which can absorb lithium and from which lithium can be separated, there can be adopted carbonaceous materials, metal compounds, stannum, tin alloy, silicon, silicon base alloy, and conductive polymers, and one type or two or more types of these materials are mixed to be used. In the case of using lithium oxo acid salt as the cathode active material, the carbonaceous materials are preferably used as the anode material. The carbonaceous materials are not particularly limited, and generally the one obtained by burning an organic substance is used. Also natural or artificial graphite can be used. In the case that the electrical conductivity of the carbonaceous materials is insufficient for current collection, it is also preferable to add a conducting agent.

As the metal compounds, there can be adopted oxides such as lithium titanium composite oxide ($Li_4Ti_5O_{12}$) having a spinel structure, tungsten oxide ($WO_2$), niobium oxide ($Nb_2O_5$), and tin oxide (SnO), and as the conductive polymer, there can be adopted polyacetylene and polypyrrole.

Such anode is disposed so as to be in contact with the anode current collector. As the anode current collector, metal foils can be used, and for example, there can be adopted foil of a simple substance of copper, nickel, or titanium, or an alloy of these, or stainless steel. As one of preferable materials of the anode current collector for use in the present invention, copper or an alloy thereof is adopted. As preferable metal which forms an alloy with copper, there are Zn, Ni, Sn, Al and the like; and besides, a small amount of Fe, P, Pb, Mn, Ti, Cr, Si, As or the like can be added.

As the separator, the one which has been used for conventional batteries can be used. The separator just needs to be an insulating thin film which has large ion permeability and a predetermined mechanical strength. As a material thereof, there are used olefin-based polymers, fluorine-based polymers, cellulose-based polymers, polyimides, Nylon, glass fibers, and alumina fibers, and as a form thereof, there are used nonwoven fabrics, woven fabrics, and microporous films. In particular, as the material, preferable are polypropylenes, polyethylenes, a mixture of polypropylene and polyethylene, a mixture of polypropylene and polytetrafluoroethylene (PTFE), and a mixture of polyethylene and polytetrafluoroethylene (PTFE), and as the form, microporous films are preferable. In particular, a microporous film whose pore diameter is 0.01 to 1 micrometers, and whose thickness is 5 to 50 micrometers is preferable. Such microporous film can be a single film, or a complex film made of two or more layers having different properties, such as shapes and densities of micropores and materials of the layers, from one another. For example, a complex film in which a polyethylene film and a polypropylene film are laminated to each other can be adopted.

In particular, the one composed of polyethylene and/or polypropylene resin is preferable in point of exerting a beneficial effect on prevention of short circuits and being capable of improving battery safety by shutdown effect. The separator is disposed between both electrodes so that the cathode and the anode are not in direct contact with each other.

In such lithium ion secondary battery, at the time of electrical discharge, lithium ions are separated from the anode, or lithium ions liquate out from the lithium metal, and then lithium ions react with the cathode active material through the electrolyte solution. On the other hand, by electrical charge, lithium ions are separated from the cathode active material, and then lithium ions are absorbed by the anode through the electrolyte solution or precipitated as the lithium metal.

As described above, since the electrolyte solvent of the present invention includes ammonium ions each containing two or more alkoxyalkyl groups as substituent groups, the viscosity becomes low due to the two or more alkoxyalkyl groups, and ion conductivity is increased. For this reason, this can be the electrolyte solvent preferable for the lithium ion secondary battery which uses lithium oxo acid salt as the cathode active material. In addition, since the electrolyte solvent of the present invention has a low melting point, it can also be used in cold weather regions.

Moreover, the lithium ion secondary battery, which uses the electrolyte solvent of the present invention and uses lithium oxo acid salt as the cathode active material, has improved rate characteristics and capacity, and has excellent battery characteristics.

Furthermore, since lithium oxo acid salt is used as the cathode active material, the lithium ion secondary battery can be relatively easily supplied, and becomes inexpensive. In addition, since reactivity is low, safety as the secondary battery becomes high and capacity thereof is increased.

EXAMPLES

Hereinafter, the present invention will be specifically described by using examples, but embodiments of the present invention is not limited thereto.

Example 1

Synthesis of Raw Material Amine

Synthesis of N,N-diethyl-N-2-methoxyethylamine

In an autoclave of 100 mL, N,N-diethylamine (35.0 g, 478 mmol) was made reacted with chloroethyl methyl ether (22.6 g, 239 mmol) at 120 deg C. for 48 hours. Solid salt that was formed was removed by filtration, and residue (filtrate) was subjected to reduced-pressure distillation by using a Vigreux column of 25 cm. Then $^1$H-NMR measurement of obtained amine is performed, and it was confirmed that chemical shifts, δ (ppm), are 3.45-3.42 (t, 2H), 3.31(s, 3H), 2.52-2.50(t, 2H), 2.34-2.31(t, 2H), 2.22(s, 3H), 1.45-1.38(m, 2H), 1.31-1.22 (m, 2H), and 0.89-0.85(t, 3H), and that N,N-diethyl-N-2-methoxyethylamine was synthesized.

Synthesis of N-butyl-N-methyl-N-2-methoxyethylamine

In an autoclave of 100 mL, N-butyl-N-ethylamine (34.0 g, 390 mmol) was made reacted with chloroethyl methyl ether (18.5 g, 196 mmol) at 130 deg C. for 48 hours. Solid salt that was formed was removed by filtration, and residue (filtrate) was subjected to reduced-pressure distillation by using a Vigreux column of 25 cm. Then $^1$H-NMR measurement of obtained amine is performed, and it was confirmed that chemical shifts, δ (ppm), are 3.45-3.42 (t, 2H), 3.31(s, 3H), 2.52-2.50(t, 2H), 2.34-2.31(t, 2H), 2.22(s, 3H), 1.45-1.38(m, 2H), 1.31-1.22(m, 2H), and 0.89-0.85(t, 3H), and that N-butyl-N-methyl-N-2-methoxyethylamine was synthesized.

Synthesis of N-2-methoxyethylpyrrolidine

In an autoclave of 100 mL, pyrrolidine (40.0 g, 563 mmol) was made reacted with chloroethyl methyl ether (26.0 g, 275 mmol) at 125 deg C. for 48 hours. Solid salt that was formed was removed by filtration, and residue (filtrate) was subjected to reduced-pressure distillation by using a Vigreux column of 25 cm. Then $^1$H-NMR measurement of obtained amine is performed, and it was confirmed that chemical shifts, δ (ppm), are 3.46-3.43 (t, 2H), 3.30(s, 3H), 2.62-2.59(t, 2H), 2.49-2.46(m, 4H), and 1.73-1.70 (m, 4H), and that N-2-methoxyethylpyrrolidine was synthesized.

Synthesis of N-2-methoxyethylpiperidine

In an autoclave of 100 mL, piperidine (40.0 g, 470 mmol) was made reacted with chloroethyl methyl ether (22.0 g, 232 mmol) at 130 deg C. for 48 hours. Solid salt that was formed was removed by filtration, and residue (filtrate) was subjected to reduced-pressure distillation by using a Vigreux column of 25 cm. Then $^1$H-NMR measurement of obtained amine is performed, and it was confirmed that chemical shifts, δ (ppm), are 3.49-3.46 (t, 2H), 3.31(s, 3H), 2.51-2.48(t, 2H), 2.40-2.36(m, 4H), 1.59-1.53(m, 4H), and 1.42-1.36(m, 2H), and that N-2-methoxyethylpiperidine was synthesized.

Synthesis of N-2-methoxyethylmorpholine

In an autoclave of 100 mL, morpholine (45.0 g, 517 mmol) was made reacted with chloroethyl methyl ether (25.0 g, 265 mmol) at 130 deg C. for 48 hours. Solid salt that was formed was removed by filtration, and residue (filtrate) was subjected to reduced-pressure distillation by using a Vigreux column of 25 cm. Then $^1$H-NMR measurement of obtained amine is performed, and it was confirmed that chemical shifts, δ (ppm), are 3.53-3.55(m, 4H), 3.33-3.35(m, 2H), 3.17(s, 3H), and 2.36-2.32 (m, 6H), and that N-2-methoxyethylmorpholine was synthesized.

<Synthesis of Ionic Liquid>
(Synthesis of Ionic Liquid [1-1])

A mixture of tertiary ammonium salt (N,N-diethyl-N-2-methoxyethylamine, 100 mmol) or bromoethyl methyl ether or 2-bromoethyl ethyl ether, which includes one(1) synthesized ether group, and methanol (20 mL) was put into a flask of 250 mL, and held at reflux at 80 deg C. for 72 hours or more. Bromide that was produced was washed with ether. Then, bromide was dissolved into acetone (or acetone and acetonitrile), and purified with active charcoal. After filtration, the solution was subjected to reduced-pressure distillation to remove the solvent. After reduced-pressure drying at 60 deg C., bromide and LiTFSI (TFSI: bis(trifluoromethansulfonyl)imide) were dissolved into an ion-exchange water, and mixed at normal temperature for 24 hours. Crude ionic liquid was dissolved into dichloromethane, and washed with an ion-exchange water. The washing was performed until there is no residual halogen anion in the ion-exchange water. The existence and non-existence of residual halogen anions was analyzed by using silver nitrate. Dichloromethane was removed by a rotary evaporator. The product was dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 3.67-3.66(t, 4H), 3.46-3.43(t, 4H), 3.40-3.35(m, 4H), 3.28(s, 6H), and 1.26-1.23(t, 6H), and $^{13}$C-NMR, δ (ppm): 124.86-115.25, 66.79, 59.10, 58.28, 55.50, and 7.57, and it was found that N,N-diethyl-N,N-di-(2-methoxyethyl)ammonium bis(trifluoromethanesulfonyl)imide (ionic liquid [1-1]) was synthesized.

(Synthesis of Ionic Liquid [1-2])

The ionic liquid was synthesized by the same procedure as that of the synthesis of ionic liquid [1-1] except that bromoethyl methyl ether was replaced with bromoethyl ethyl ether. Measurements of $^1$H-NMR and $^{13}$C-NMR of the synthesized ionic liquid were performed. Chemical shifts are such that $^1$H-NMR, δ (ppm): 3.70-3.64(m, 4H), 3.45-3.41(m, 6H), 3.40-3.34(m, 4H), 3.27(s, 6H), 1.25-1.21(t, 6H), and 1.11-1.08(t, 3H), and $^{13}$C-NMR, δ (ppm): 124.81-115.33, 67.07, 65.78, 63.66, 59.12, 58.32, 58.23, 55.45, 14.83, and 7.66, and it was found that N,N-diethyl-N-2-methoxyethyl-N-2-ethoxyethylammonium bis(trifluoromethanesulfonyl)imide (ionic liquid [1-2]) was synthesized.

(Synthesis of Ionic Liquid [1-3])

The ionic liquid was synthesized by the same procedure as that of the synthesis of ionic liquid [1-1] except that N,N-diethyl-N-2-methoxyethylamine and bromoethyl methyl ether were replaced with triethylamine (marketed product) and 2-bromoethyl ethyl ether, respectively. Measurements of $^1$H-NMR and $^{13}$C-NMR of the synthesized ionic liquid were performed. Chemical shifts are as follows. In chemical shifts of $^1$H-NMR, a peak(t) of $CH_3$ and peak of $CH_2$ which correspond to N,N,N-triethyl, a peak(t) of $CH_3$ and peak of $CH_2$ which correspond to ethoxy, and a peak of $CH_2$ and peak of $CH_2$ which correspond to ethyl were observed, and also in chemical shifts of $^{13}$C-NMR, a peak of $CH_3$ and peak of $CH_2$ which correspond to triethyl, a peak of $CH_3$ and peak of $CH_2$ which correspond to ethoxy, and a peak of $CH_2$ and peak of $CH_2$ which correspond to ethyl were observed, and it was confirmed that N,N,N-triethyl-N-2-ethoxyethylammonium bis(trifluoromethanesulfonyl)imide (ionic liquid [1-3]) was synthesized.

(Synthesis of Ionic Liquid [1-4])

The ionic liquid was synthesized by the same procedure as that of the synthesis of ionic liquid [1-1] except that N,N-diethyl-N-2-methoxyethylamine was replaced with N-butyl-N-methyl-N-2-methoxyethylamine. Measurements of $^1$H-NMR and $^{13}$C-NMR of the synthesized ionic liquid were performed. Chemical shifts are such that $^1$H-NMR, δ (ppm): 3.73-3.69 (t, 4H), 3.54-3.51 (m, 4H), 3.34-3.29(m, 8H), 3.06 (s, 3H), 1.70-1.62(m, 2H), 1.36-1.30(m, 2H), and 0.95-0.91(t, 3H), and $^{13}$C-NMR, δ (ppm): 124.76-115.25, 65.85, 64.40, 62.20, 59.01, 49.77, 24.31, 19.44, and 13.22, and it was found that N-butyl-N-methyl-N,N-di-(2-methoxyethyl) ammonium bis(trifluoromethanesulfonyl) imide (ionic liquid [1-4]) was synthesized.
(Synthesis of Ionic Liquid [1-5])

The ionic liquid was synthesized by the same procedure as that of the synthesis of ionic liquid [1-1] except that N,N-diethyl-N-2-methoxyethylamine and bromoethyl methyl ether were replaced with N-butyl-N-methyl-N-2-methoxyethylamine and 2-bromoethyl ethyl ether, respectively. Measurements of $^1$H-NMR and $^{13}$C-NMR of the synthesized ionic liquid were performed. Chemical shifts are such that $^1$H-NMR, δ (ppm): 3.75-3.72 (m, 4H), 3.57-3.44 (m, 6H), 3.35-3.31(m, 5H), 3.07(s, 3H), 1.71-1.63(m, 2H), 1.37-1.28 (m, 2H), 1.16-1.12(t, 3H), and 0.95-0.91(t, 3H), and $^{13}$C-NMR, δ (ppm): 124.85-115.24, 67.15, 66.02, 64.51, 63.98, 62.38, 62.35, 59.12, 49.79, 24.41, 19.51, 14.92, and 13.41, and it was found that N-butyl-N-methyl-N-2-methoxyethyl-N-2-ethoxyethylammonium bis(trifluoromethanesulfonyl) imide (ionic liquid [1-5]) was synthesized.
(Synthesis of Ionic Liquid [1-6])

The ionic liquid was synthesized by the same procedure as that of the synthesis of ionic liquid [1-1] except that N,N-diethyl-N-2-methoxyethylamine was replaced with N-2-methoxyethylpyrrolidine. Measurements of $^1$H-NMR and $^{13}$C-NMR of the synthesized ionic liquid were performed. Chemical shifts are such that $^1$H-NMR, δ (ppm): 3.75-3.73 (m, 4H), 3.65-3.62 (m, 4H), 3.57-3.55(m, 4H), 3.34(s, 6H), and 2.20-2.17(m, 4H), and $^{13}$C-NMR, δ (ppm): 124.88-115.22, 66.53, 64.45, 59.91, 59.06, and 21.20, and it was found that N,N-di-(2-methoxyethyl)pyrrolidinium bis(trifluoromethanesulfonyl)imide (ionic liquid [1-6]) was synthesized.
(Synthesis of Ionic Liquid [1-7])

The ionic liquid was synthesized by the same procedure as that of the synthesis of ionic liquid [1-1] except that N,N-diethyl-N-2-methoxyethylamine and bromoethyl methyl ether were replaced with N-2-methoxyethylpyrrolidine and 2-bromoethyl ethyl ether, respectively. Measurements of $^1$H-NMR and $^{13}$C-NMR of the synthesized ionic liquid were performed. Chemical shifts are such that $^1$H-NMR, δ (ppm): 3.74-3.71 (m, 4H), 3.63-3.61 (m, 4H), 3.56-3.53(m, 4H), 3.50-3.45(m, 2H), 3.32(s, 3H), 2.18-2.16(m, 4H), and 3.17-3.13(t, 3H), and $^{13}$C-NMR, δ (ppm): 124.83-115.25, 67.14, 66.61, 64.52, 64.49, 60.13, 60.02, 59.12, 21.39, and 14.94, and it was found that N-2-methoxyethyl-N-2-ethoxyethylpyrrolidinium bis(trifluoromethanesulfonyl) imide (ionic liquid [1-7]) was synthesized.
(Synthesis of Ionic Liquid [1-8])

The ionic liquid was synthesized by the same procedure as that of the synthesis of ionic liquid [1-1] except that N,N-diethyl-N-2-methoxyethylamine was replaced with N-2-methoxyethylpiperidine. Measurements of $^1$H-NMR and $^{13}$C-NMR of the synthesized ionic liquid were performed. Chemical shifts are such that $^1$H-NMR, δ (ppm): 3.69-3.67 (t, 4H), 3.57-3.55 (m, 4H), 3.39-3.36(t, 4H), 3.27(s, 6H), 1.85-1.79(m, 4H), and 1.65-1.59(m, 2H), and $^{13}$C-NMR, δ (ppm): 124.78-115.23, 65.75, 61.38, 59.65, 59.09, 20.77, and 19.89, and it was found that N,N-di-(2-methoxyethyl)piperidinium bis(trifluoromethanesulfonyl)imide (ionic liquid [1-8]) was synthesized.
(Synthesis of Ionic Liquid [1-9])

The ionic liquid was synthesized by the same procedure as that of the synthesis of ionic liquid [1-1] except that N,N-diethyl-N-2-methoxyethylamine and bromoethyl methyl ether were replaced with N-2-methoxyethylpiperidine and 2-bromoethyl ethyl ether, respectively. Measurements of $^1$H-NMR and $^{13}$C-NMR of the synthesized ionic liquid were performed. Chemical shifts are such that $^1$H-NMR, δ (ppm): 3.75-3.72 (m, 4H), 3.62-3.60 (m, 4H), 3.49-3.41(m, 6H), 3.31(s, 3H), 1.87-1.85(m, 4H), 1.67-1.65(m, 2H), and 1.15-1.11 (t, 3H), and $^{13}$C-NMR, δ (ppm): 124.88-115.25, 67.12, 65.89, 63.71, 61.47, 59.83, 59.68, 59.15, 20.84, 20.02, and 14.89, and it was found that N-2-methoxyethyl-N-2-ethoxyethylpiperidinium bis(trifluoromethanesulfonyl)imide (ionic liquid [1-9]) was synthesized.
(Synthesis of Ionic Liquid [1-10])

The ionic liquid was synthesized by the same procedure as that of the synthesis of ionic liquid [1-1] except that N,N-diethyl-N-2-methoxyethylamine and bromoethyl methyl ether were replaced with N-ethylpiperidine (marketed product) and 2-bromoethyl ethyl ether, respectively. Measurements of $^1$H-NMR and $^{13}$C-NMR of the synthesized ionic liquid were performed. Chemical shifts are as follows. In chemical shifts of $^1$H-NMR, a peak(t) of $CH_3$ and peak of $CH_2$ which correspond to N-ethyl, a peak(t) of $CH_3$ and peak of $CH_2$ which correspond to 2-ethoxy, a peak of $CH_2$ and peak of $CH_2$ which correspond to ethyl, and two kinds of peaks of $CH_2$ which correspond to piperidinium were observed, and also in chemical shifts of $^{13}$C-NMR, a peak of $CH_3$ and peak of $CH_2$ which correspond to N-ethyl, a peak of $CH_3$ and peak of $CH_2$ which correspond to ethoxy, a peak of $CH_2$ and peak of $CH_2$ which correspond to ethyl, and three kinds of peaks of $CH_2$ which correspond to piperidinium were observed, and it was found that N-ethyl-N-2-ethoxyethylpiperidinium bis(trifluoromethanesulfonyl)imide (ionic liquid [1-10]) was synthesized.
(Synthesis of Ionic Liquid [1-11])

The ionic liquid was synthesized by the same procedure as that of the synthesis of ionic liquid [1-1] except that N,N-diethyl-N-2-methoxyethylamine was replaced with N-2-methoxyethylmorpholine. Measurements of $^1$H-NMR and $^{13}$C-NMR of the synthesized ionic liquid were performed. Chemical shifts are such that $^1$H-NMR, δ (ppm): 3.98-3.96 (t, 4H), 3.77(s, 8H), 3.57-3.55(t, 4H), and 3.33 (s, 6H), and $^{13}$C-NMR, δ (ppm): 124.78-115.22, 65.53, 60.68, 60.28, 60.13, and 59.11, and it was found that N,N-di-(2-methoxyethyl)morpholinium bis(trifluoromethanesulfonyl)imide (ionic liquid [1-11]) was synthesized.
(Synthesis of ionic liquid [1-12])

The ionic liquid was synthesized by the same procedure as that of the synthesis of ionic liquid [1-1] except that N,N-diethyl-N-2-methoxyethylamine and bromoethyl methyl ether were replaced with N-2-methoxyethylmorpholine and 2-bromoethyl ethyl ether, respectively. Measurements of $^1$H-NMR and $^{13}$C-NMR of the synthesized ionic liquid were performed. Chemical shifts are such that $^1$H-NMR, δ (ppm): 3.94-3.92 (t, 4H), 3.77-3.73(d, 8H), 3.53-3.51 (t, 4H), 3.47-3.42(m, 2H), 3.31-3.29(d, 3H), and 1.12-1.09(t, 3H), and $^{13}$C-NMR, δ (ppm): 124.86-115.20, 67.12, 65.54, 63.40, 60.67, 60.31, 60.14, 59.13, 59.07, and 14.82, and it was found that N-2-methoxyethyl-N-2-ethoxyethylmorpholinium bis (trifluoromethanesulfonyl)imide (ionic liquid [1-12]) was synthesized.

Example 2

Synthesis of Raw Material Amine

Synthesis of N,N,N-tri-(2-methoxyethyl)amine

In an autoclave of 100 mL, bis(2-methoxyethyl)amine (50.0 g, 75 mmol) was made reacted with chloroethyl methyl ether (18.0 g, 190 mmol) at 140 deg C. for 48 hours. Solid salt that was formed in the reaction was removed by filtration, and remaining filtrate was subjected to reduced-pressure distillation by using a Vigreux column of 25 cm. FIG. 1 illustrates $^1$H-NMR of amine obtained by the distillation. As illustrated in FIG. 1, details of chemical shifts, δ (ppm), are 3.45-3.41 (t, 6H), 3.30(s, 9H), and 2.75-2.72(t, 6H), and it was confirmed that N,N,N-tri-(2-methoxyethyl)amine was synthesized.

<Synthesis of Ionic Liquid>

(Synthesis of Ionic Liquid [2-1])

Figure 2:
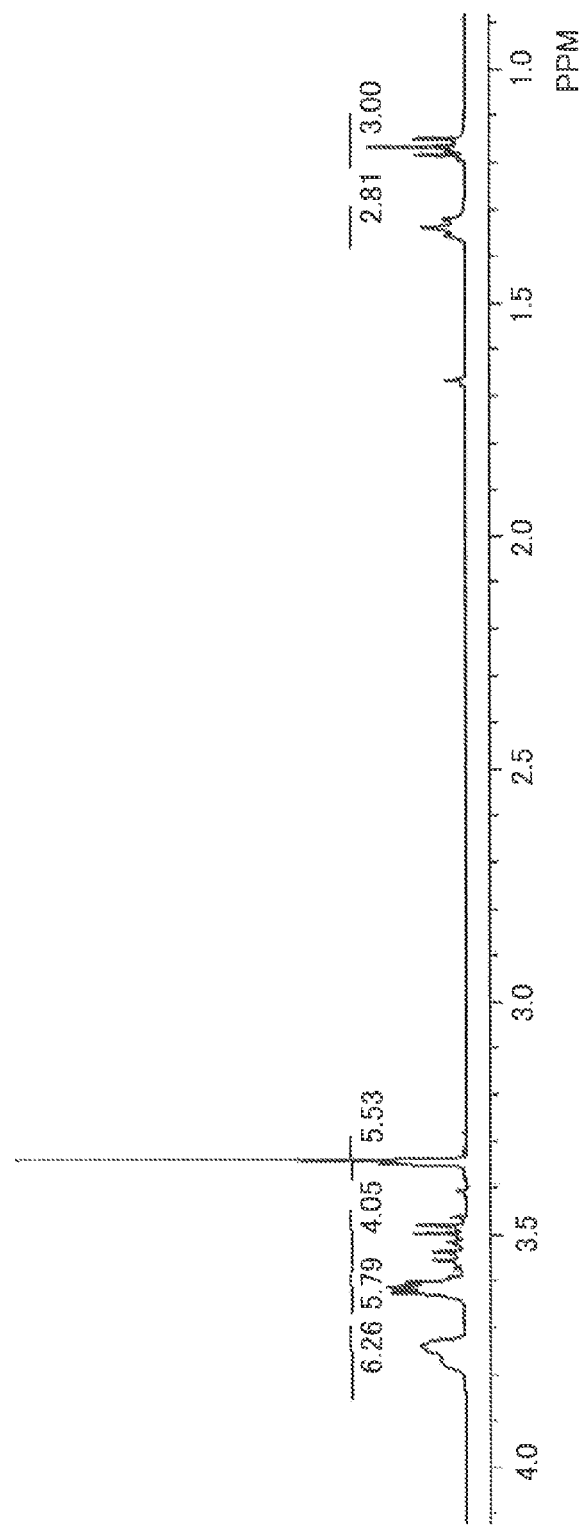
FIG. 2 is a chart illustrating $^1$H-NMR spectrum of electrolyte solvent [2-1].
Figure 3:
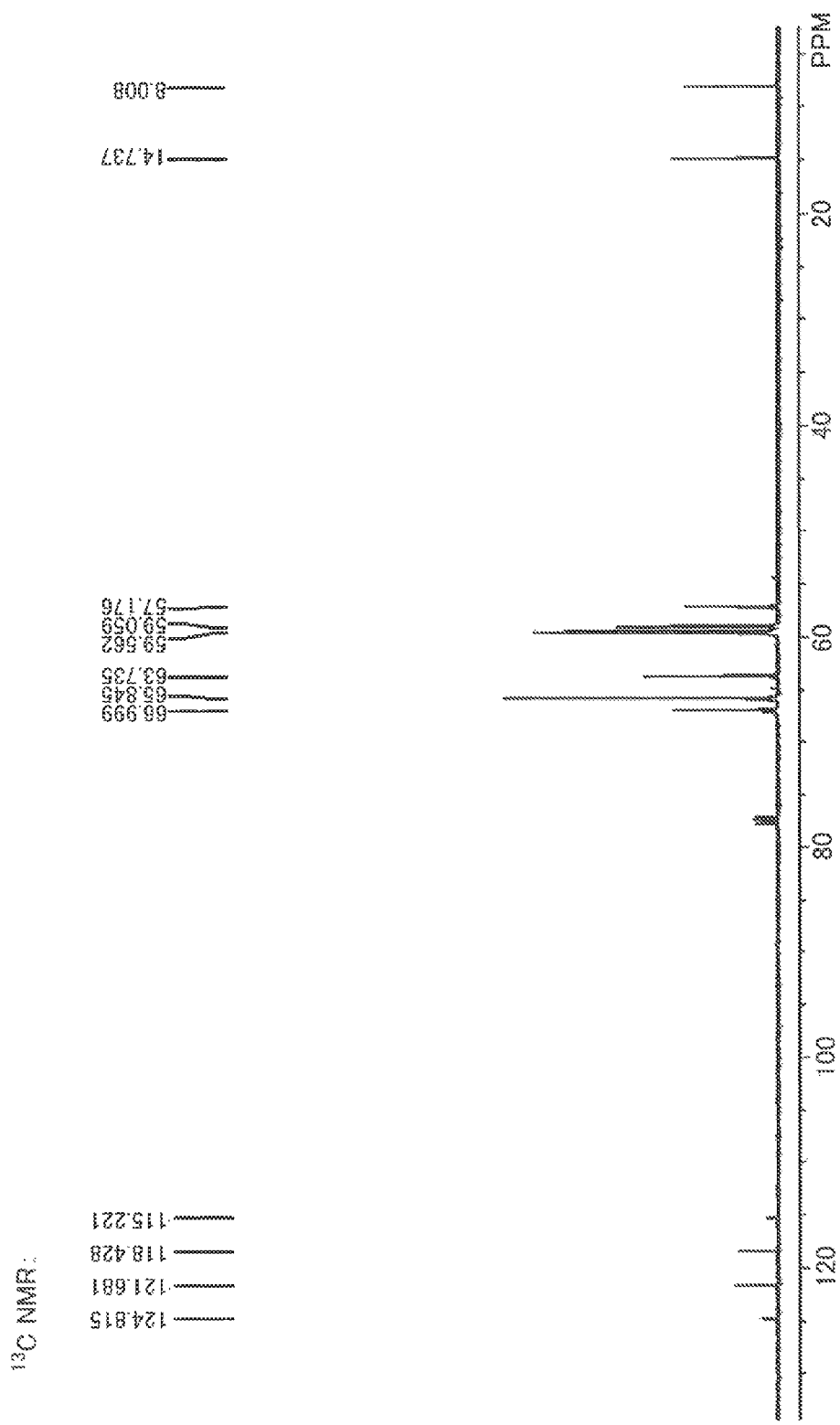
FIG. 3 is a chart illustrating $^{13}$C-NMR spectrum of electrolyte solvent [2-1].

In an autoclave of 50 mL, N,N,N-tri-(2-methoxyethyl)amine (9.1 g, 48 mmol), that was synthesized in Example 2, was made reacted with bromoethane (11.2 g, 104 mmol) with methanol used as the solvent (10 mL) thereof at 60 deg C. for 24 hours. Bromide that was produced was washed with ether. After washing, bromide was recrystallized two times from acetone and THF, and then dried in a vacuum at 60 deg C. Obtained bromide and LiTFSI (TFSI: bis(trifluoromethansulfonyl)imide) were dissolved into an ion-exchange water, and mixed at normal temperature for 24 hours. The ionic liquid that was produced in this way was dissolved into dichloromethane, washed with an ion-exchange water. The washing was performed until there is no residual halogen anion in the washing water. Here, the existence and non-existence of residual halogen anions in the washing water was analyzed by using silver nitrate, $AgNO_3$. Dichloromethane was removed by a rotary evaporator. The product was dried in a vacuum at 105 deg C. for 24 hours or more. FIG. 2 and FIG. 3 illustrate $^1$H-NMR and $^{13}$C-NMR of the ionic liquid that was synthesized. As illustrated in FIG. 2 and FIG. 3, details of chemical shifts are such that $^1$H-NMR, δ (ppm): 3.75-3.73(m, 6H), 3.62-3.60(t, 6H), 3.57-3.52(m, 2H), 3.34(s, 9H), and 1.35-1.32(t, 3H), and $^{13}$C-NMR, δ (ppm): 124.86-115.37, 65.91, 59.66, 59.17, 59.13, 57.27, and 8.14, and it was confirmed that N-ethyl-N,N,N-tri-(2-methoxyethyl)ammonium bis(trifluoromethanesulfonyl)imide (ionic liquid [2-1]) was synthesized.

(Synthesis of Ionic Liquid [2-2])

Figure 4:
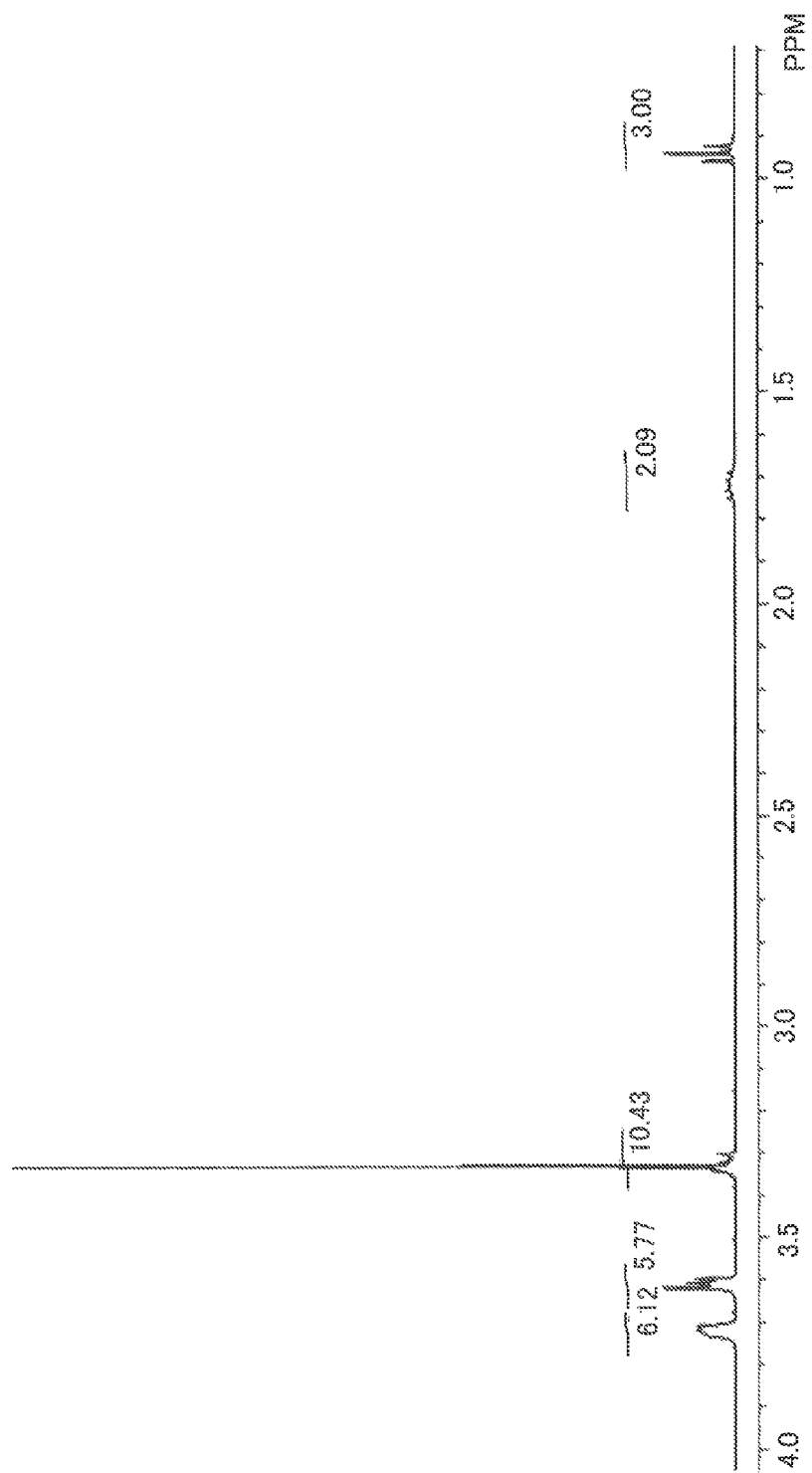
FIG. 4 is a chart illustrating $^1$H-NMR spectrum of electrolyte solvent [2-2].
Figure 5:
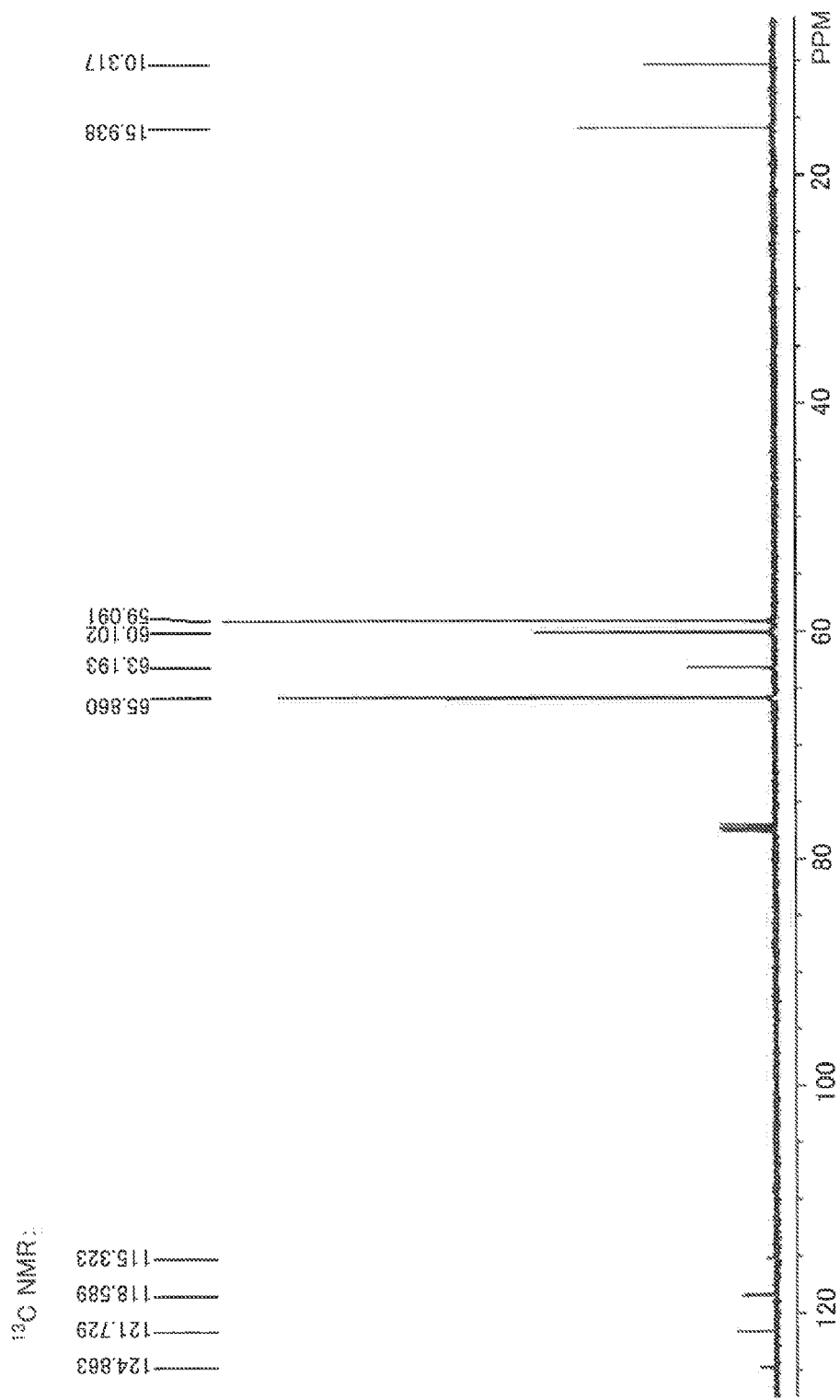
FIG. 5 is a chart illustrating $^{13}$C-NMR spectrum of electrolyte solvent [2-2].

In an autoclave of 50 mL, N,N,N-tri-(2-methoxyethyl)amine (9.1 g, 48 mmol), that was synthesized in Example 2, was made reacted with 1-bromopropane (10.0 g, 81 mmol) with methanol used as the solvent (10 mL) thereof at 80 deg C. for 24 hours. Subsequent procedures are performed as in the case of ionic liquid [2-11]. FIG. 4 and FIG. 5 illustrate $^1$H-NMR and $^{13}$C-NMR of the ionic liquid that was synthesized. As illustrated in FIG. 4 and FIG. 5, details of chemical shifts are such that $^1$H-NMR, δ (ppm): 3.75-3.73(m, 6H), 3.62-3.60(t, 6H), 3.57-3.52(m, 2H), 3.34(s, 9H), 3.34 (s, 9H), and 1.35-1.32(t, 3H), and $^{13}$C-NMR, δ (ppm): 124.86-115.37, 65.91, 59.66, 59.17, 59.13, 57.27, and 8.14, and it was confirmed that N-propyl-N,N,N-tri-(2-methoxyethyl)ammonium bis(trifluoromethanesulfonyl)imide (ionic liquid [2-2]) was synthesized.

(Synthesis of Ionic Liquid [2-3])

Figure 6:
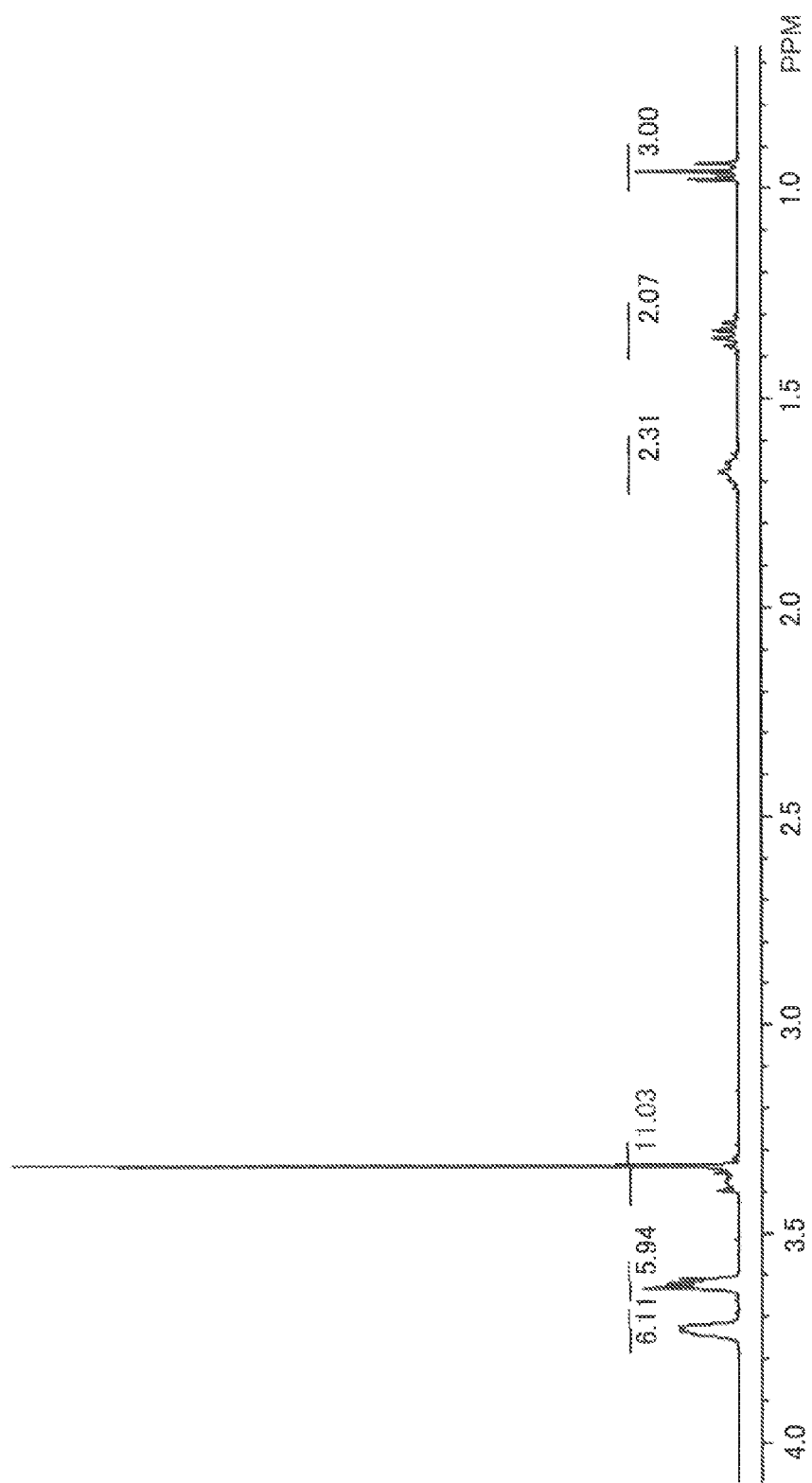
FIG. 6 is a chart illustrating $^1$H-NMR spectrum of electrolyte solvent [2-3].
Figure 7:
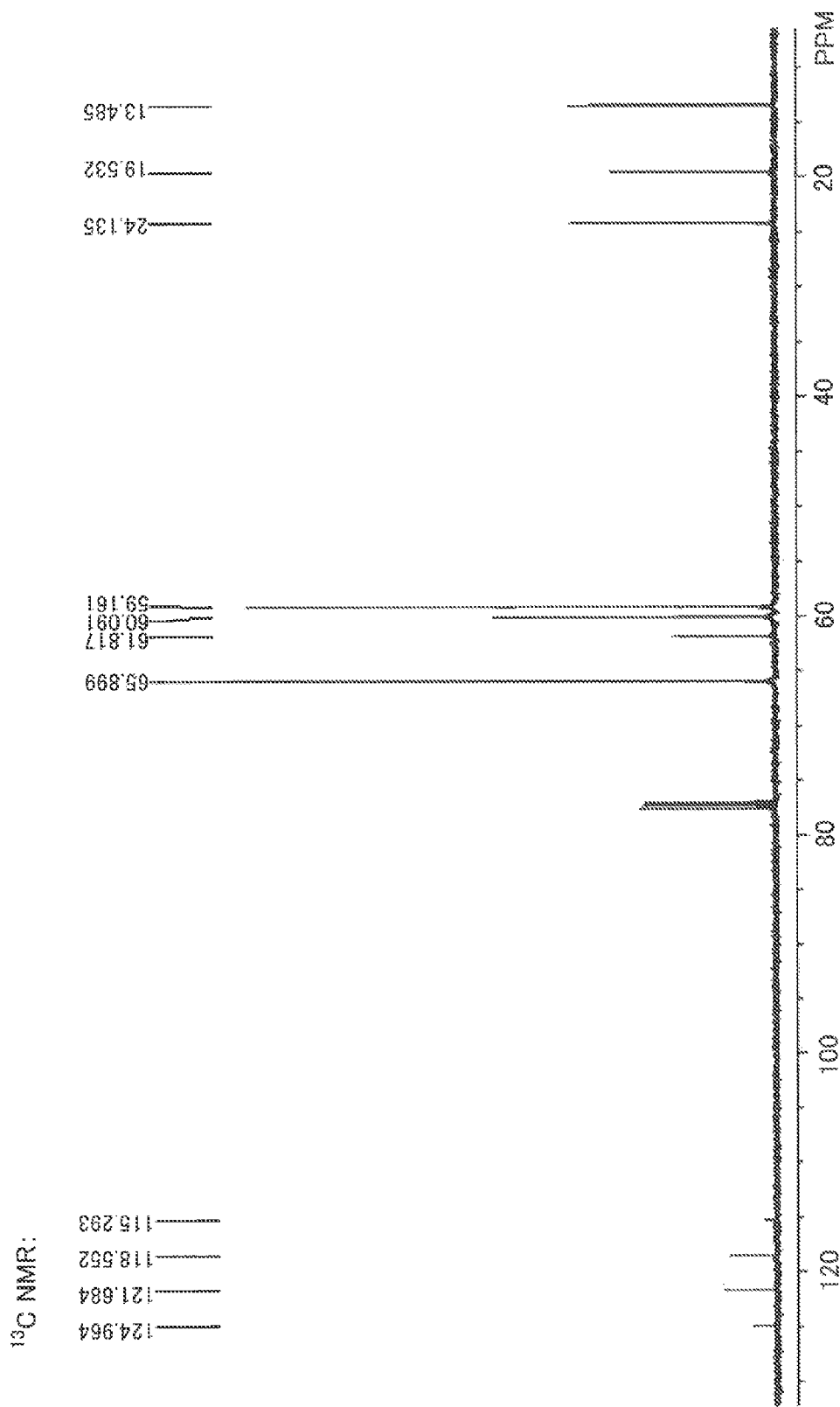
FIG. 7 is a chart illustrating $^{13}$C-NMR spectrum of electrolyte solvent [2-3].

N,N,N-tri-(2-methoxyethyl)amine (10.0 g, 52 mmol), 1-bromobutane (14.0 g, 102 mmol), and methanol (10 mL) were put into a flask of 250 mL, and held at reflux in a nitrogen atmosphere at 85 deg C. for 72 hours or more. Subsequent procedures are performed as in the case of ionic liquid [2-1]. FIG. 6 and FIG. 7 illustrate $^1$H-NMR and $^{13}$C-NMR of the ionic liquid that was synthesized. As illustrated in FIG. 6 and FIG. 7, details of chemical shifts are such that $^1$H-NMR, δ (ppm): 3.74-3.72(m, 6H), 3.63-3.61(t, 6H), 3.40-3.32(m, 11H), 1.71-1.64(m, 2H), 1.39-1.30(m, 2H), and 0.98-0.94(t, 3H), and $^{13}$C-NMR, δ (ppm): 124.95-115.29, 65.90, 61.82, 60.09, 59.16, 24.14, 19.53, and 13.49, and it was confirmed that N-butyl-N,N,N-tri-(2-methoxyethyl)ammonium bis(trifluoromethanesulfonyl) imide (ionic liquid [2-3]) was synthesized.

(Synthesis of Ionic Liquid [2-4])

Figure 8:
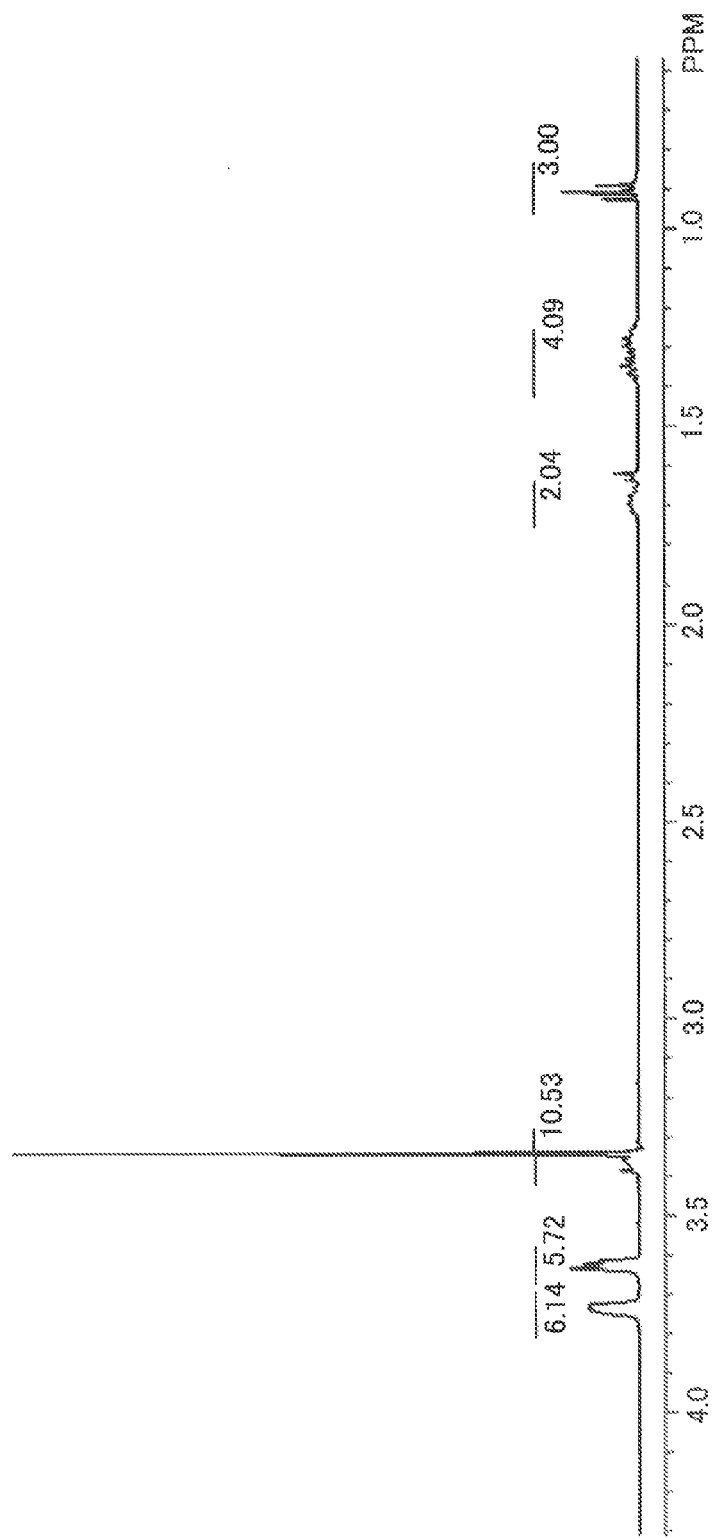
FIG. 8 is a chart illustrating $^1$H-NMR spectrum of electrolyte solvent [2-4].
Figure 9:
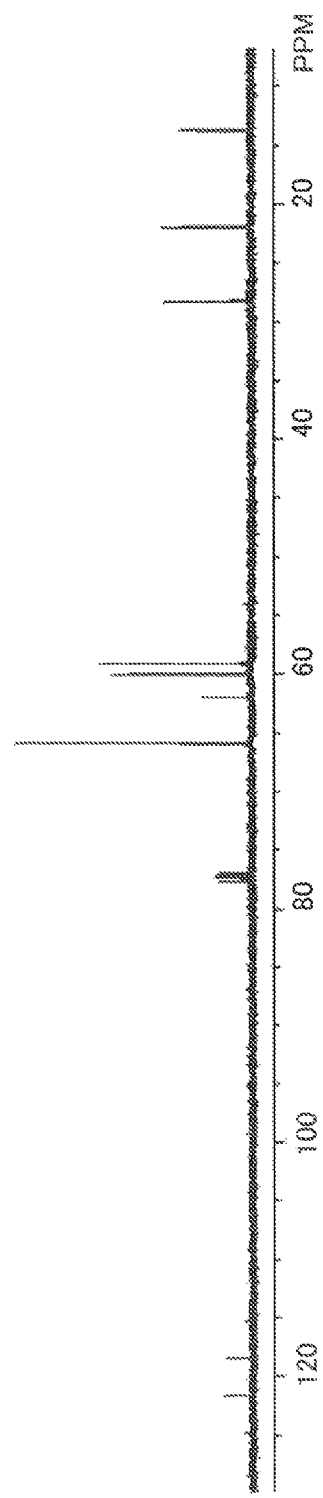
FIG. 9 is a chart illustrating $^{13}$C-NMR spectrum of electrolyte solvent [2-4].

N,N,N-tri-(2-methoxyethyl)amine (10.0 g, 52 mmol), 1-bromopentane (15.0 g, 99 mmol), and methanol (10 mL) were put into a flask of 250 mL, and held at reflux in a nitrogen atmosphere at 85 deg C. for 72 hours or more. Subsequent procedures are performed as in the case of ionic liquid [2-1]. FIG. 8 and FIG. 9 illustrate $^1$H-NMR and $^{13}$C-NMR of the ionic liquid that was synthesized. As illustrated in FIG. 8 and FIG. 9, details of chemical shifts are such that $^1$H-NMR, δ (ppm): 3.73-3.72(m, 6H), 3.64-3.62(t, 6H), 3.39-3.34(m, 11H), 1.73-1.66(m, 2H), 1.38-1.24(m, 4H), and 0.93-0.89(t, 3H), and $^{13}$C-NMR, δ (ppm): 124.89-115.27, 65.90, 61.92, 60.01, 59.05, 28.24, 22.04, 21.90, and 13.81, and it was confirmed that N-amyl-N,N,N-tri-(2-methoxyethyl)ammonium bis(trifluoromethanesulfonyl)imide (ionic liquid [2-4]) was synthesized.

(Synthesis of Ionic Liquid [2-5])

Figure 10:
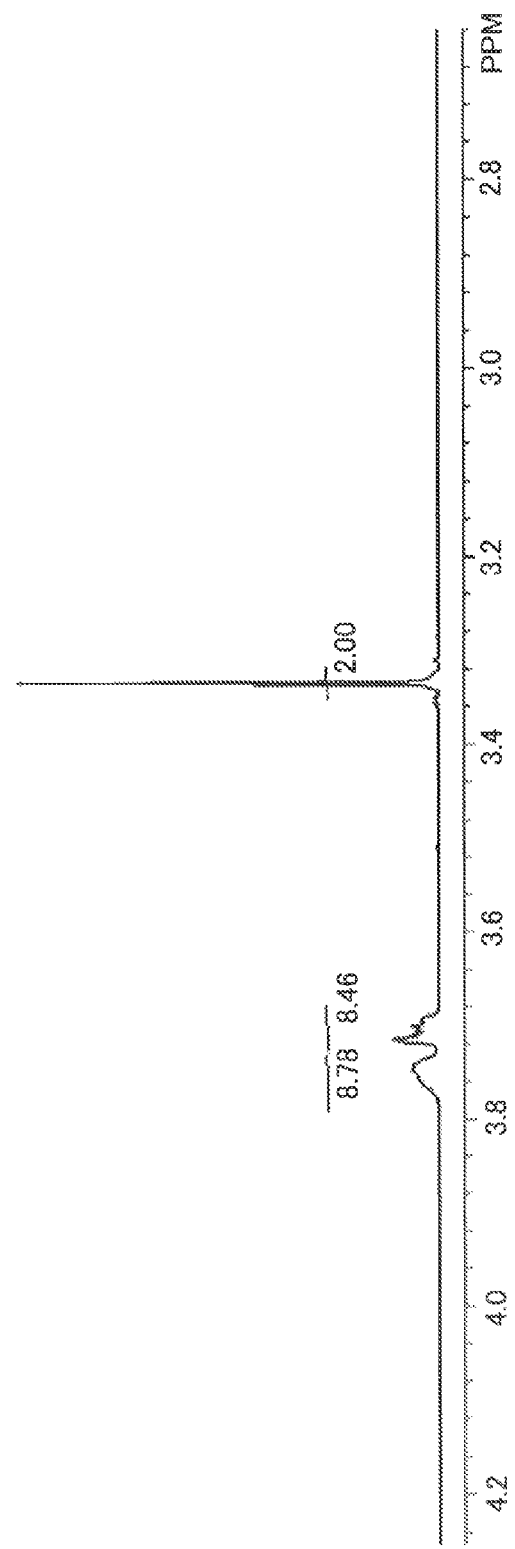
FIG. 10 is a chart illustrating $^1$H-NMR spectrum of electrolyte solvent [2-5].
Figure 11:
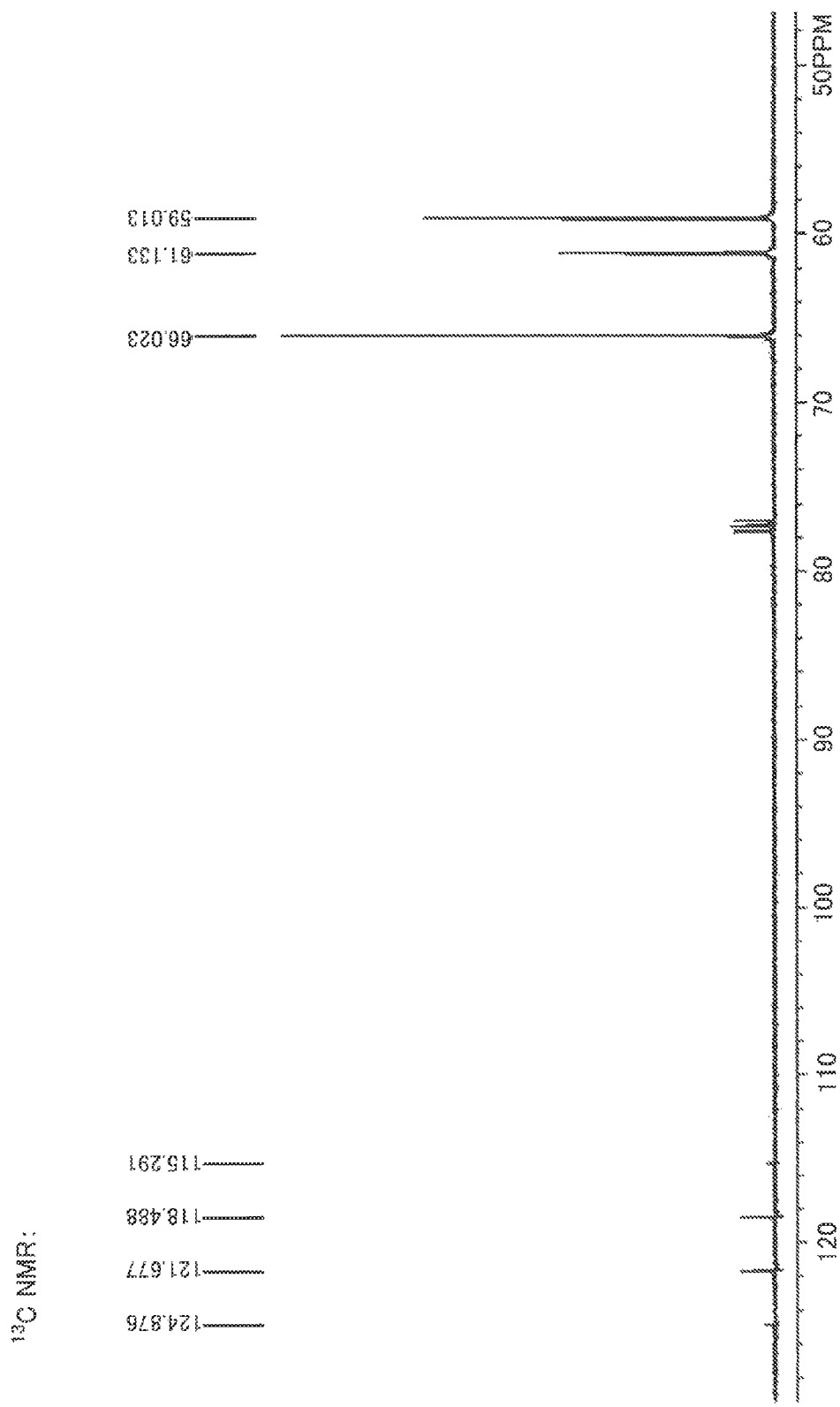
FIG. 11 is a chart illustrating $^{13}$C-NMR spectrum of electrolyte solvent [2-5].

N,N,N-tri-(2-methoxyethyl)amine (10.0 g, 52 mmol), bromoethyl methyl ether (7.2 g, 52 mmol), and methanol (10 mL) were put into a flask of 250 mL, and held at reflux in a nitrogen atmosphere at 85 deg C. for 72 hours or more. Subsequent procedures are performed as in the case of ionic liquid [2-1]. FIG. 10 and FIG. 11 illustrate $^1$H-NMR and $^{13}$C-NMR of the ionic liquid that was synthesized. As illustrated in FIG. 10 and FIG. 11, details of chemical shifts are such that $^1$H-NMR, δ (ppm): 3.76-3.74(m, 8H), 3.71-3.69(t, 8H), and 3.33(s, 12H), and $^{13}$C-NMR, δ (ppm): 124.88-115.29, 66.02, 61.13, and 59.01, and it was confirmed that N,N,N,N-quart-(2-methoxyethyl)ammonium bis(trifluoromethanesulfonyl)imide (ionic liquid [2-5]) was synthesized.

(Synthesis of Ionic Liquid [2-6])

Figure 12:
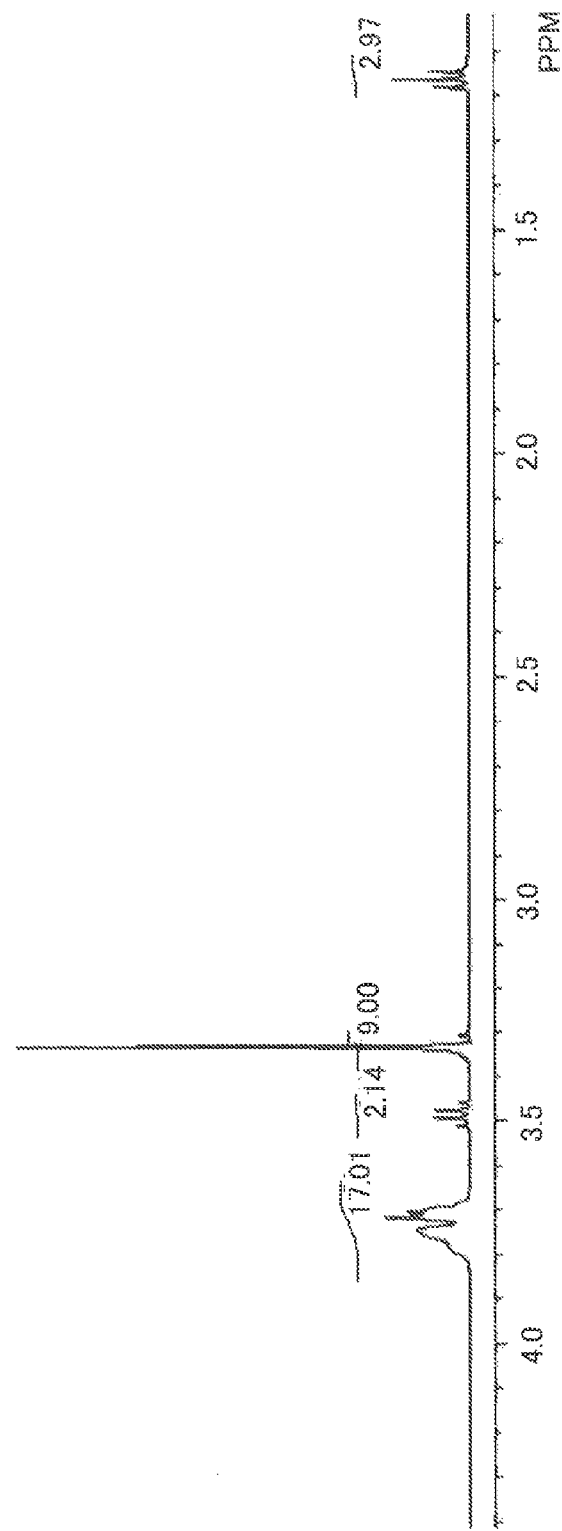
FIG. 12 is a chart illustrating $^1$H-NMR spectrum of electrolyte solvent [2-6].
Figure 13:
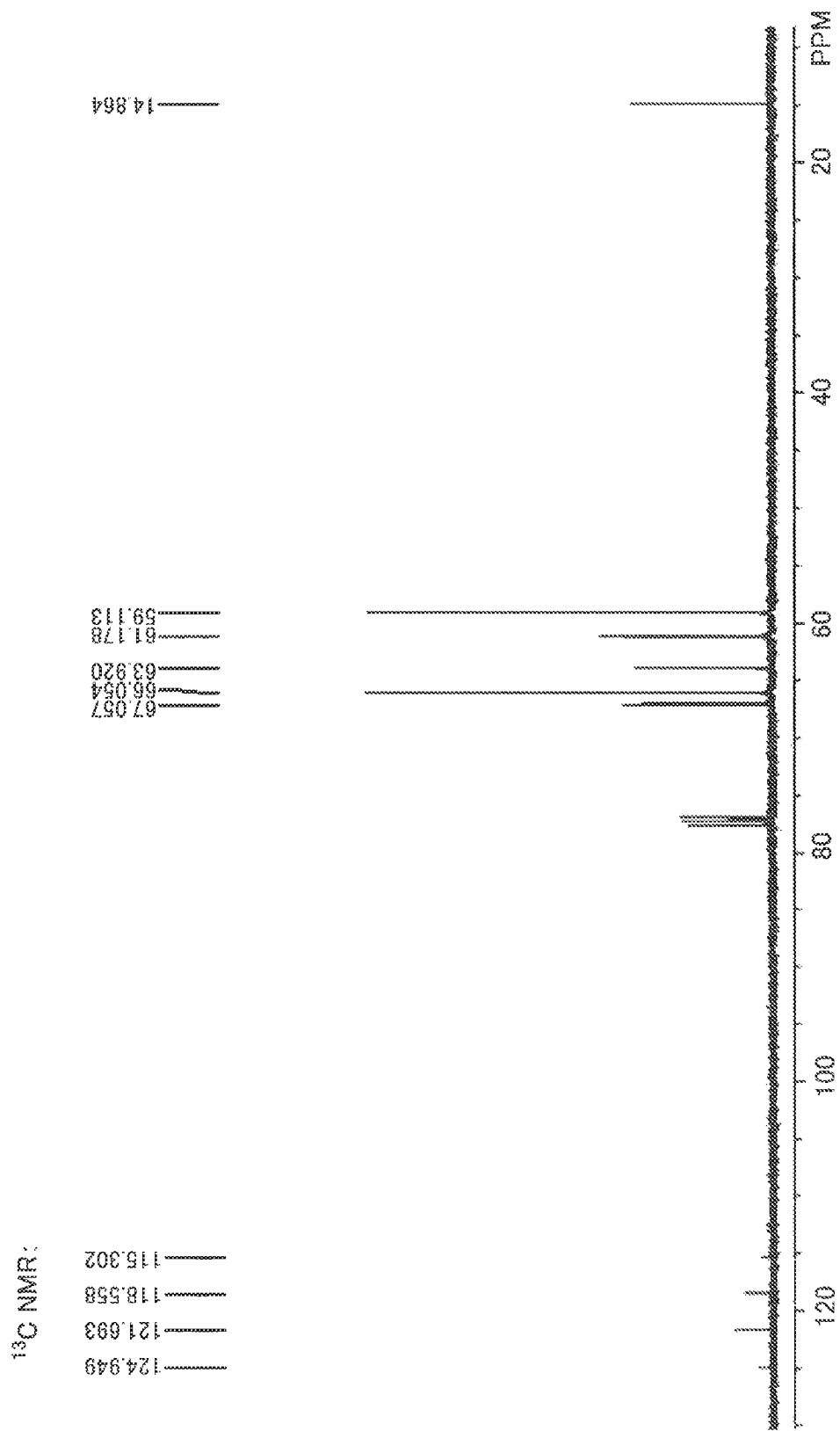
FIG. 13 is a chart illustrating $^{13}$C-NMR spectrum of electrolyte solvent [2-6].

N,N,N-tri-(2-methoxyethyl)amine (10.0 g, 52 mmol), 2-bromoethyl ethyl ether (8.0 g, 52 mmol), and methanol (10 mL) were put into a flask of 250 mL, and held at reflux in a nitrogen atmosphere at 85 deg C. for 72 hours or more. Subsequent procedures are performed as in the case of ionic liquid [2-1]. FIG. 12 and FIG. 13 illustrate $^1$H-NMR and $^{13}$C-NMR of the ionic liquid that was synthesized. As illustrated in FIG. 12 and FIG. 13, details of chemical shifts are such that $^1$H-NMR, δ (ppm): 3.78-3.68(m, 16H), 3.51-3.46(t, 2H), 3.33(s, 9H), and 1.18-1.15(t, 3H), and $^{13}$C-NMR, δ (ppm): 124.95-115.30, 67.06, 66.05, 63.92, 61.18, 59.11, and 14.86, and it was confirmed that N-2-ethoxyethyl-N,N,N-tri-(2-methoxyethyl)ammonium bis(trifluoromethanesulfonyl)imide (ionic liquid [2-6]) was synthesized.

(Synthesis of Ionic Liquid [2-7])

Figure 14:
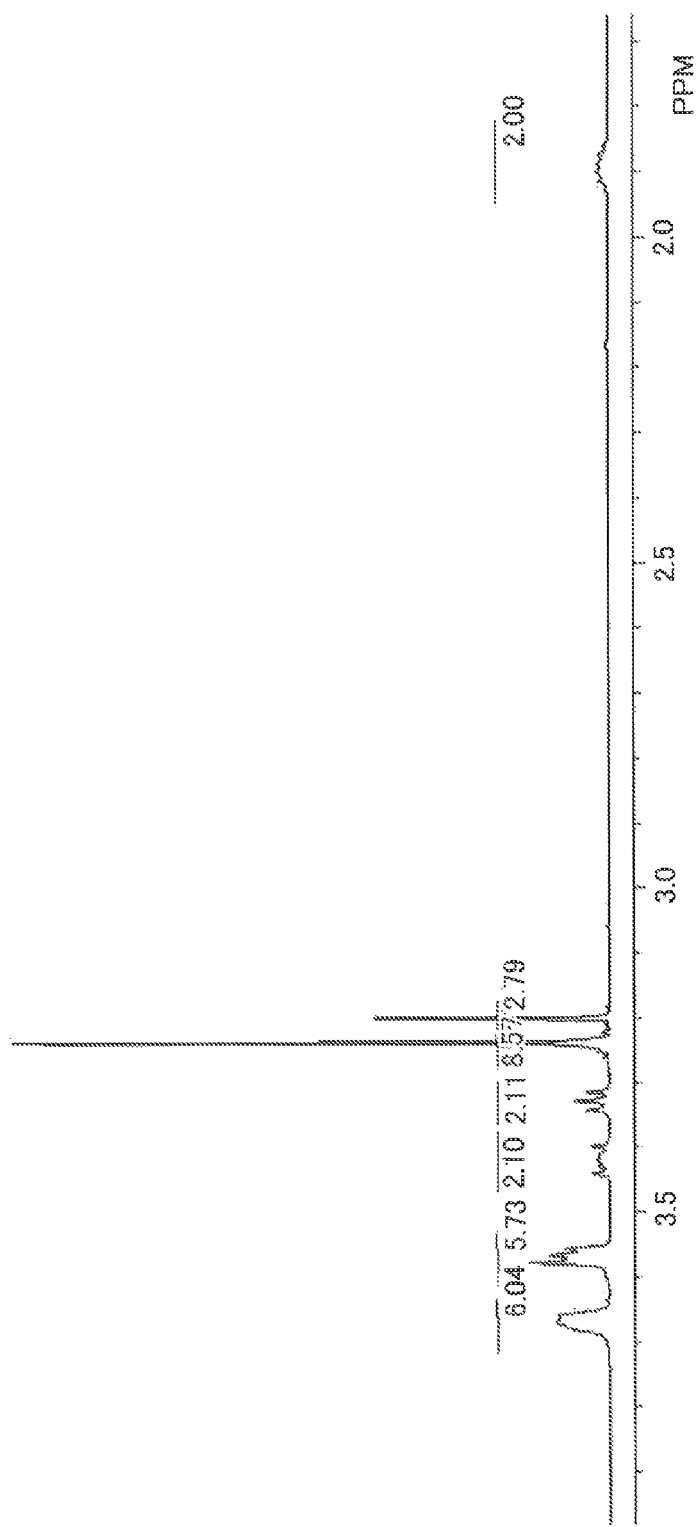
FIG. 14 is a chart illustrating $^1$H-NMR spectrum of electrolyte solvent [2-7].
Figure 15:
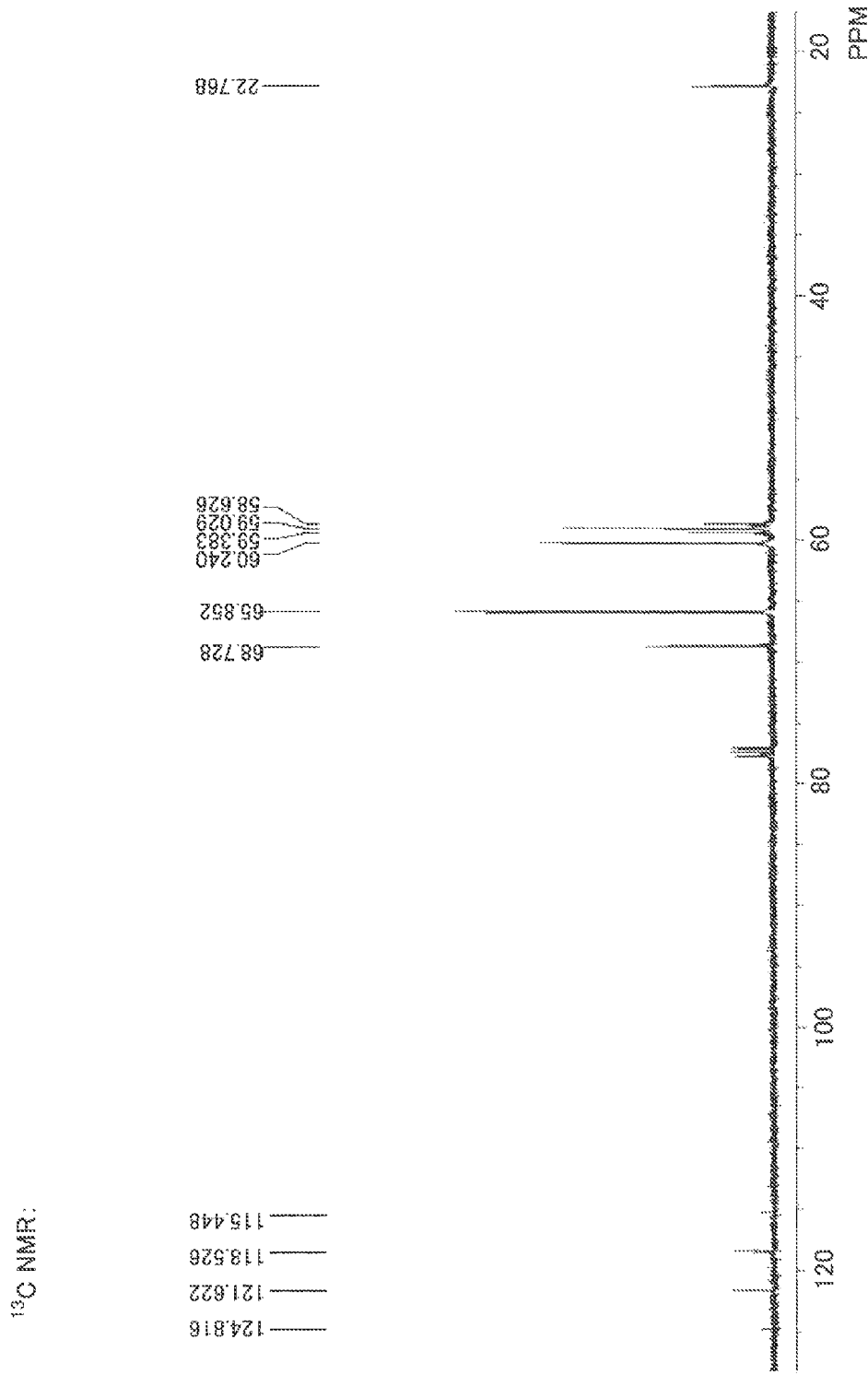
FIG. 15 is a chart illustrating $^{13}$C-NMR spectrum of electrolyte solvent [2-7].

N,N,N-tri-(2-methoxyethyl)amine (10.0 g, 52 mmol), 3-bromopropyl methyl ether (8.0 g, 52 mmol), and methanol (10 mL) were put into a flask of 250 mL, and held at reflux in a nitrogen atmosphere at 85 deg C. for 72 hours or more. Subsequent procedures are performed as in the case of ionic liquid [2-1]. FIG. 14 and FIG. 15 illustrate $^1$H-NMR and $^{13}$C-NMR of the ionic liquid that was synthesized. As illustrated in FIG. 14 and FIG. 15, details of chemical shifts are such that $^1$H-NMR, δ (ppm): 3.67-3.65 (m, 6H), 3.58-3.56(t, 6H), 3.44-3.40(m, 2H), 3.34-3.32(t, 2H), 3.24(s, 9H), 3.20(s, 3H), and 1.93-1.86(m, 2H), and $^{13}$C-NMR, δ (ppm): 124.82-115.45, 68.73, 65.85, 60.24, 59.38, 59.03, 58.63, and 22.77, and it was confirmed that N-3-methoxypropyl-N,N,N-tri-(2-methoxyethyl)ammonium bis(trifluoromethanesulfonyl) imide (ionic liquid [2-7]) was synthesized.

Example 3

Synthesis of Raw Material Amine

Synthesis of N,N-di-(2-methoxyethyl)-N-2-ethoxyetylamine

By using an autoclave of 100 mL, bis(2-methoxyethyl) amine (48.0 g, 360 mmol) was made reacted with chloroethyl ethyl ether (19.7 g, 181 mmol) at 145 deg C. for 48 hours. Solid salt that was formed in the reaction was removed by filtration, and remaining filtrate was subjected to reduced-pressure distillation by using a Vigreux column of 25 cm. By $^1$H-NMR measurement of the ionic liquid that was obtained by the distillation, there was obtained chemical shifts, δ (ppm), which are 3.50-3.42 (m, 8H), 3.31(s, 6H), 2.77-2.73(t, 6H), and 1.18-1.14(t, 3H), and it was confirmed that N,N-di-(2-methoxyethyl)-N-2-ethoxyetylamine was synthesized.

<Synthesis of Ionic Liquid>
(Synthesis of Ionic Liquid [3-1])

Figure 16:
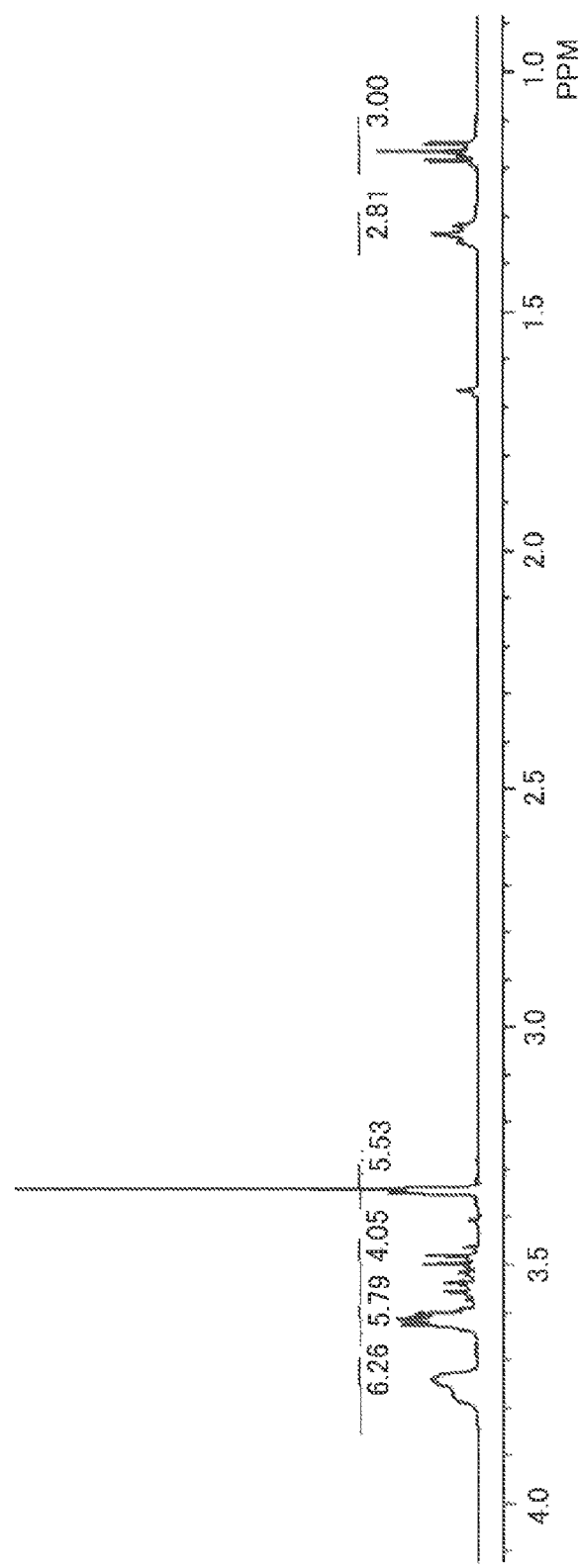
FIG. 16 is a chart illustrating $^1$H-NMR spectrum of electrolyte solvent [3-1].
Figure 17:
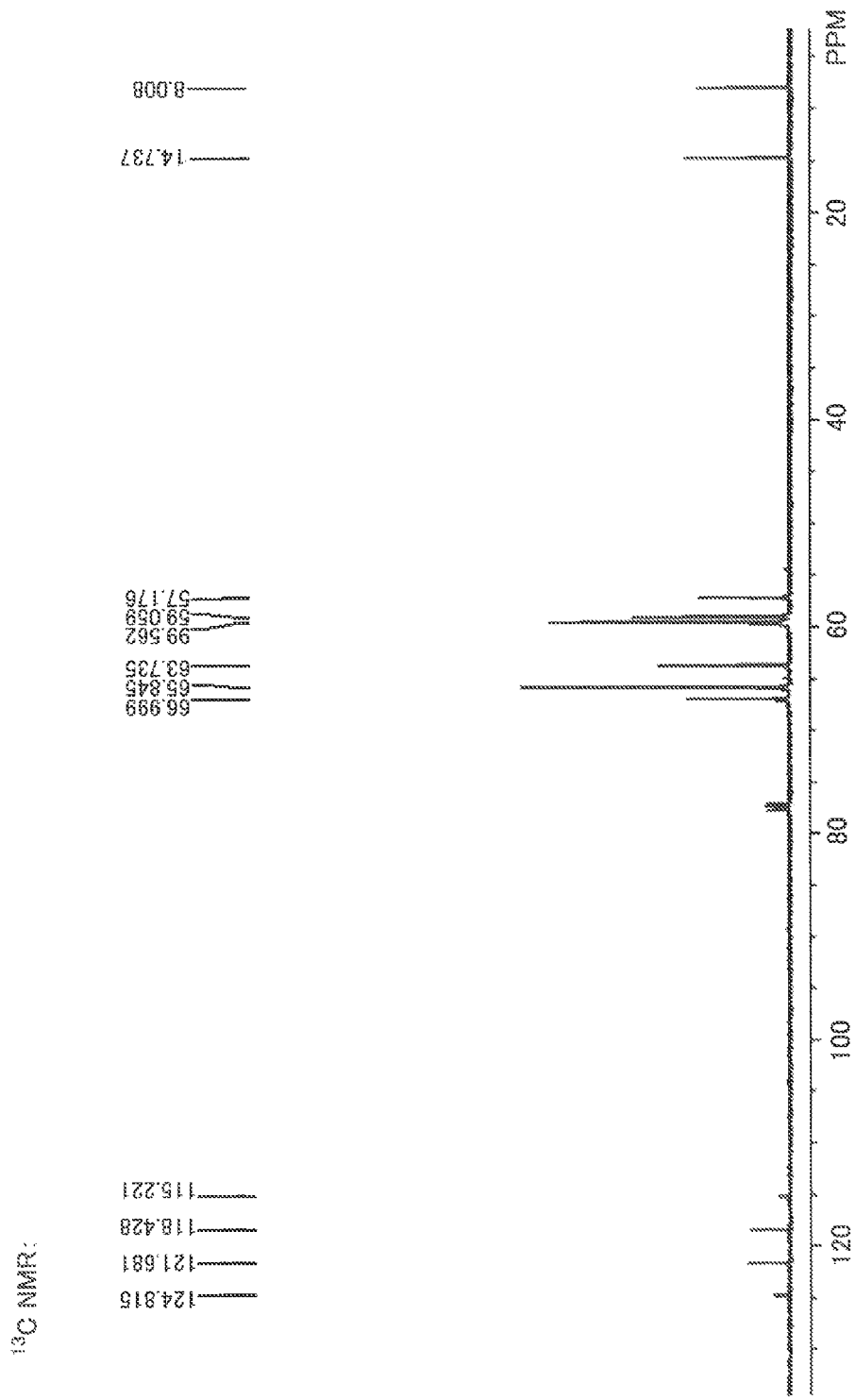
FIG. 17 is a chart illustrating $^{13}$C-NMR spectrum of electrolyte solvent [3-1].

In an autoclave of 50 mL, N,N-di-(2-methoxyethyl)-N-2-ethoxyethylamine (10.0 g, 49 mmol) was made reacted with bromoethane (11.0 g, 100 mmol) with methanol used as the solvent (10 mL) thereof at 65 deg C. for 48 hours. Subsequent procedures are performed as in the case of ionic liquid [2-1]. FIG. 16 and FIG. 17 illustrate $^1$H-NMR and $^{13}$C-NMR of the ionic liquid that was synthesized. As illustrated in FIG. 16 and FIG. 17, details of chemical shifts are such that $^1$H-NMR, δ (ppm): 3.77-3.74(m, 6H), 3.63-3.60(t, 6H), 3.57-3.46(m, 4H), 3.34(s, 6H), 1.36-1.32(t, 3H), and 1.18-1.15(t, 3H), and $^{13}$C-NMR, δ (ppm): 124.82-115.22, 67.00, 66.85, 63.74, 59.56, 59.06, 57.18, 14.74, and 8.01, and it was confirmed that N-ethyl-N,N-di-(2-methoxyethyl)-N-2-ethoxyethylammonium bis(trifluoromethanesulfonyl)imide [ionic liquid [3-1]] was synthesized.

(Synthesis of Ionic Liquid [3-2])

Figure 18:
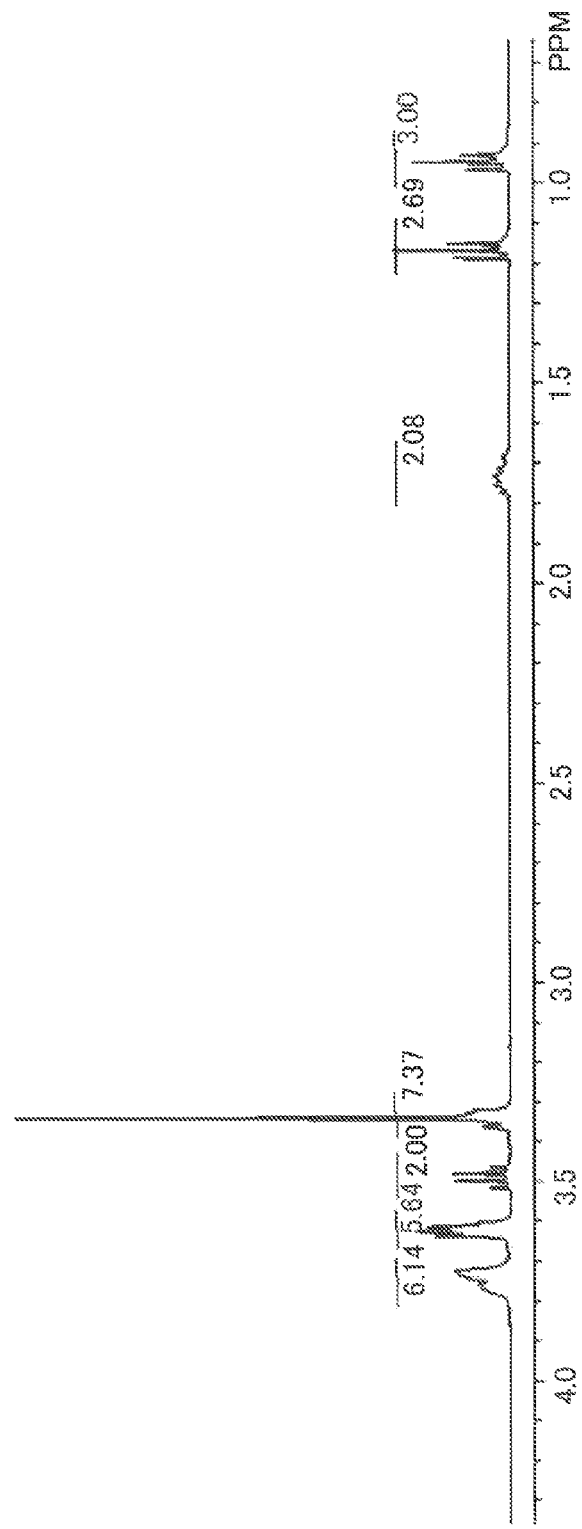
FIG. 18 is a chart illustrating $^1$H-NMR spectrum of electrolyte solvent [3-2].
Figure 19:
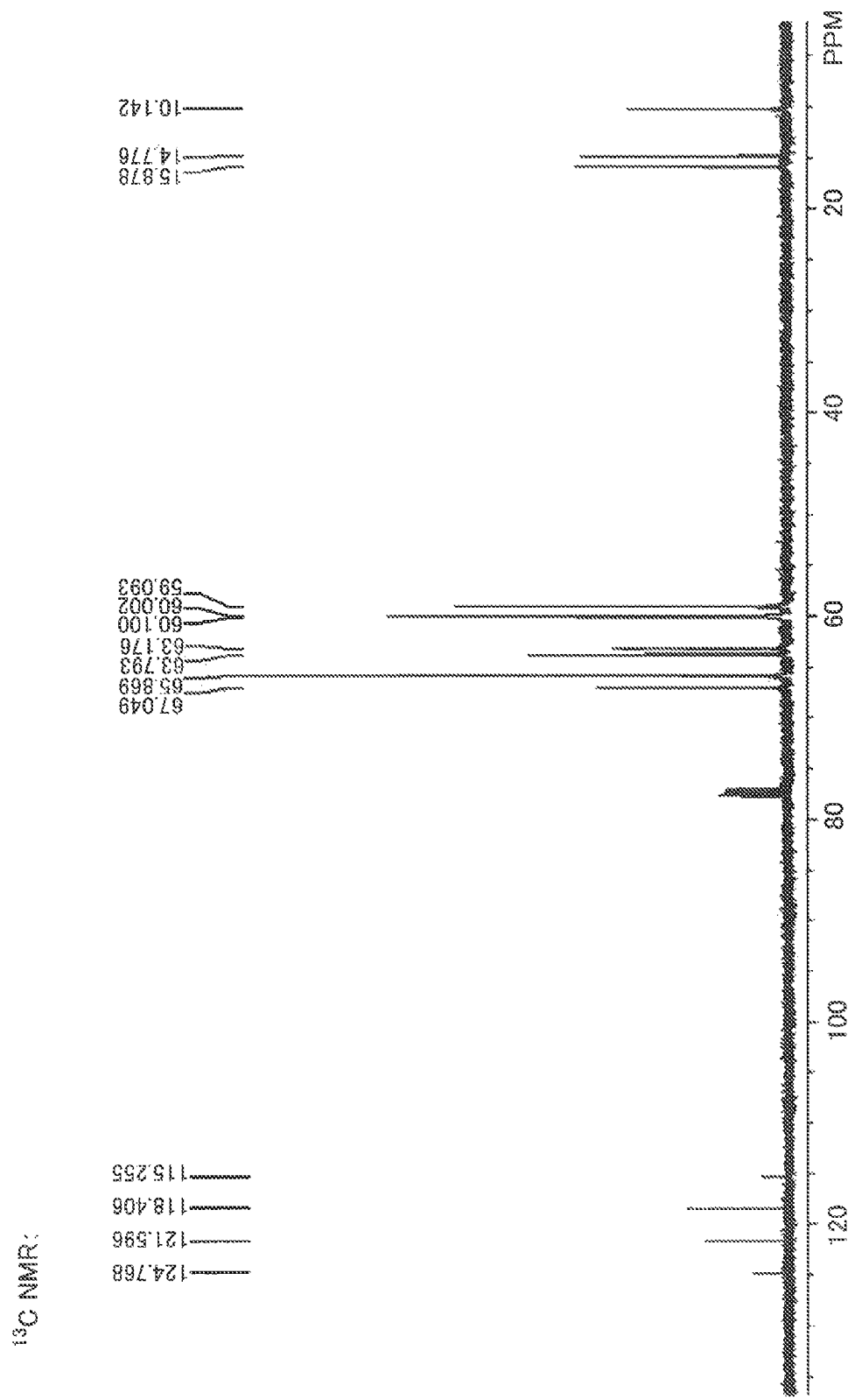
FIG. 19 is a chart illustrating $^{13}$C-NMR spectrum of electrolyte solvent [3-2].

In an autoclave of 50 mL, N,N-di-(2-methoxyethyl)-N-2-ethoxyethylamine (10.0 g, 49 mmol) was made reacted with 1-bromopropane (13.0 g, 106 mmol) with methanol used as the solvent (10 mL) thereof at 80 deg C. for 72 hours. Subsequent procedures are performed as in the case of ionic liquid [2-1]. FIG. 18 and FIG. 19 illustrate $^1$H-NMR and $^{13}$C-NMR of the ionic liquid that was synthesized. As illustrated in FIG. 18 and FIG. 19, details of chemical shifts are such that $^1$H-NMR, δ (ppm): 3.77-3.72 (m, 6H), 3.64-3.62(t, 6H), 3.52-3.46(m, 2H), 3.36-3.32(m, 8H), 1.77-1.68(m, 2H), 1.19-1.15(t, 3H), and 0.97-0.93(t, 3H), and $^{13}$C-NMR, δ (ppm): 124.77-115.26, 67.05, 65.87, 63.79, 63.18, 60.10, 60.00, 59.09, 15.88, 14.78, and 10.14, and it was confirmed that N-propyl-N,N-di-(2-methoxyethyl)-N-2-ethoxyethylammonium bis(trifluoromethanesulfonyl)imide (ionic liquid [3-2]) was synthesized.

(Synthesis of Ionic Liquid [3-3])

Figure 20:
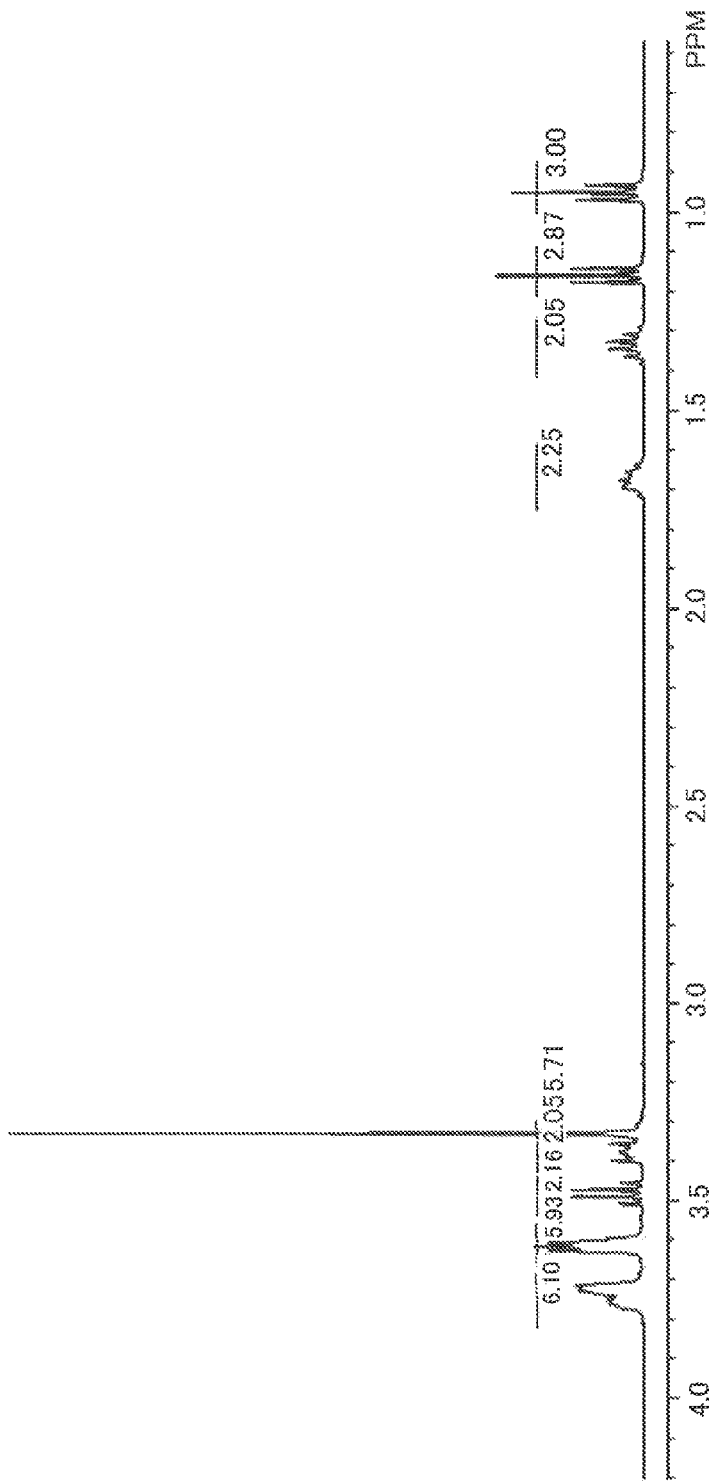
FIG. 20 is a chart illustrating $^1$H-NMR spectrum of electrolyte solvent [3-3].

N,N-di-(2-methoxyethyl)-N-2-ethoxyethylamine (10.0 g, 49 mmol), 1-bromobutane (14.0 g, 102 mmol), and methanol (10 mL) were put into a flask of 250 mL, and held at reflux in a nitrogen atmosphere at 85 deg C. for 72 hours or more. Bromide that was produced was washed with ether. After washing, bromide was recrystallized two times from ethyl acetate, and then dried in a vacuum at 60 deg C. Subsequent procedures are performed as in the case of ionic liquid [2-1]. FIG. 20 illustrates $^1$H-NMR of the ionic liquid that was synthesized. As illustrated in FIG. 20, details of chemical shifts are such that $^1$H-NMR, δ (ppm): 3.76-3.72(m, 6H), 3.63-3.60 (m, 6H), 3.51-3.46(m, 2H), 3.40-3.36(m, 2H), 3.33(s, 6H), 1.72-1.64(m, 2H), 1.38-1.29(m, 2H), 1.18-1.14(t, 3H), and 0.97-0.93(t, 3H), and it was confirmed that N-butyl-N,N-di-(2-methoxyethyl)-N-2-ethoxyethylammonium bis(trifluoromethanesulfonyl)imide (ionic liquid [3-3]) was synthesized.

(Synthesis of Ionic Liquid [3-4])

Figure 21:
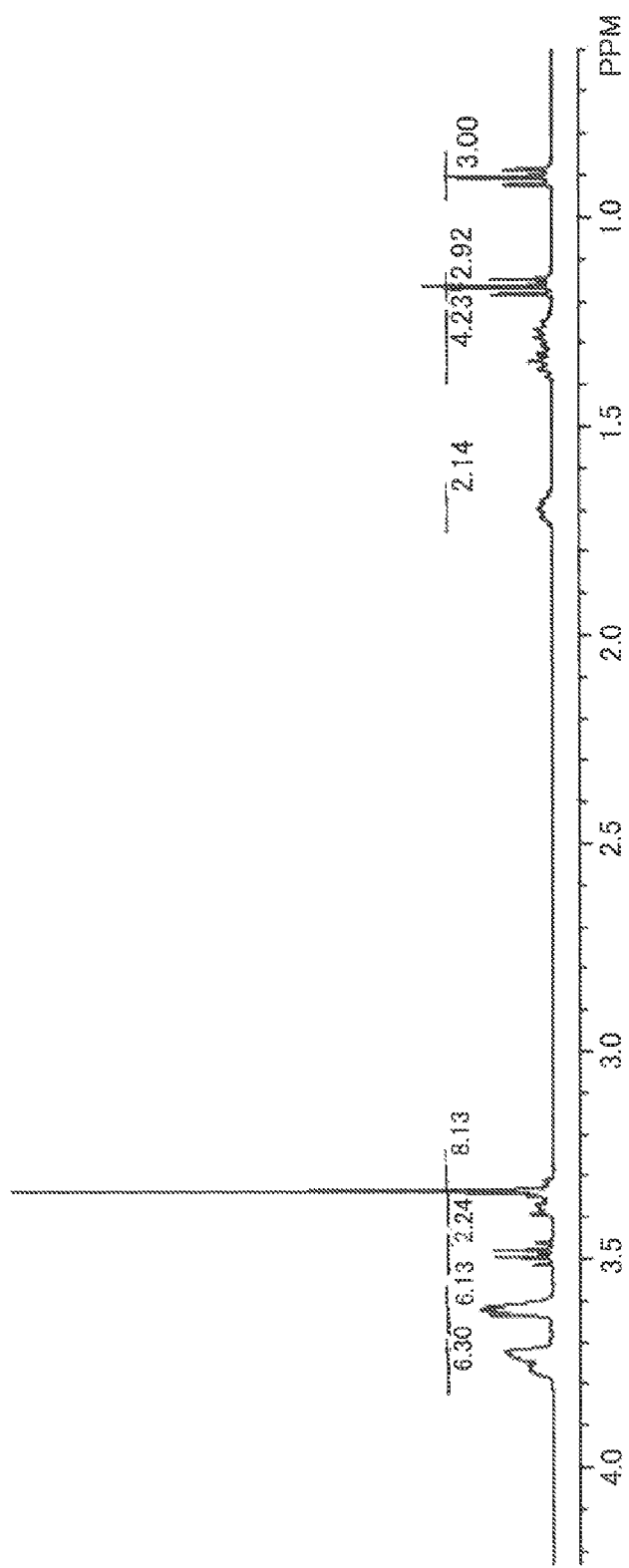
FIG. 21 is a chart illustrating $^1$H-NMR spectrum of electrolyte solvent [3-4].
Figure 22:
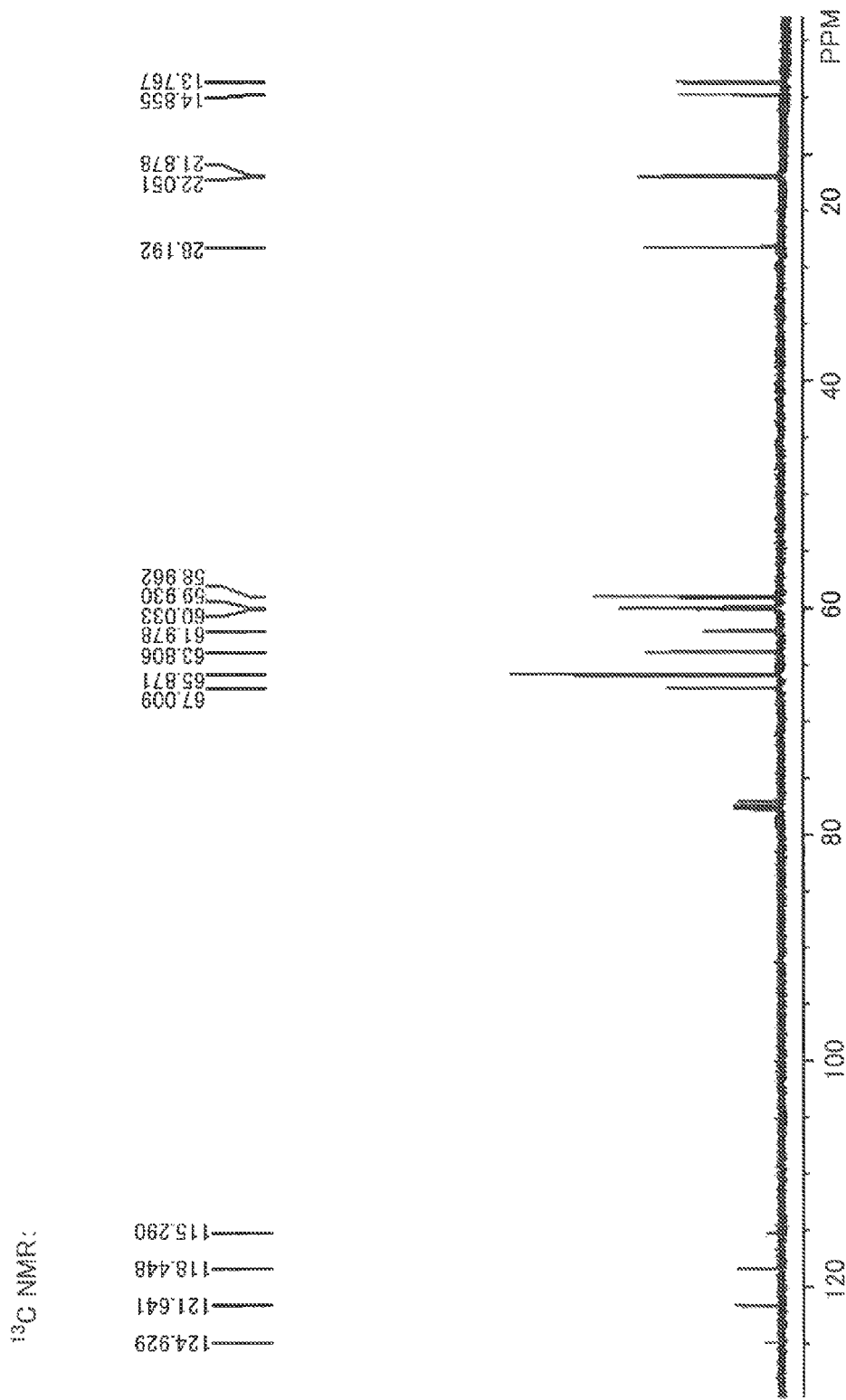
FIG. 22 is a chart illustrating $^{13}$C-NMR spectrum of electrolyte solvent [3-4].

N,N-di-(2-methoxyethyl)-N-2-ethoxyethylamine (10.0 g, 49 mmol), 1-bromopentane (15.0 g, 99 mmol), and methanol (10 mL) were put into a flask of 250 mL, and held at reflux in a nitrogen atmosphere at 85 deg C. for 72 hours or more. Subsequent procedures are performed as in the case of ionic liquid [2-1]. FIG. 21 and FIG. 22 illustrate $^1$H-NMR and $^{13}$C-NMR of the ionic liquid that was synthesized. As illustrated in FIG. 21 and FIG. 22, details of chemical shifts are such that $^1$H-NMR, δ (ppm): 3.77-3.72(m, 6H), 3.63-3.60(m, 6H), 3.51-3.46(m, 2H), 3.39-3.31(m, 8H), 1.74-1.66(m, 2H), 1.38-1.25(m, 4H), 1.18-1.15(t, 3H), and 0.92-0.89(t, 3H), and $^{13}$C-NMR, δ (ppm): 124.93-115.29, 67.01, 65.87, 63.81, 61.98, 60.03, 59.93, 58.96, 28.19, 22.05, 21.88, 14.86, and 13.77, and it was confirmed that N-amyl-N,N-di-(2-methoxyethyl)-N-2-ethoxyethylammonium bis(trifluoromethanesulfonyl)imide (ionic liquid [3-4]) was synthesized.

(Synthesis of Ionic Liquid [3-5])

Figure 23:
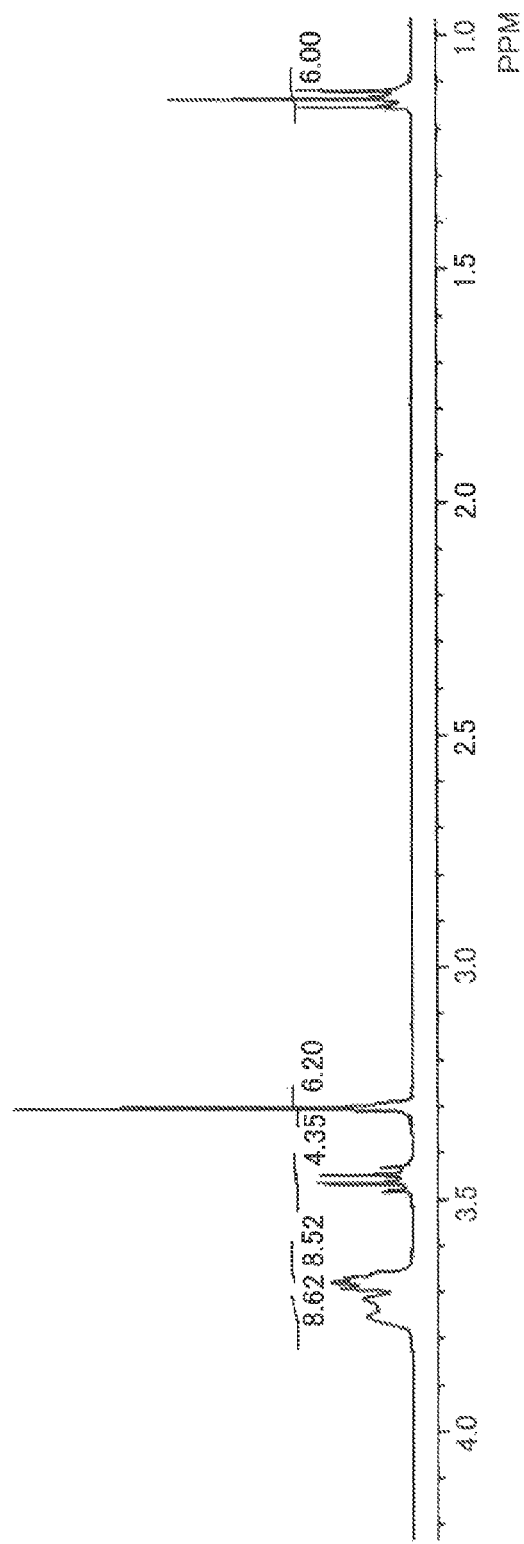
FIG. 23 is a chart illustrating $^1$H-NMR spectrum of electrolyte solvent [3-5].
Figure 24:
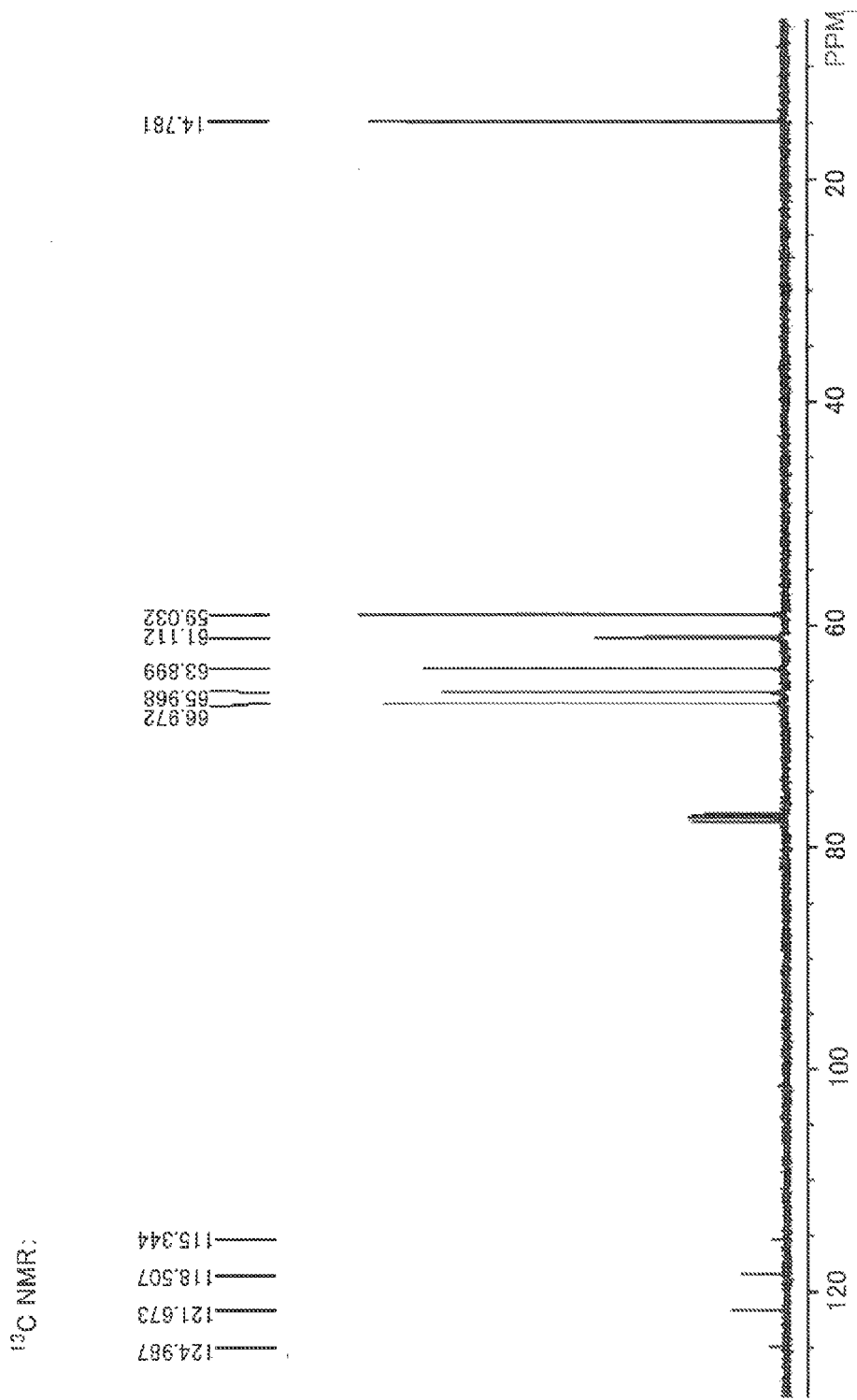
FIG. 24 is a chart illustrating $^{13}$C-NMR spectrum of electrolyte solvent [3-5].

N,N-di-(2-methoxyethyl)-N-2-ethoxyethylamine (10.0 g, 49 mmol), 2-bromoethyl ethyl ether (9.0 g, 59 mmol), and methanol (10 mL) were put into a flask of 250 mL, and held at reflux in a nitrogen atmosphere at 85 deg C. for 72 hours or more. Subsequent procedures are performed as in the case of ionic liquid [2-1]. FIG. 23 and FIG. 24 illustrate $^1$H-NMR and $^{13}$C-NMR of the ionic liquid that was synthesized. As illustrated in FIG. 23 and FIG. 24, details of chemical shifts are such that $^1$H-NMR, δ (ppm): 3.75-3.71(m, 8H), 3.69-3.66(m, 8H), 3.48-3.43(m, 4H), 3.31(s, 6H), and 1.16-1.12(t, 6H), and $^{13}$C-NMR, δ (ppm): 124.99-115.34, 66.97, 65.97, 63.90, 61.11, 59.03, and 14.78, and it was confirmed that N,N-di-(2-methoxyethyl)-N,N-di-(2-ethoxyethyl)ammonium bis(trifluoromethanesulfonyl)imide (ionic liquid [3-5]) was synthesized.

(Synthesis of Ionic Liquid [3-6])

Figure 25:
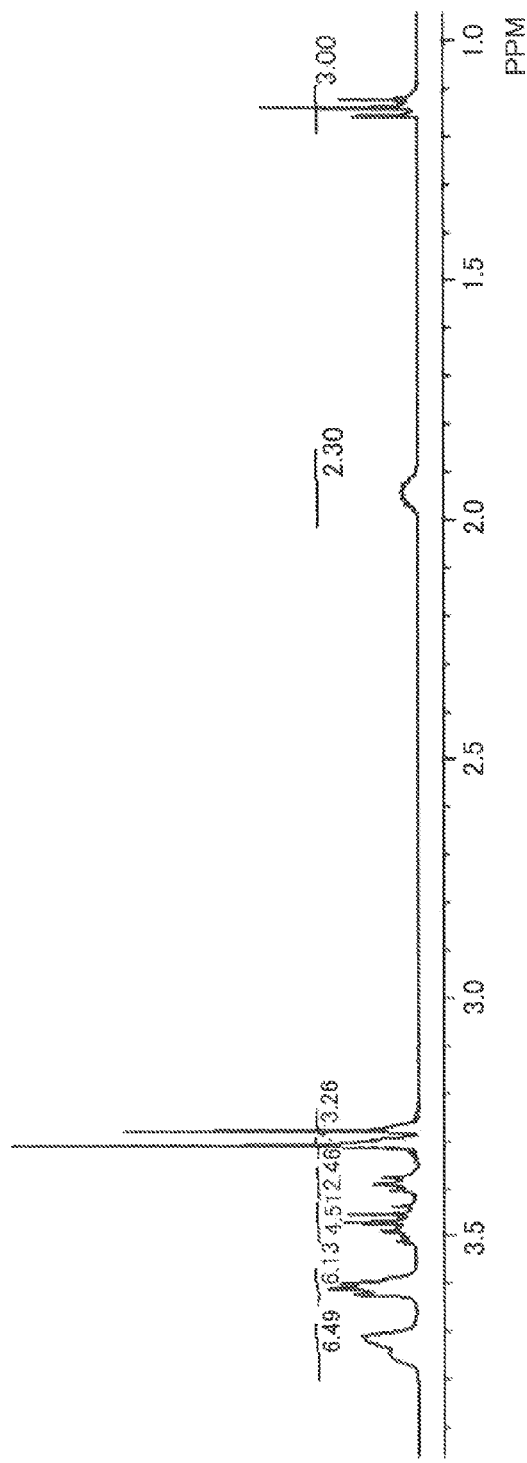
FIG. 25 is a chart illustrating $^1$H-NMR spectrum of electrolyte solvent [3-6].
Figure 26:
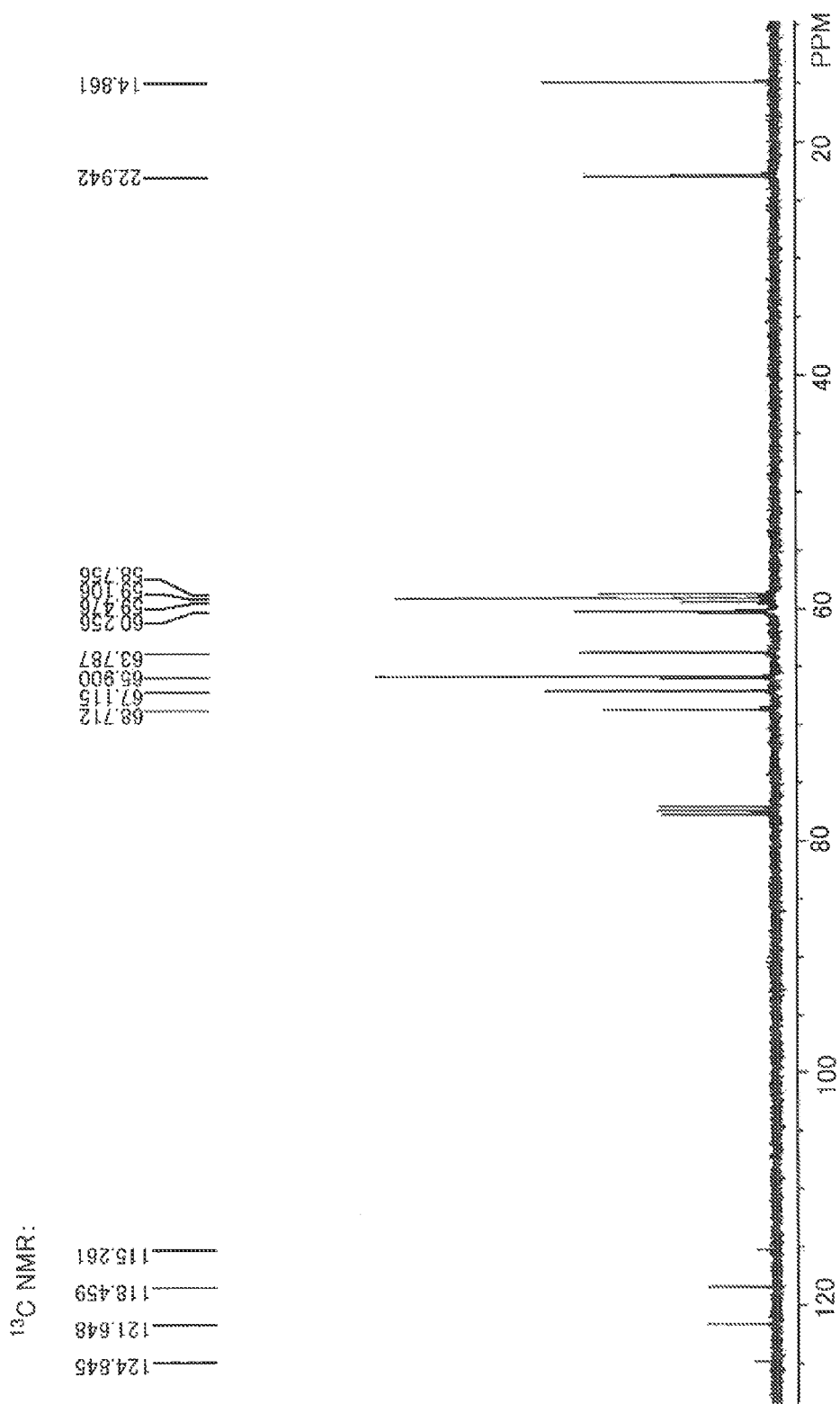
FIG. 26 is a chart illustrating $^{13}$C-NMR spectrum of electrolyte solvent [3-6].
Figure 27:
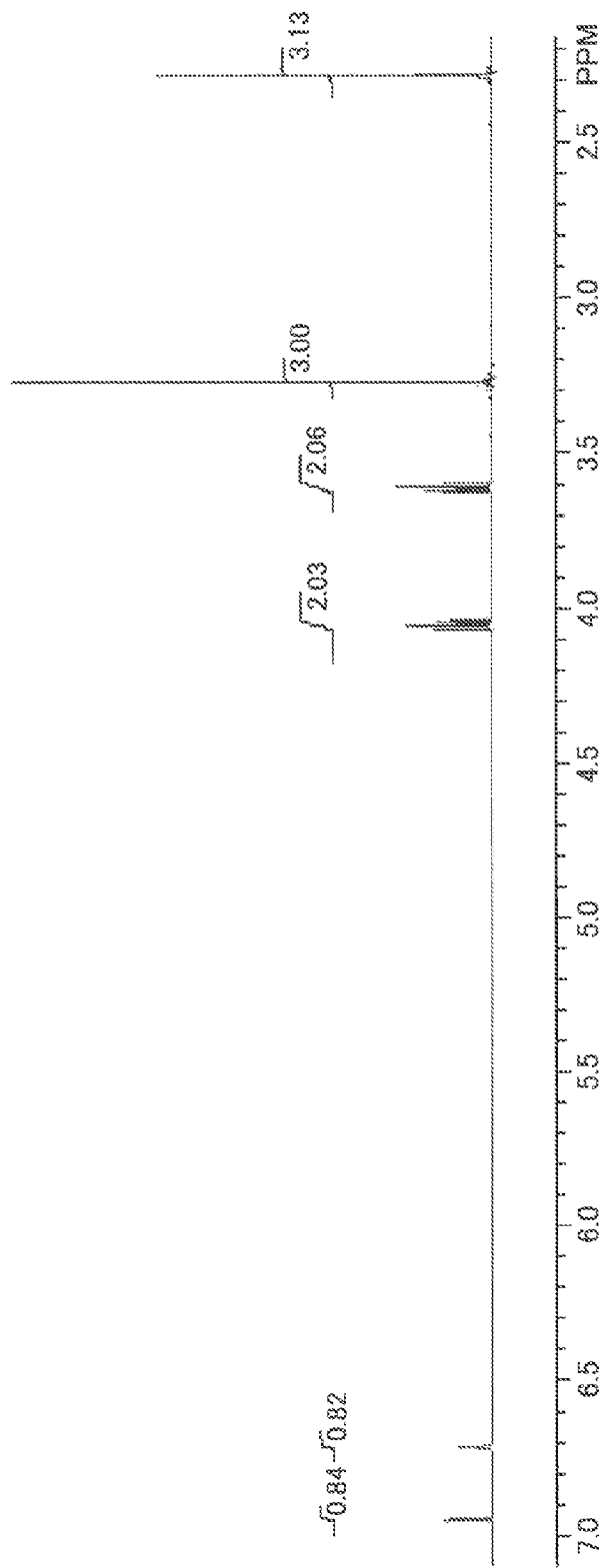
FIG. 27 is a chart illustrating $^1$H-NMR spectrum of raw material amine, 1-(2-methoxyethyl)-2-methylimidazole, of Example 4.
Figure 28:
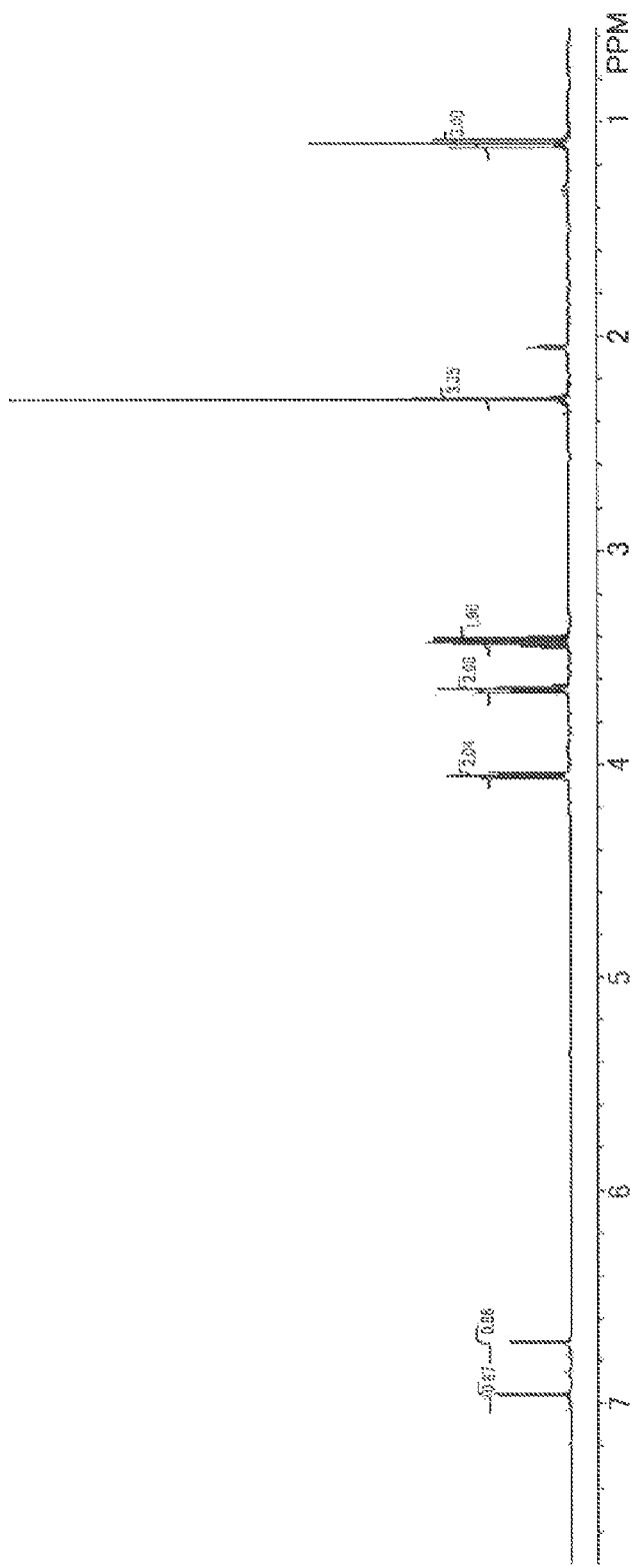
FIG. 28 is a chart illustrating $^1$H-NMR spectrum of raw material amine, 1-(2-ethoxyethyl)-2-methylimidazole, of Example 4.
Figure 29:
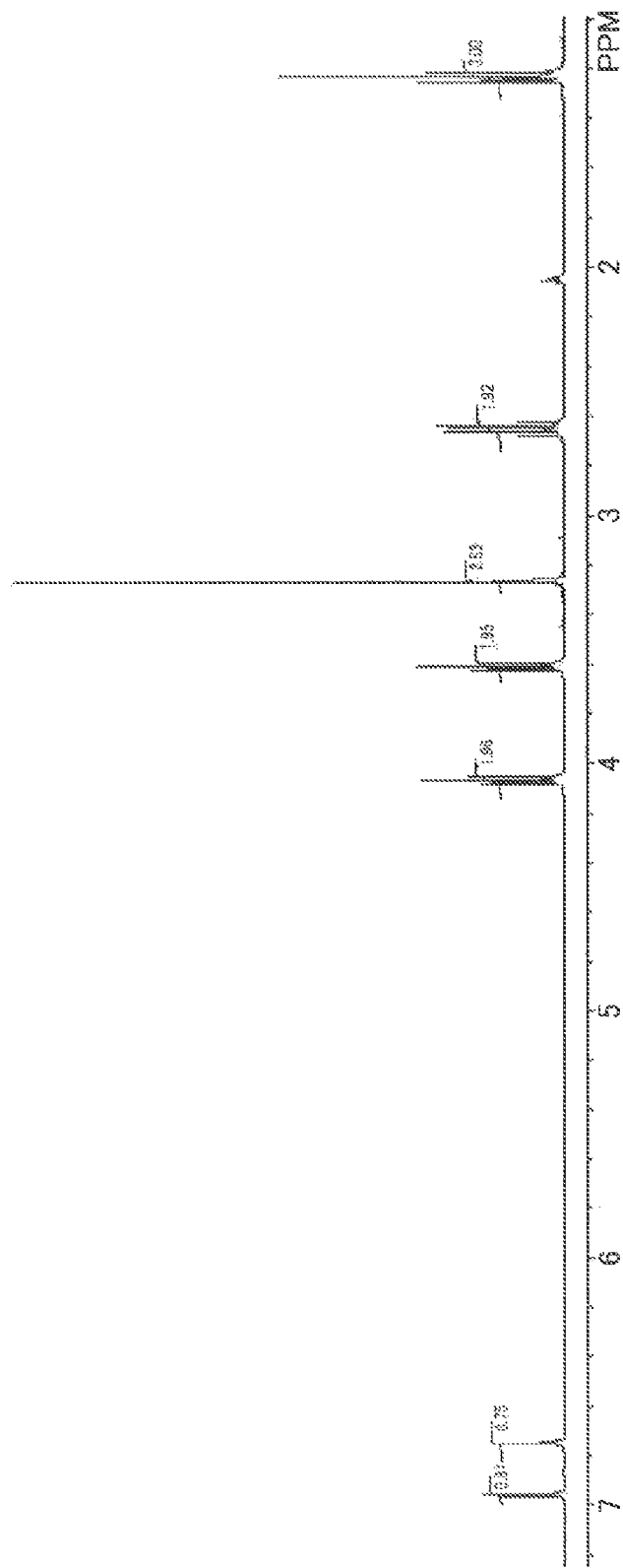
FIG. 29 is a chart illustrating $^1$H-NMR spectrum of raw material amine, 1-(2-methoxyethyl)-2-ethylimidazole, of Example 4.
Figure 30:
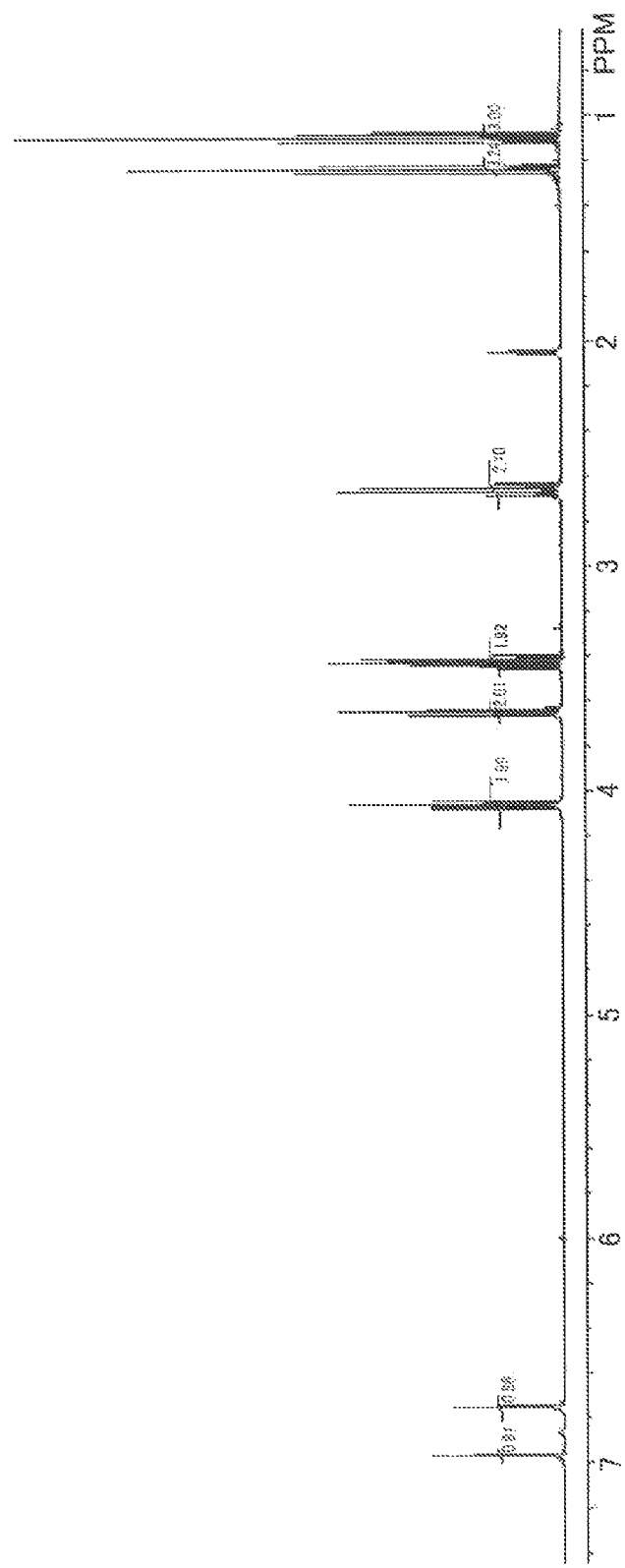
FIG. 30 is a chart illustrating $^1$H-NMR spectrum of raw material amine, 1-(2-ethoxyethyl)-2-ethylimidazole, of Example 4.
Figure 31:
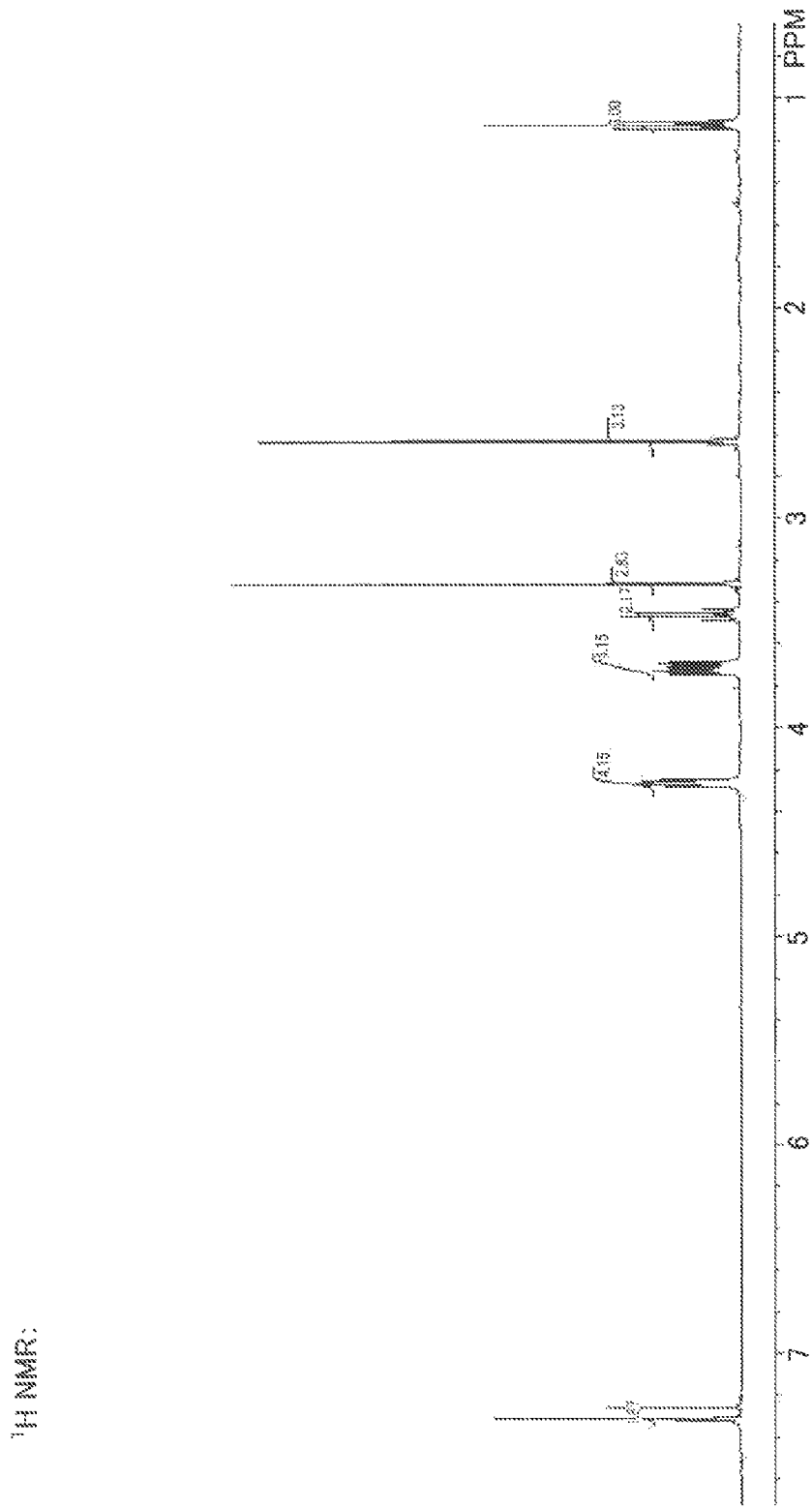
FIG. 31 is a chart illustrating $^1$H-NMR spectrum of electrolyte solvent [4-1].
Figure 32:
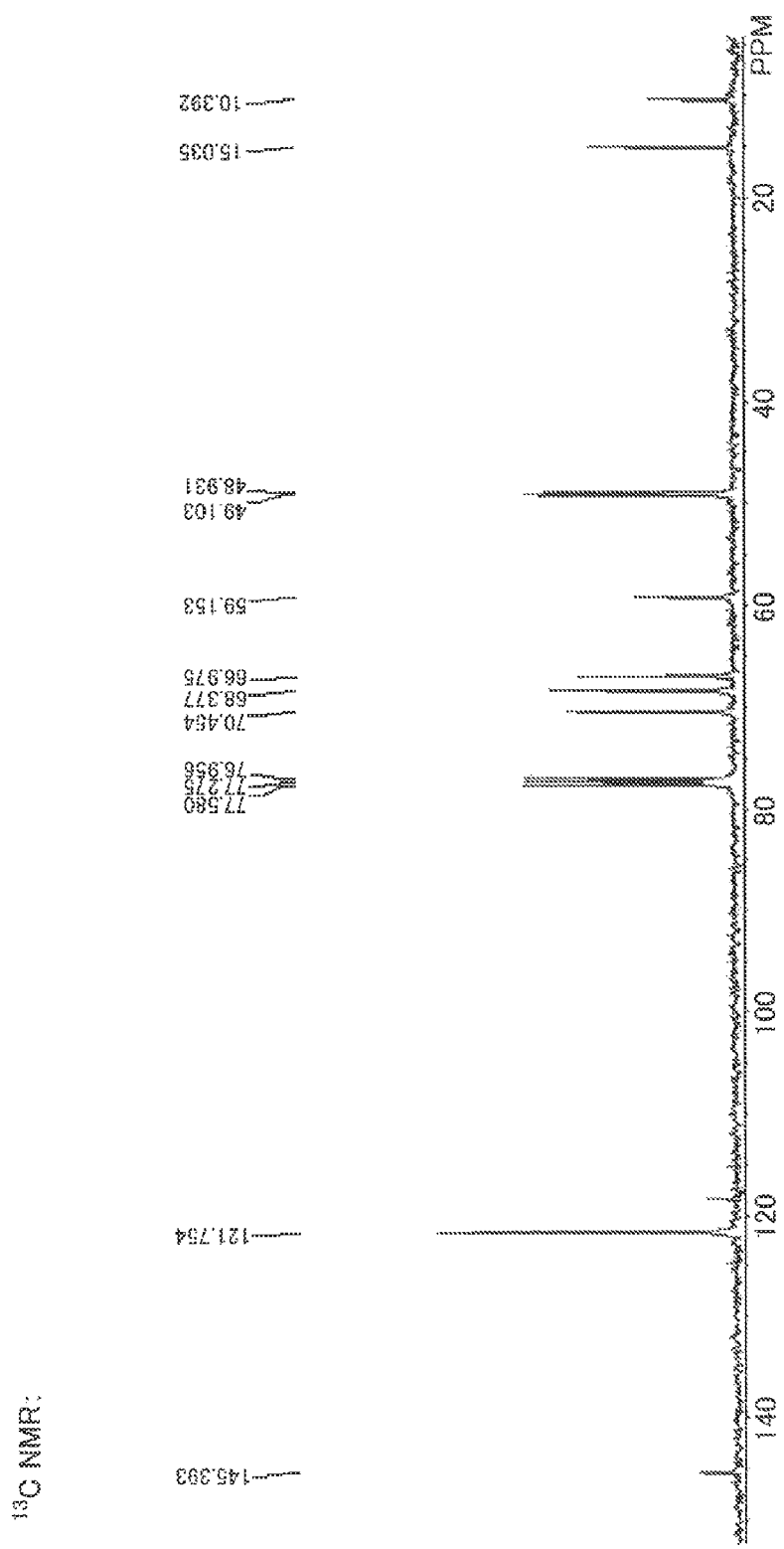
FIG. 32 is a chart illustrating $^{13}$C-NMR spectrum of electrolyte solvent [4-1].
Figure 33:
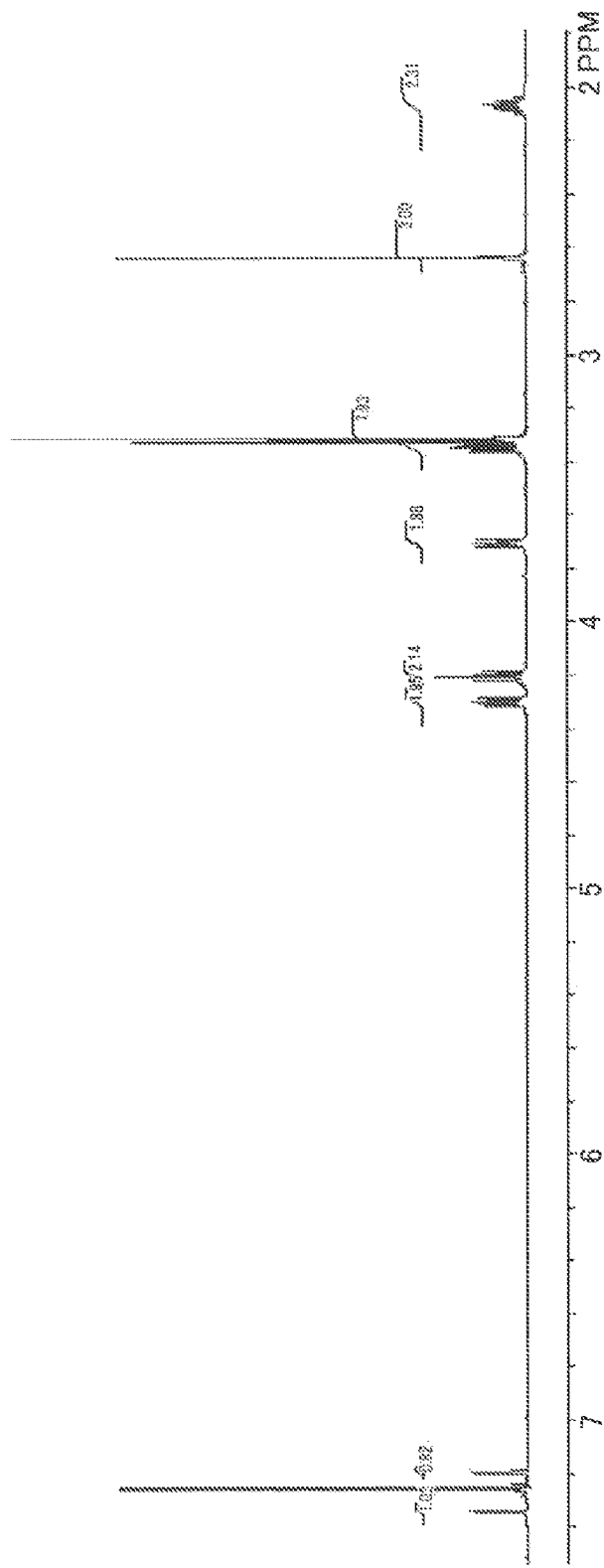
FIG. 33 is a chart illustrating $^1$H-NMR spectrum of electrolyte solvent [4-2].
Figure 34:
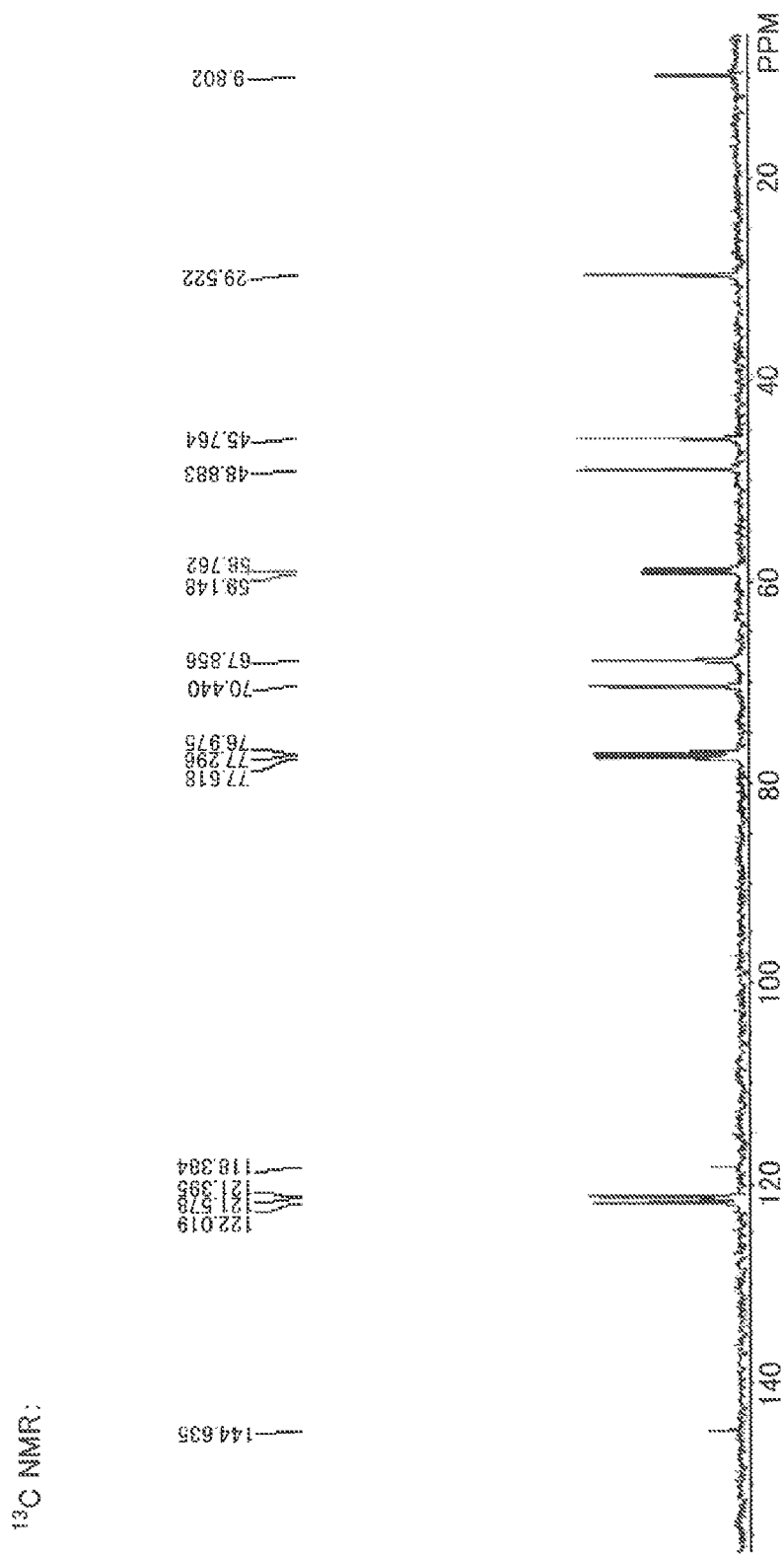
FIG. 34 is a chart illustrating $^{13}$C-NMR spectrum of electrolyte solvent [4-2].
Figure 35:
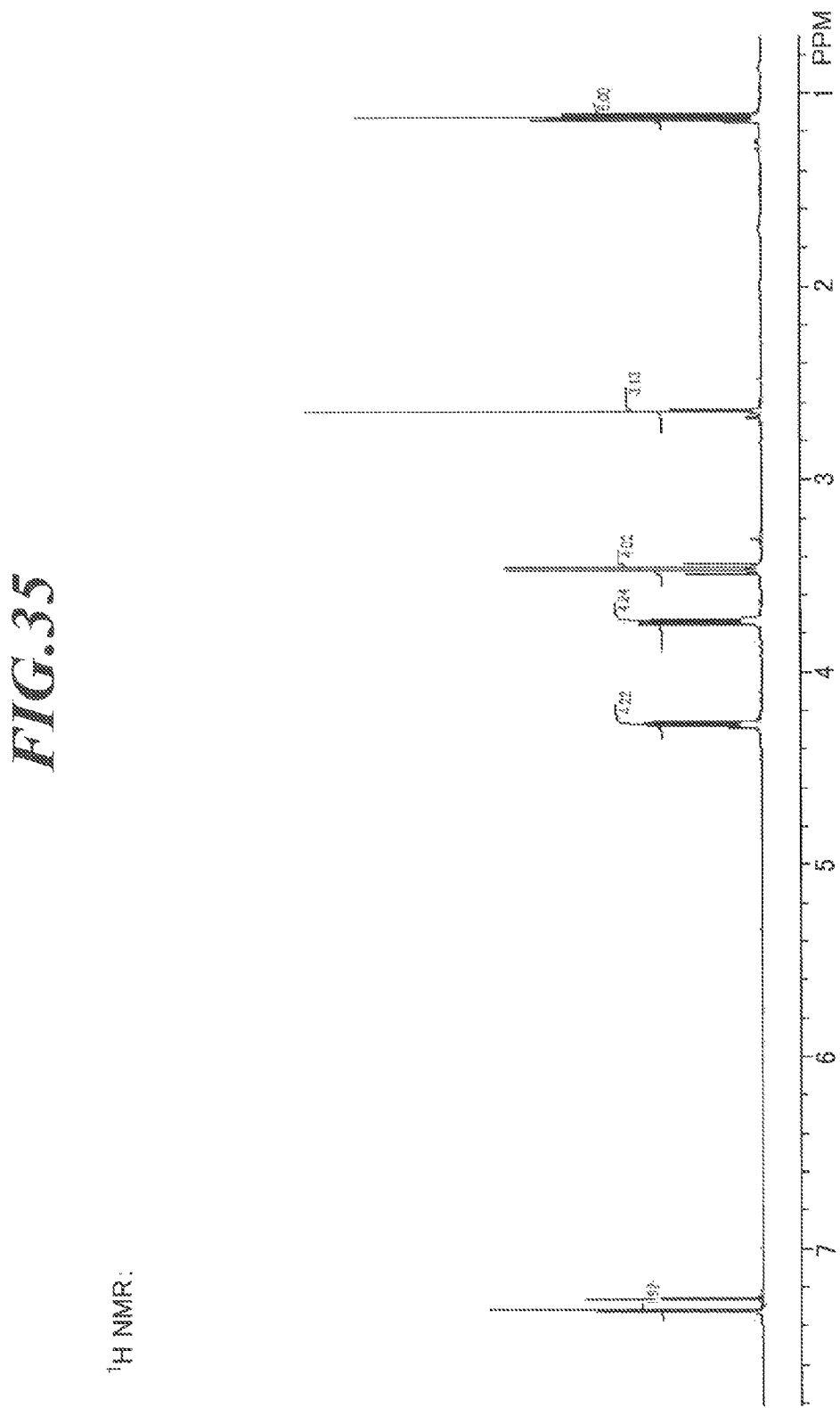
FIG. 35 is a chart illustrating $^1$H-NMR spectrum of electrolyte solvent [4-3].
Figure 36:
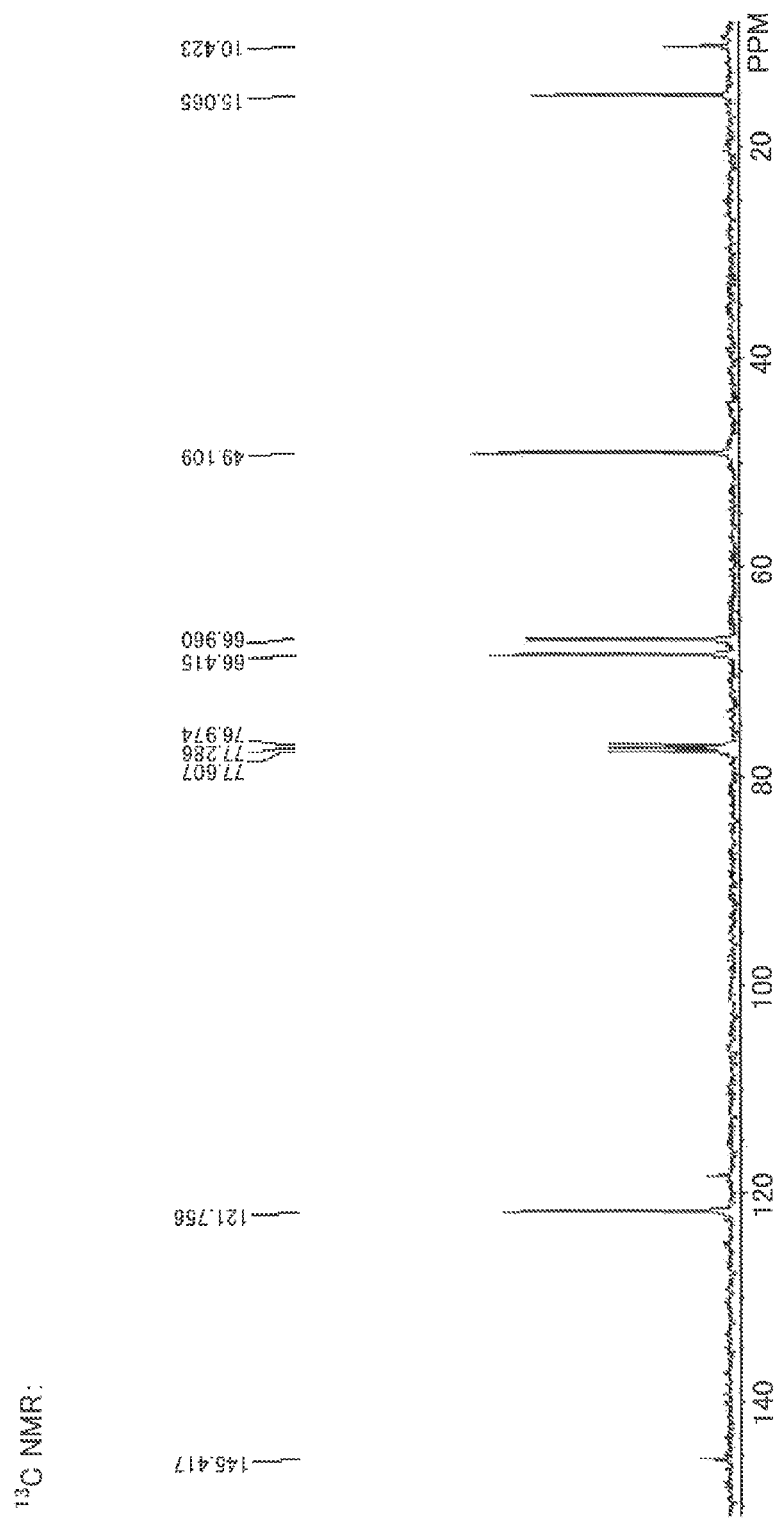
FIG. 36 is a chart illustrating $^{13}$C-NMR spectrum of electrolyte solvent [4-3].
Figure 37:
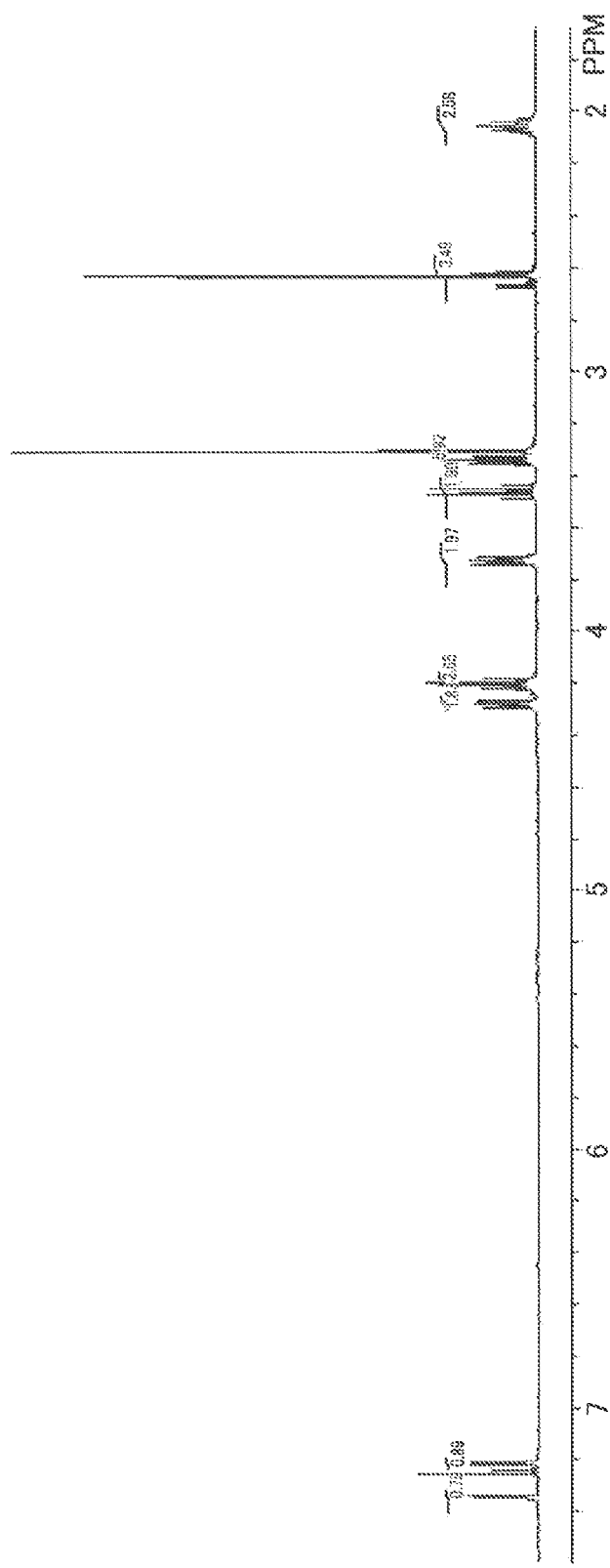
FIG. 37 is a chart illustrating $^1$H-NMR spectrum of electrolyte solvent [4-4].
Figure 38:
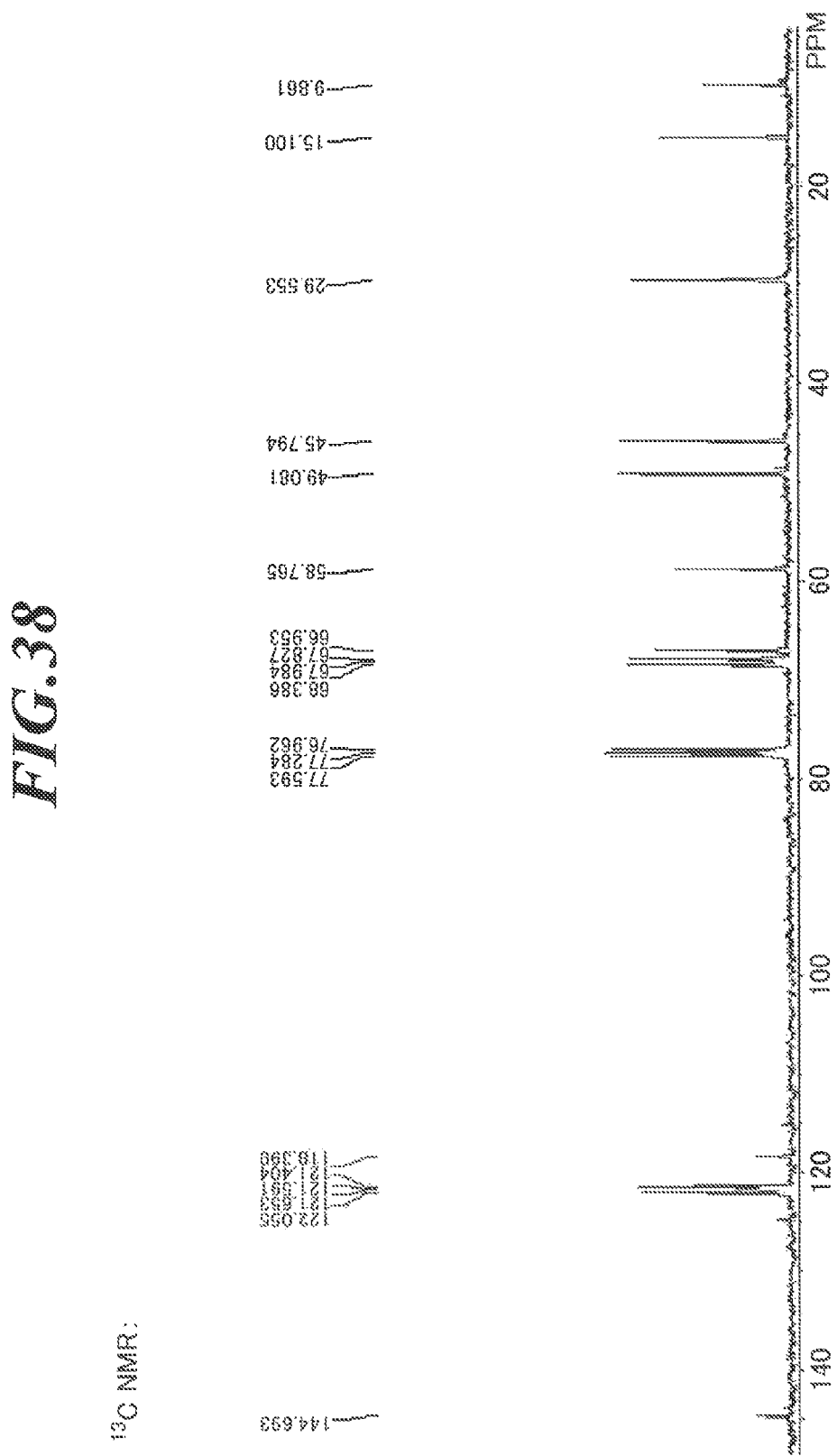
FIG. 38 is a chart illustrating $^{13}$C-NMR spectrum of electrolyte solvent [4-4].
Figure 39:
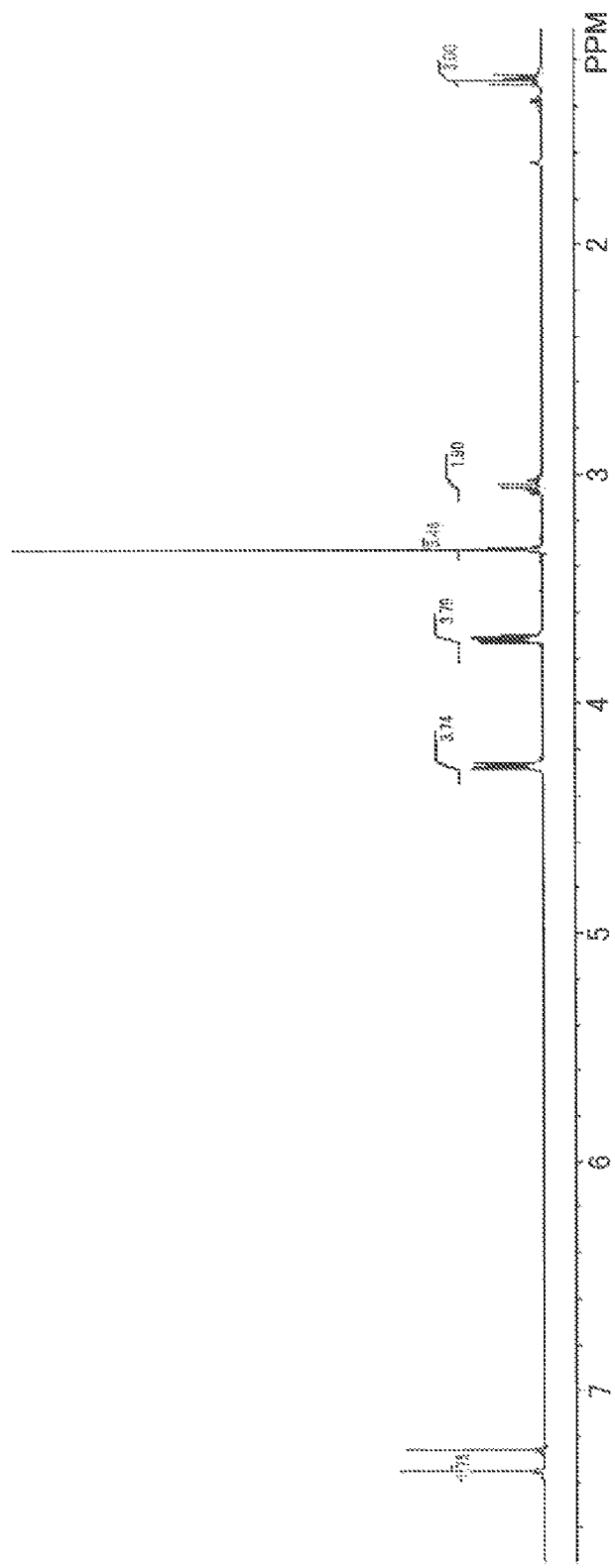
FIG. 39 is a chart illustrating $^1$H-NMR spectrum of electrolyte solvent [4-5].
Figure 40:
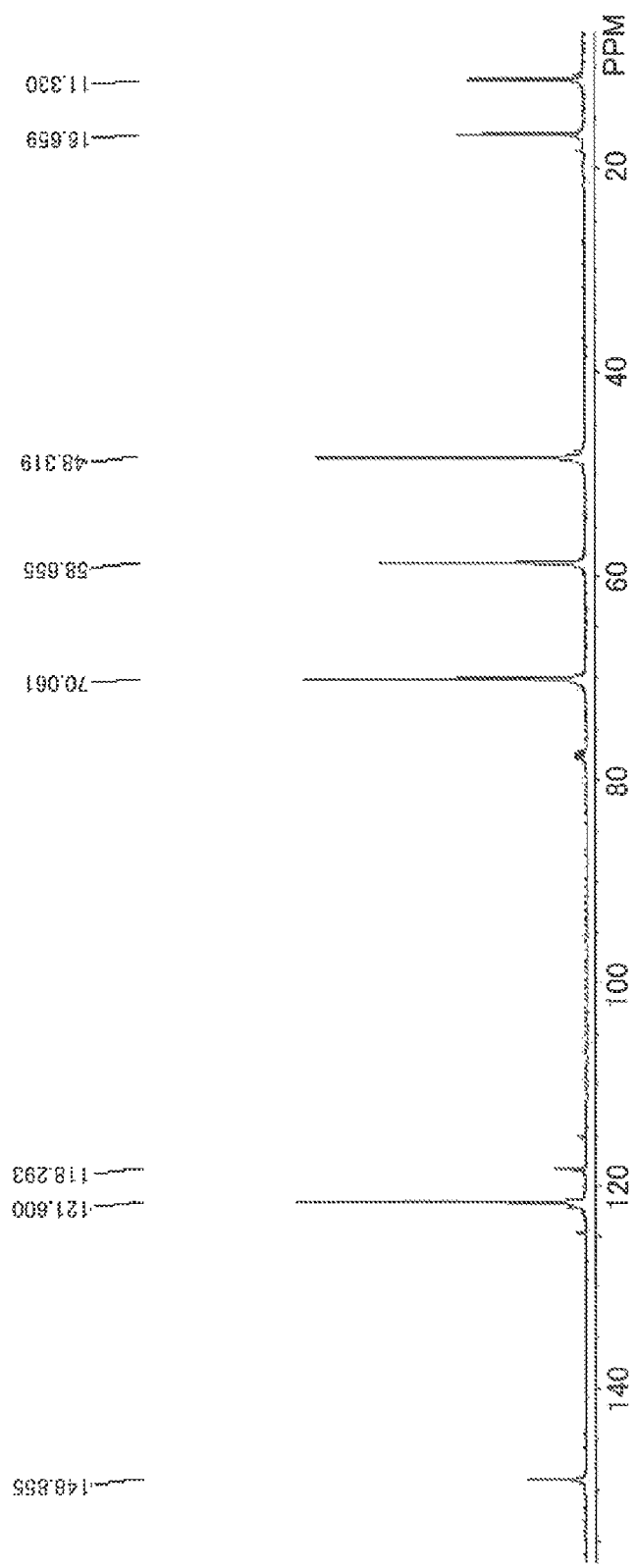
FIG. 40 is a chart illustrating $^{13}$C-NMR spectrum of electrolyte solvent [4-5].
Figure 41:
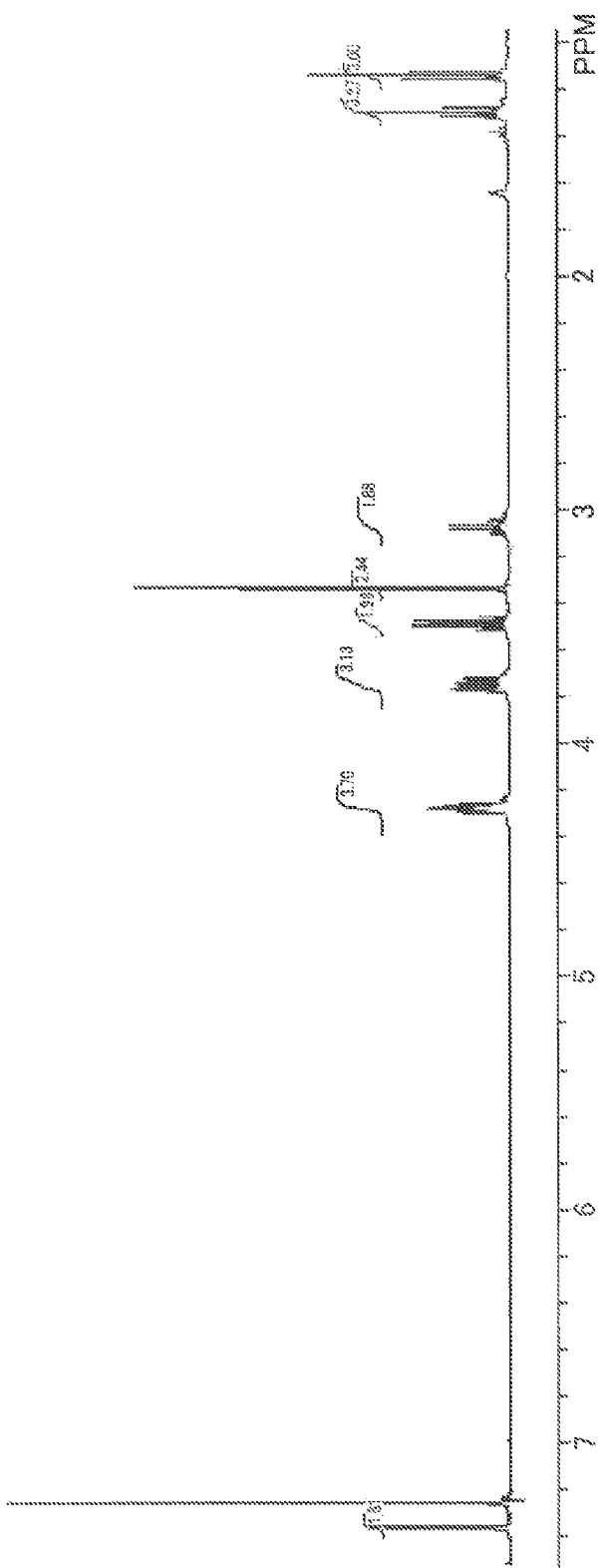
FIG. 41 is a chart illustrating $^1$H-NMR spectrum of electrolyte solvent [4-6].
Figure 42:
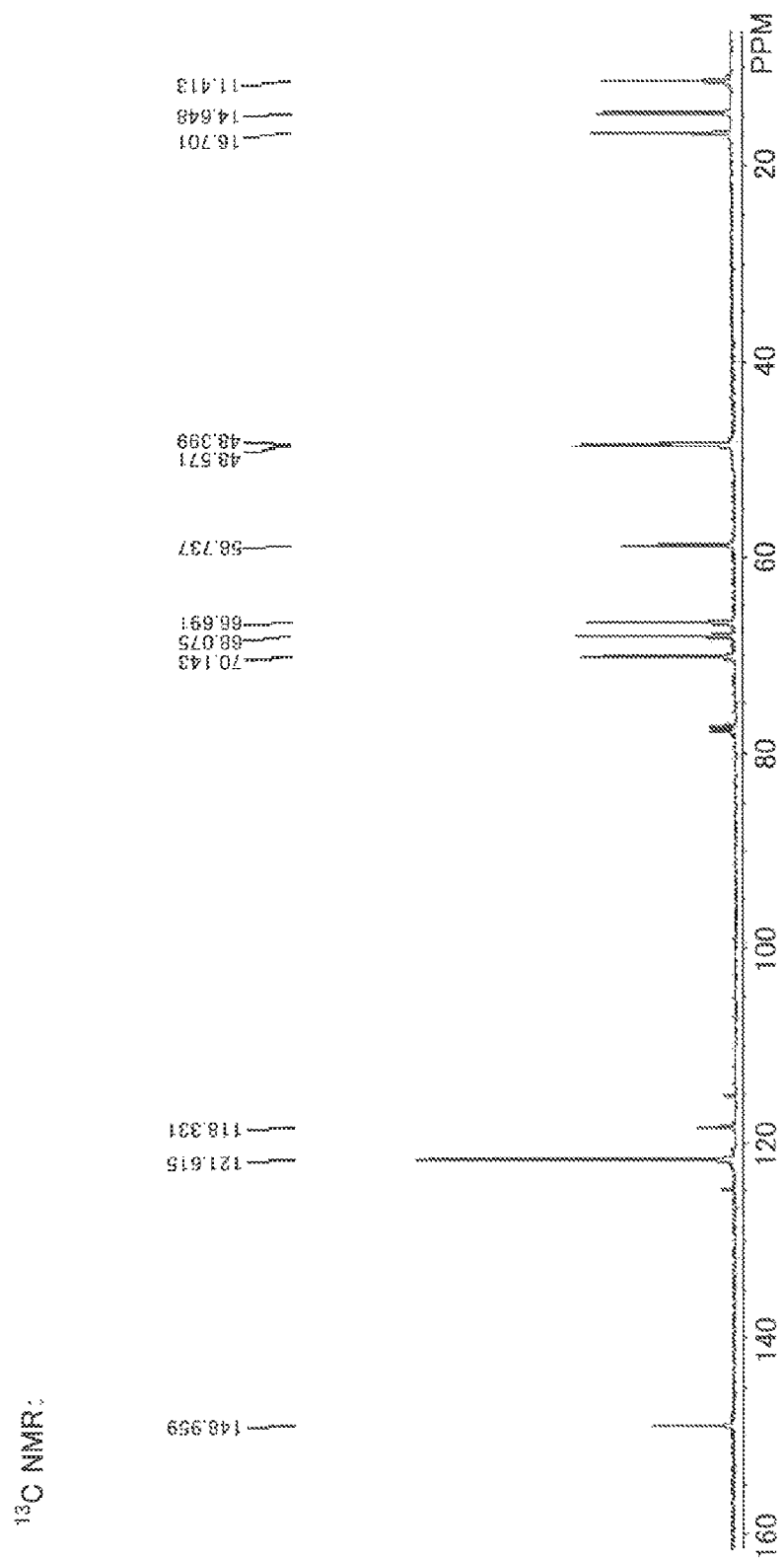
FIG. 42 is a chart illustrating $^{13}$C-NMR spectrum of electrolyte solvent [4-6].
Figure 43:
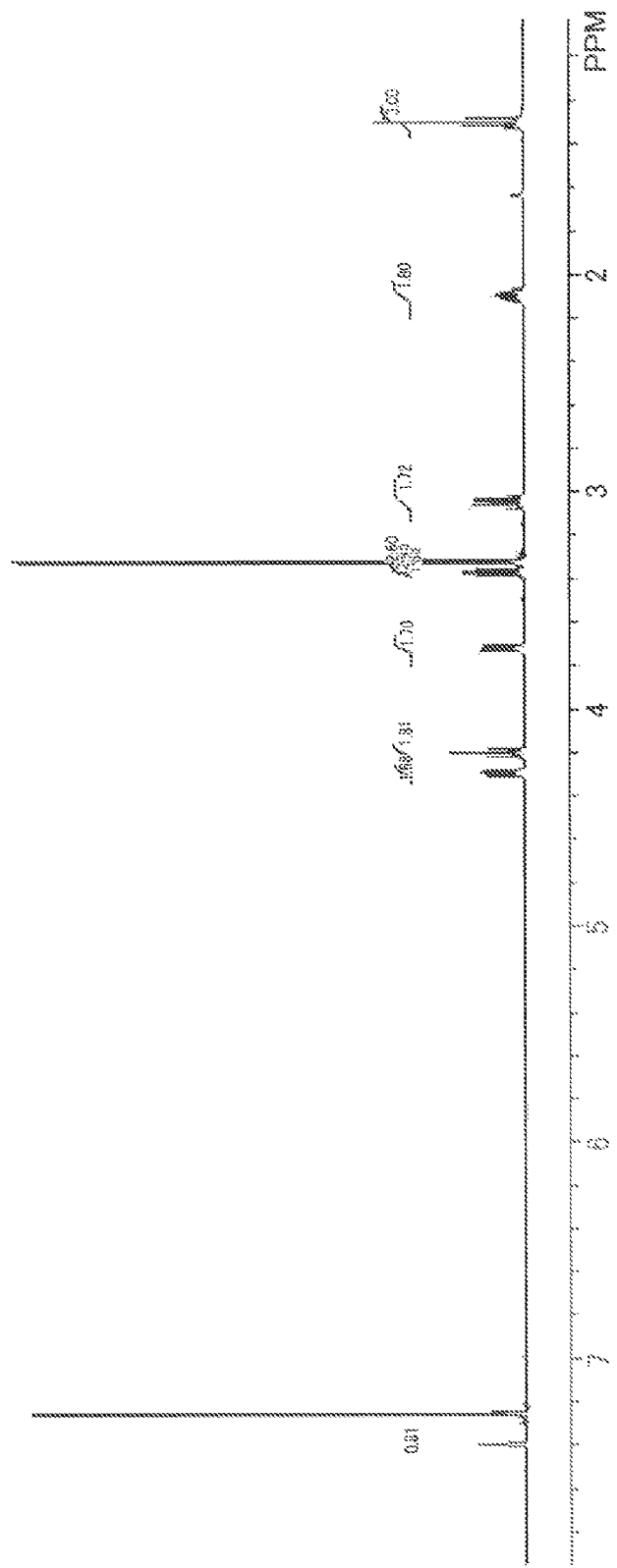
FIG. 43 is a chart illustrating $^1$H-NMR spectrum of electrolyte solvent [4-7].
Figure 44:
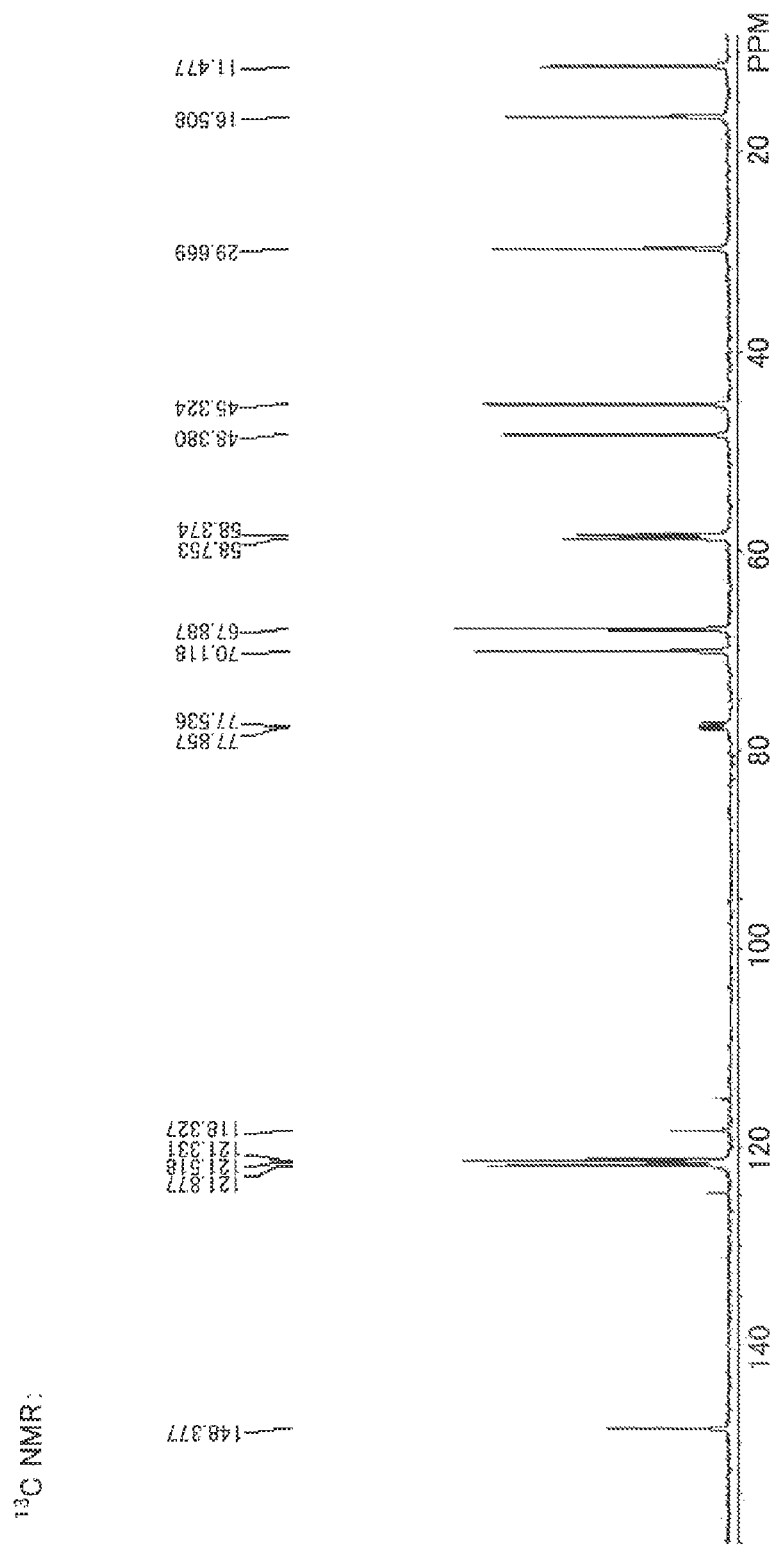
FIG. 44 is a chart illustrating $^{13}$C-NMR spectrum of electrolyte solvent [4-7].
Figure 45:
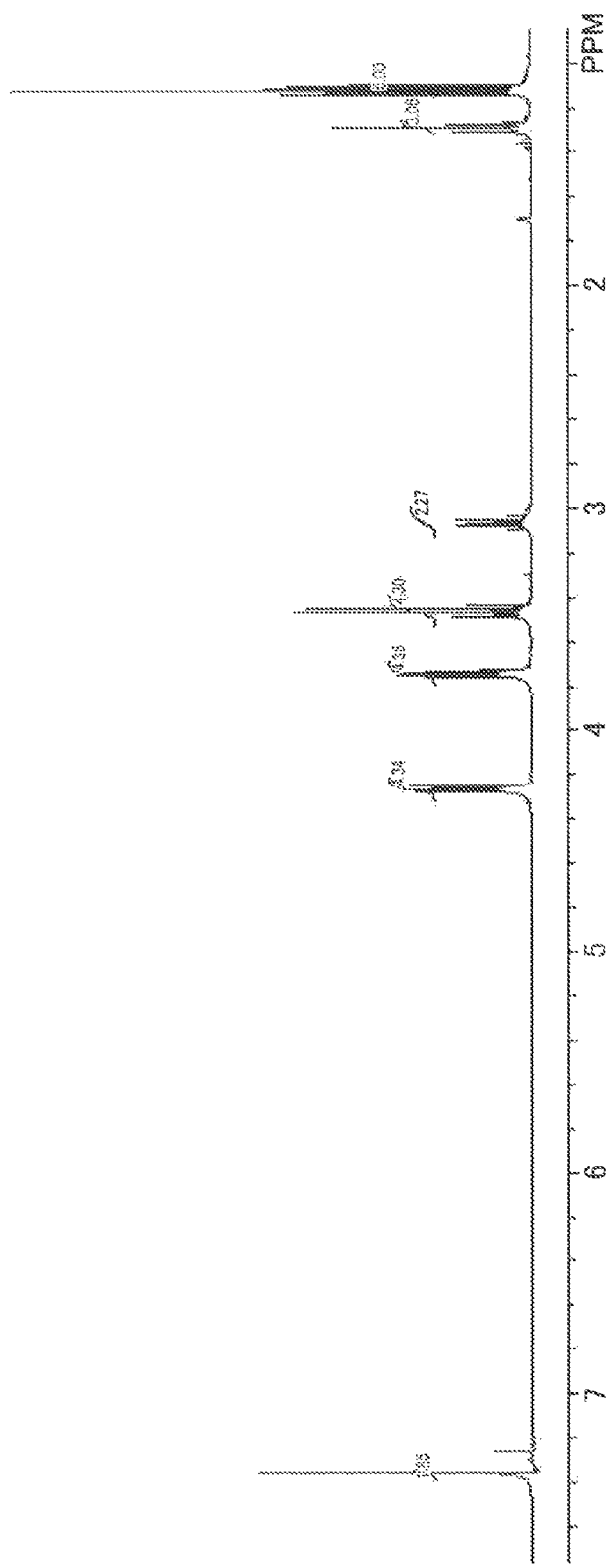
FIG. 45 is a chart illustrating $^1$H-NMR spectrum of electrolyte solvent [4-8].
Figure 46:
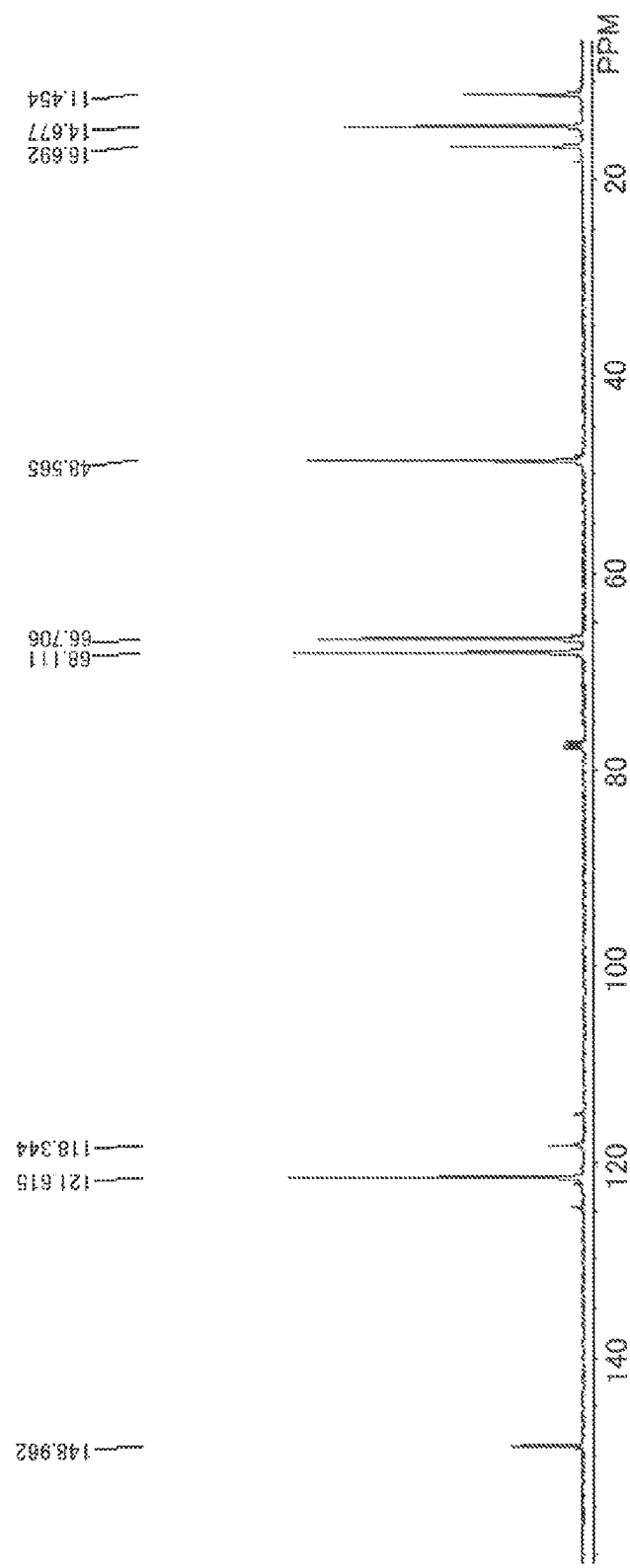
FIG. 46 is a chart illustrating $^{13}$C-NMR spectrum of electrolyte solvent [4-8].
Figure 47:
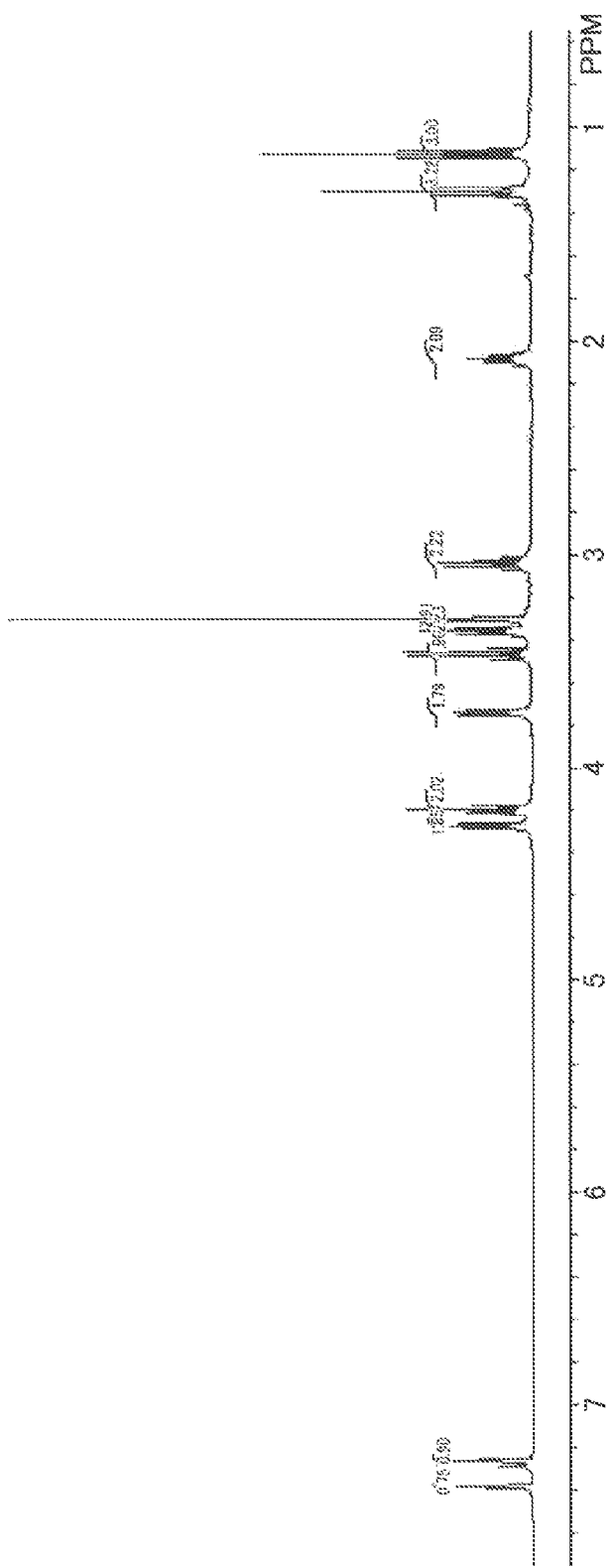
FIG. 47 is a chart illustrating $^1$H-NMR spectrum of electrolyte solvent [4-9].
Figure 48:
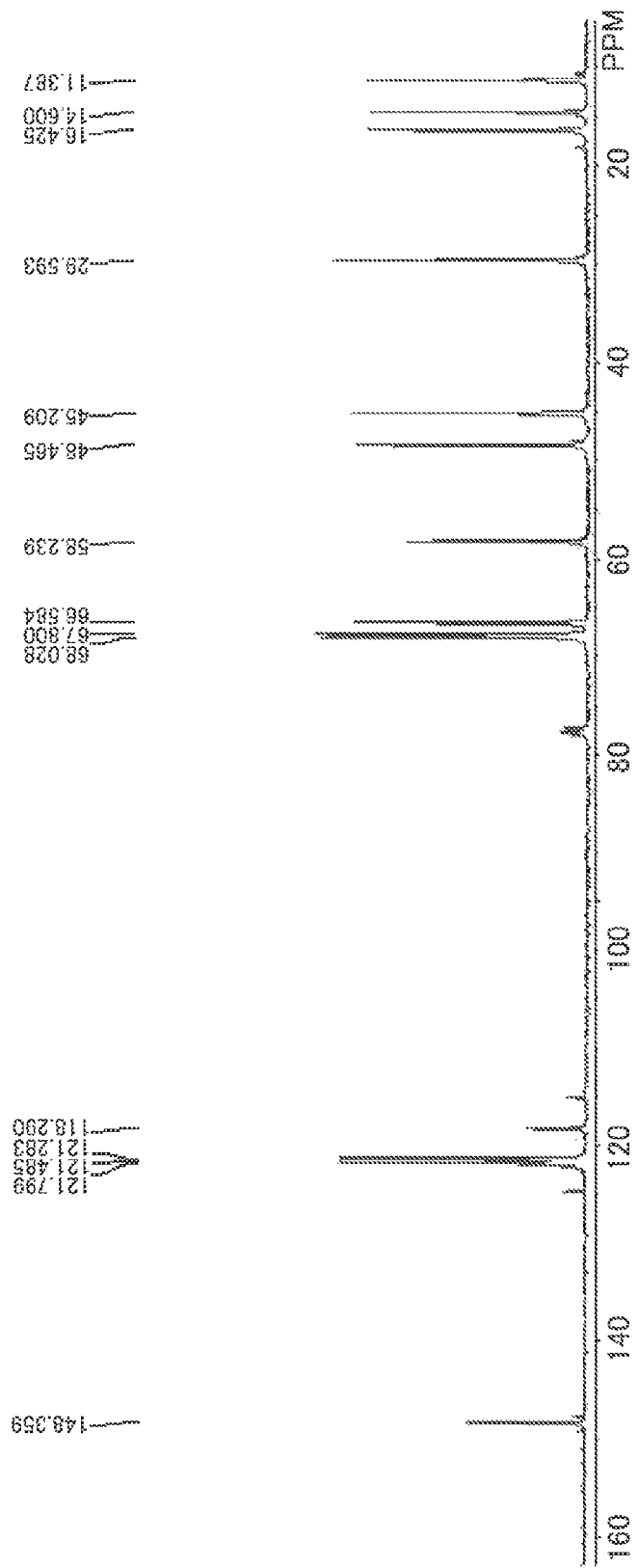
FIG. 48 is a chart illustrating $^{13}$C-NMR spectrum of electrolyte solvent [4-9].

N,N-di-(2-methoxyethyl)-N-2-ethoxyethylamine (10.0 g, 49 mmol), 3-bromopropylmethylether (9.0 g, 59 mmol), and methanol (10 mL) were put into a flask of 250 mL, and held at reflux in a nitrogen atmosphere at 85 deg C. for 72 hours or more. Subsequent procedures are performed as in the case of ionic liquid [2-1]. FIG. 25 and FIG. 26 illustrate $^1$H-NMR and $^{13}$C-NMR of the ionic liquid that was synthesized. As illustrated in FIG. 25 and FIG. 26, details of chemical shift, are such that $^1$H-NMR, δ (ppm): 3.74-3.71(m, 6H), 3.62-3.59(m, 6H), 3.51-3.44(m, 4H), 3.40-3.38(t, 2H), 3.31(s, 6H), 3.28(s, 3H), 1.96-1.91(m, 2H), and 1.16-1.12(t, 3H), and $^{13}$C-NMR, δ (ppm): 124.85-115.26, 68.71, 67.12, 65.90, 63.79, 60.26, 59.48, 59.11, 58.76, 22.94, and 14.86, and it was confirmed that N-3-methoxypropyl-N,N-di-(2-methoxyethyl)-N-2-ethoxyethylammonium bis(trifluoromethanesulfonyl)imide (ionic liquid [3-6]) was synthesized.

Example 4

Synthesis of Raw Material Amine

Synthesis of 1-(2-methoxyethyl)-2-methyl imidazole

In an autoclave of 100 mL, 2-methylimidazole (19.2 g, 200 mmol) was made reacted with chloroethyl methyl ether (22.7 g, 240 mmol) at 140 deg C. for 72 hours. Brown liquid that was obtained was washed with 120 mL of a compound liquid of ethanol and ether (volume ratio thereof is 1:5), and then made reacted with triethylamine (20.2 g, 200 mmol) in the autoclave of 100 mL at 130 deg C. for 24 hours. Solid salts that was formed was removed by filtration, and residue (filtrate) was subjected to reduced-pressure distillation by using a Vigreux column of 20 cm. The obtained product was a transparent liquid which has a boiling point of 160-163 deg C. when a pressure is 10 Pa. $^1$H-NMR measurement of obtained amine was performed, and it was confirmed that chemical shifts, δ (ppm), are 6.95 (d, 1H), 6.72 (d, 1H), 4.07-4.04 (t, 2H), 3.62-3.60 (t, 2H), 3.27(s, 3H), and 2.29 (s, 3H), and 1-(2-methoxyethyl)-2-methyl imidazole was synthesized.

Synthesis of 1-(2-ethoxyethyl)-2-methyl imidazole

In an autoclave of 100 mL, 2-methylimidazole (19.2 g, 200 mmol) was made reacted with chloroethyl ethyl ether (26.0 g, 240 mmol) at 145 deg C. for 72 hours. Brown liquid that was obtained was washed with 120 mL of a compound liquid of ethanol and ether (volume ratio thereof is 1:5), and then made reacted with triethylamine (20.2 g, 200 mmol) in the autoclave of 100 mL at 130 deg C. for 24 hours. Solid salts that was formed was removed by filtration, and residue (filtrate) was subjected to reduced-pressure distillation by using a Vigreux column of 20 cm. The obtained product was a transparent liquid which has a boiling point of 171-175 deg C. when a pressure is 10 Pa. $^1$H-NMR measurement of obtained amine was performed, and it was confirmed that chemical shifts, δ (ppm), are 6.96 (d, 1H), 6.72(d, 1H), 4.07-4.04(t, 2H), 3.66-3.63 (t, 2H), 3.45-3.40 (m, 2H), 2.29(s, 3H), and 1.12-1.08(t, 3H), and 1-(2-ethoxyethyl)-2-methyl imidazole was synthesized.

(Synthesis of 1-(2-methoxyethyl)-2-ethyl imidazole)

In an autoclave of 100 mL, 2-ethylimidazole (19.2 g, 200 mmol) was made reacted with chloroethyl methyl ether (22.7 g, 240 mmol) at 140 deg C. for 72 hours. Brown liquid that was obtained was washed with 120 mL of a compound liquid of ethanol and ether (volume ratio thereof is 1:5), and then made reacted with triethylamine (20.2 g, 200 mmol) in the autoclave of 100 mL at 130 deg C. for 24 hours. Solid salts that was formed was removed by filtration, and residue (filtrate) was subjected to reduced-pressure distillation by using a Vigreux column of 20 cm. The product was a transparent liquid which has a boiling point of 160-163 deg C. when a pressure is 10 Pa. $^1$H-NMR measurement of obtained amine was performed, and it was confirmed that chemical shifts, δ (ppm), are 6.95 (d, 1H), 6.75(d, 1H), 4.08-4.05(t, 2H), 3.62-3.60 (t, 2H), 3.27(s, 3H), 2.68-2.62 (m, 2H), and 1.25-1.22 (t, 3H), and 1-(2-methoxyethyl)-2-ethyl imidazole was synthesized.

Synthesis of 1-(2-ethoxyethyl)-2-ethyl imidazole

In an autoclave of 100 mL, 2-ethylimidazole (19.2 g, 200 mmol) was made reacted with 2-chloroethyl ethyl ether (26.0 g, 240 mmol) at 145 deg C. for 72 hours. Brown liquid that was obtained was washed with 120 mL of a compound liquid of ethanol and ether (volume ratio thereof is 1:5), and then made reacted with triethylamine (20.2 g, 200 mmol) in the autoclave of 100 mL at 130 deg C. for 24 hours. Solid salts that was formed was removed by filtration, and residue (filtrate) was subjected to reduced-pressure distillation by using a Vigreux column of 20 cm. The product was a transparent liquid which has a boiling point of 171-175 deg C. when a pressure is 10 Pa. $^1$H-NMR measurement of obtained amine was performed, and it was confirmed that chemical shifts, δ (ppm), are 6.91 (d, 1H), 6.87(d, 1H), 4.00-3.97(t, 2H), 3.63-3.60 (t, 2H), 3.44-3.39(4, 2H), 2.75-2.65(m, 2H), 1.33-1.29(t, 3H), and 1.15-1.12(t, 3H), and 1-(2-ethoxyethyl)-2-ethyl imidazole was synthesized.

<Synthesis of Ionic Liquid>
(Synthesis of Ionic Liquid [4-1])

In a flask of 250 mL, 1-(2-methoxyethyl)-2-methylimidazole (5.0 g, 35 mmol) was made reacted with 2-ethoxyethylbromide (6.4 g, 42 mmol) in an acetonitrile solvent (10 mL) at 60 deg C. for 48 hours. The bromide product that was obtained was washed with ether, then dissolved into an ion-exchange water together with LiTFSA, and obtained mixture was left at normal temperature for 24 hours. Unrefined ionic liquid was dissolved into dichloromethane, and washed with an ion-exchange water until remaining halogen anions disappeared. The existence and non-existence of residual halogen anions was analyzed by using silver nitrate. Dichloromethane was removed by a rotary evaporator. The product was obtained by being dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 7.40(d, 1H), 7.24(d, 1H), 4.29-4.27(t, 2H), 4.09-4.05 (t, 2H), 3.76-3.74(t, 2H), 3.50-3.45(m, 2H), 3.07-3.01(m, 2H), 1.87-1.79(m, 2H), 1.45-1.36(m, 2H), 1.33-1.29(t, 3H), 1.14-1.11(t, 3H), and 0.99-0.96(t, 3H), and $^{13}$C-NMR, δ (ppm): 148.09, 124.73-115.09, 68.15, 66.89, 48.72, 48.57, 39.82, 28.37, 22.17, 16.90, 14.61, 13.77, and 11.80, and it was found that 1-(2-methoxyethyl)-2-methyl-3-(2-ethoxyethyl) imidazolium bis(trifluoromethanesulfonyl) imide (ionic liquid [4-1]) was synthesized.

(Synthesis of Ionic Liquid [4-2])

In a flask of 250 mL, 1-(2-methoxyethyl)-2-methylimidazole (5.0 g, 35 mmol) was made reacted with 3-methoxypropylbromide (6.4 g, 42 mmol) in an acetonitrile solvent (10 mL) at 60 deg C. for 48 hours. The bromide product that was obtained was washed with ether, then dissolved into an ion-exchange water together with LiTFSA, and obtained mixture was left at normal temperature for 24 hours. Unrefined ionic liquid was dissolved into dichloromethane, and washed with an ion-exchange water until remaining halogen anions disappeared. The existence and non-existence of residual halogen anions was analyzed by using silver nitrate. Dichloromethane was removed by a rotary evaporator. The product was obtained by being dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 7.35(d, 1H), 7.20(d, 1H), 4.31-4.29(t, 2H), 4.22-4.19 (t, 2H), 3.72-3.70(t, 2H), 3.36-3.31(m, 8H), 2.64(s, 3H), and 2.10-2.04(m, 2H), and $^{13}$C-NMR, δ (ppm): 144.68, 124.28-115.20, 70.44, 67.87, 59.15, 58.76, 48.87, 45.76, 29.52, and 9.80, and it was found that 1-(2-methoxyethyl)-2-methyl-3-(3-methoxypropyl) imidazolium bis(trifluoromethanesulfonyl)imide (ionic liquid [4-2]) was synthesized.

(Synthesis of Ionic Liquid [4-3])

In a flask of 250 mL, 1-(2-ethoxyethyl)-2-methylimidazole (5.4 g, 35 mmol) was made reacted with 2-ethoxyethylbromide (6.4 g, 42 mmol) in an acetonitrile solvent (10 mL) at 60 deg C. for 48 hours. The bromide product that was obtained was washed with ether, then dissolved into an ion-exchange water together with LiTFSA, and obtained mixture was left at normal temperature for 24 hours. Unrefined ionic liquid was dissolved into dichloromethane, and washed with an ion-exchange water until remaining halogen anions disappeared. The existence and non-existence of residual halogen anions was analyzed by using silver nitrate. Dichloromethane was removed by a rotary evaporator. The product was obtained by being dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 7.32(s, 2H), 4.28-4.26(t, 4H), 3.75-3.72(t, 4H), 3.49-3.44(m, 4H), 2.65(s, 3H), and 1.15-1.11(4, 6H), and $^{13}$C-NMR, δ (ppm): 145.42, 124.48-115.06, 68.42, 66.96, 49.11, 15.08, and 10.42, and it was found that 1-(2-ethoxyethyl)-2-methyl-3-(2-ethoxyethyl) imidazolium bis(trifluoromethanesulfonyl)imide (ionic liquid [4-3]) was synthesized.

(Synthesis of Ionic Liquid [4-4])

In a flask of 250 mL, 1-(2-ethoxyethyl)-2-methylimidazole (5.4 g, 35 mmol) was made reacted with 3-methoxypropylbromide (6.4 g, 42 mmol) in an acetonitrile solvent (10 mL) at 60 deg C. for 48 hours. The bromide product that was obtained was washed with ether, then dissolved into an ion-exchange water together with LiTFSA, and obtained mixture was left at normal temperature for 24 hours. Unrefined ionic liquid was dissolved into dichloromethane, and washed with an ion-exchange water until remaining halogen anions disappeared. The existence and non-existence of residual halogen anions was analyzed by using silver nitrate. Dichloromethane was removed by a rotary evaporator. The product was obtained by being dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 7.35(d, 1H), 7.22(d, 1H), 4.29-4.27(t, 2H), 4.23-4.18 (m, 2H), 3.74-3.71(t, 2H), 3.49-3.44(m, 2H), 3.36-3.32(m, 2H), 3.31(s, 3H), 2.64(s, 3H), 2.09-2.02(m, 2H), and 1.15-1.11(t, 3H), and $^{13}$C-NMR, δ (ppm): 144.70, 124.67-115.21, 68.38, 68.01, 67.82, 66.97, 58.78, 49.08, 45.75, 29.56, 15.10, and 9.88, and it was found that 1-(2-ethoxyethyl)-2-methyl-3-(3-methoxypropyl) imidazolium bis(trifluoromethanesulfonyl)imide (ionic liquid [4-4]) was synthesized.

(Synthesis of Ionic Liquid [4-5])

In a flask of 250 mL, 1-(2-methoxyethyl)-2-ethylimidazole (5.4 g, 35 mmol) was made reacted with 2-methoxyethylbromide (5.8 g, 42 mmol) in an acetonitrile solvent (10 mL) at 60 deg C. for 48 hours. The bromide product that was obtained was washed with ether, then dissolved into an ion-exchange water together with LiTFSA, and obtained mixture was left at normal temperature for 24 hours. Unrefined ionic liquid was dissolved into dichloromethane, and washed with an ion-exchange water until remaining halogen anions disappeared. The existence and non-existence of residual halogen anions was analyzed by using silver nitrate. Dichloromethane was removed by a rotary evaporator. The product was obtained by being dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 7.35(s, 2H), 4.28-4.26(t, 4H), 3.73-3.70(t, 4H), 3.33 (s, 6H), 3.08-3.02(m, 2H), and 1.31-1.26(t, 3H), and $^{13}$C-NMR, δ (ppm): 148.82, 124.75-115.04, 70.06, 58.66, 48.32, 16.67, and 11.34, and it was found that 1-(2-methoxyethyl)-2-ethyl-3-(2-methoxyethyl) imidazolium bis(trifluoromethanesulfonyl)imide (ionic liquid [4-5]) was synthesized.

(Synthesis of Ionic Liquid [4-6])

In a flask of 250 mL, 1-(2-methoxyethyl)-2-ethylimidazole (5.4 g, 35 mmol) was made reacted with 2-ethoxyethylbromide (6.4 g, 42 mmol) in an acetonitrile solvent (10 mL) at 60 deg C. for 48 hours. The bromide product that was obtained was washed with ether, then dissolved into an ion-exchange water together with LiTFSA, and obtained mixture was left at normal temperature for 24 hours. Unrefined ionic liquid was dissolved into dichloromethane, and washed with an ion-exchange water until remaining halogen anions disappeared. The existence and non-existence of residual halogen anions was analyzed by using silver nitrate. Dichloromethane was removed by a rotary evaporator. The product was obtained by being dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 7.35(d, 2H), 4.29-4.26 (m, 4H), 3.78-3.72(m, 4H), 3.51-3.46(m, 2H), 3.33(s, 3H), 3.10-3.04(m, 2H), 1.32-1.28 (t, 3H), and 1.16-1.12(t, 3H), and $^{13}$C-NMR, δ (ppm): 148.97, 124.73-115.06, 70.14, 68.08, 66.09, 58.74, 48.57, 48.40, 16.70, 14.65, and 11.41, and it was found that 1-(2-methoxyethyl)-2-ethyl-3-(2-ethoxyethyl) imidazolium bis(trifluoromethanesulfonyl)imide (ionic liquid [4-6]) was synthesized.

(Synthesis of Ionic Liquid [4-7])

In a flask of 250 mL, 1-(2-methoxyethyl)-2-ethylimidazole (5.4 g, 35 mmol) was made reacted with 2-methoxyethylbromide (6.4 g, 42 mmol) in an acetonitrile solvent (10 mL) at 60 deg C. for 48 hours. The bromide product that was obtained was washed with ether, then dissolved into an ion-exchange water together with LiTFSA, and obtained mixture was left at normal temperature for 24 hours. Unrefined ionic liquid was dissolved into dichloromethane, and washed with an ion-exchange water until remaining halogen anions disappeared. The existence and non-existence of residual halogen anions was analyzed by using silver nitrate. Dichloromethane was removed by a rotary evaporator. The product was obtained by being dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 7.39(d, 1H), 7.25(d, 1H), 4.30-4.28(t, 2H), 4.22-4.18 (t, 2H), 3.73-3.70(t, 2H), 3.40-3.34(m, 2H), 3.33(s, 3H), 3.31 (s, 3H), 3.07-3.03(m, 2H), 2.13-2.07(m, 2H), and 1.32-1.28(t, 3H), and $^{13}$C-NMR, δ (ppm): 148.38, 124.70, 115.16, 70.12, 67.89, 58.76, 58.37, 48.38, 45.32, 29.67, 16.51, and 11.48, and it was found that 1-(2-methoxyethyl)-2-ethyl-3-(3-methoxypropyl) imidazolium bis(trifluoromethanesulfonyl)imide (ionic liquid [4-7]) was synthesized.

(Synthesis of Ionic Liquid [4-8])

In a flask of 250 mL, 1-(2-ethoxyethyl)-2-ethylimidazole (5.4 g, 35 mmol) was made reacted with 3-ethoxypropylbromide (6.4 g, 42 mmol) in an acetonitrile solvent (10 mL) at 60 deg C. for 48 hours. The bromide product that was obtained was washed with ether, then dissolved into an ion-exchange water together with LiTFSA, and obtained mixture was left at normal temperature for 24 hours. Unrefined ionic liquid was dissolved into dichloromethane, and washed with an ion-exchange water until remaining halogen anions disappeared. The existence and non-existence of residual halogen anions was analyzed by using silver nitrate. Dichloromethane was removed by a rotary evaporator. The product was obtained by being dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 7.39(d, 1H), 7.25(d, 1H), 4.30-4.28(t, 2H), 4.22-4.18 (t, 2H), 3.73-3.70(t, 2H), 3.40-3.34(m, 2H), 3.33(s, 3H), 3.31 (s, 3H), 3.07-3.03(m, 2H), 2.13-2.07(m, 2H), and 1.32-1.28(t, 3H), and $^{13}$C-NMR, δ (ppm): 148.38, 124.70, 115.16, 70.12, 67.89, 58.76, 58.37, 48.38, 45.32, 29.67, 16.51, and 11.48, and it was found that 1-(2-ethoxyethyl)-2-ethyl-3-(3-ethoxypropyl) imidazolium bis(trifluoromethanesulfonyl)imide (ionic liquid [4-8]) was synthesized.

(Synthesis of Ionic Liquid [4-9])

In a flask of 250 mL, 1-(2-ethoxyethyl)-2-ethylimidazole (5.4 g, 35 mmol) was made reacted with 3-methoxypropylbromide (6.4 g, 42 mmol) in an acetonitrile solvent (10 mL) at 60 deg C. for 48 hours. The bromide product that was obtained was washed with ether, then dissolved into an ion-exchange water together with LiTFSA, and obtained mixture was left at normal temperature for 24 hours. Unrefined ionic liquid was dissolved into dichloromethane, and washed with an ion-exchange water until remaining halogen anions disappeared. The existence and non-existence of residual halogen anions was analyzed by using silver nitrate. Dichloromethane was removed by a rotary evaporator. The product was obtained by being dried in a vacuum at 105 deg C. for 24 hours or more.

Measurements of $^1$H-NMR and $^{13}$C-NMR of the ionic liquid that was synthesized by the above-described procedure were performed. Chemical shifts are such that $^1$H-NMR, δ (ppm): 7.39(d, 1H), 7.26(d, 1H), 4.28-4.26(t, 2H), 4.22-4.18 (t, 2H), 3.75-3.73(t, 2H), 3.49-3.44(m, 2H), 3.38-3.35(t, 2H), 3.30(s, 3H), 3.07-3.02(m, 2H), 2.12-2.05(m, 2H), 1.32-1.28 (t, 3H), and 1.14-1.44(t, 3H), and $^{13}$C-NMR, δ (ppm): 148.37, 124.68-115.10, 68.03, 67.80, 66.58, 58.24, 48.47, 45.21, 29.60, 16.43, 14.60, and 11.39, and it was found that 1-(2-ethoxyethyl)-2-ethyl-3-(3-methoxypropyl) imidazolium bis (trifluoromethanesulfonyl)imide (ionic liquid [4-9]) was synthesized.

<Measurement of Physical Properties>

Physical properties of ionic liquids [2-1] to [2-7], [3-1] to [3-6] that were synthesized as described above were measured.

Differential scanning calorimetry (DSC) of each ionic liquid was performed, by using a differential scanning calorimeter (Pyris 1 DSC, Perkin-Elmer), in the range from −60 deg C. to an arbitrary temperature. Each sample of 4-6 mg was put into an aluminum container, which was sealed, in a dry room, and measurement is performed at a temperature rising rate of 10 deg C. min$^{-1}$. Measurement data were collected during heating in the second heating-cooling scan.

Thermal stabilities were measured by using a Thermo Gravimetry Analyzer (TGA) (7 series thermal analysis system, Perkin-Elmer). Each sample of 4-6 mg was put into a platinum container, and heating is performed in a nitrogen atmosphere at a temperature rising rate of 10 deg C. min$^{-1}$ in the range from normal temperature to 600 deg C.

Viscosity of each sample was measured by using a viscometer (DV-III ULTRA, Brookfield Engineering Laboratories, Inc.)

Degree of density was calculated by measuring a mass of each sample (1.0 mL) that was prepared in a dry room at 25 deg C.

Ion conductive property was measured in a dry room by using conductivity meter DDS-11A (Shanghai Kaje Precision Machine Co., Ltd.)

Electrochemical stability was measured by a linear sweep voltammetry. For the measurement, an electrochemical measuring instrument (CHI 660D) was used in an argon-purged glovebox. Glass fiber (diameter of 3 mm) was used as a working electrode. Platinum wire was used as a counter electrode. As a reference electrode, silver wire was used.

The following Table 1 illustrates measured physical properties of the ionic liquids.

TABLE 1

| IONIC LIQUID No. | Mw/g mol$^{-1}$ | Tm/ °C. | d/g cm$^{-3}$ | C/mol dm$^{-3}$ | η/ mPa s | σ/mS cm$^{-1}$ | Λ/S cm$^2$ mol$^{-1}$ | Td/ °C. |
|---|---|---|---|---|---|---|---|---|
| 2-1 | 500.48 | <-60 | 1.36 | 2.72 | 85 | 1.38 | 0.51 | 331.5 |
| 2-2 | 514.50 | 11.6 | 1.31 | 2.55 | 101 | 1.08 | 0.42 | 325.7 |
| 2-3 | 528.53 | <-60 | 1.31 | 2.48 | 116 | 0.88 | 0.35 | 323.2 |
| 2-4 | 542.56 | <-60 | 1.31 | 2.41 | 127 | 0.77 | 0.32 | 331.7 |
| 2-5 | 530.50 | 16.6 | 1.36 | 2.56 | 104 | 1.04 | 0.41 | 315.7 |
| 2-6 | 544.53 | 18.4 | 1.31 | 2.41 | 90 | 1.10 | 0.46 | 312.2 |
| 2-7 | 544.53 | <-60 | 1.32 | 2.42 | 117 | 1.00 | 0.41 | 324.0 |
| 3-1 | 514.50 | <-60 | 1.36 | 2.64 | 76 | 1.13 | 0.43 | 327.0 |
| 3-2 | 528.53 | <-60 | 1.30 | 2.46 | 93 | 1.20 | 0.49 | 328.7 |
| 3-3 | 542.56 | <-60 | 1.29 | 2.38 | 107 | 0.84 | 0.35 | 329.5 |
| 3-4 | 556.58 | <-60 | 1.24 | 2.23 | 110 | 0.79 | 0.35 | 326.3 |
| 3-5 | 558.55 | 2.9 | 1.33 | 2.38 | 87 | 1.10 | 0.46 | 315.2 |
| 3-6 | 558.55 | <-60 | 1.31 | 2.35 | 111 | 0.89 | 0.38 | 329.2 |

In Table 1, Mw represents a mass-average molecular weight, Tm represents a melting point, d represents a degree of density at 25 deg C., C represents a concentration at 25 deg C., η represents a viscosity at 25 deg C., σ represents electrical conductivity at 25 deg C., Λ is a molar conductance at 25 deg C., and Td is a temperature when 10% mass of an initial mass was lost in a thermal mass analysis.

Also for the ionic liquid that was produced in Example 4, physical properties were measured in a similar way. Table 2 illustrates results thereof.

TABLE 2

| IONIC LIQUID No. | Mw/g mol$^{-1}$ | Tm/ °C. | d/g cm$^{-3}$ | η/ mPa s | σ/mS cm$^{-1}$ | Td/ °C. |
|---|---|---|---|---|---|---|
| 4-1 | 493.4 | 1.3 | 1.39 | 62.5 | 1.84 | 366.6 |
| 4-2 | 493.4 | <-60 | 1.4 | 83.4 | 1.64 | 377.5 |
| 4-2 | 507.4 | <-60 | 1.34 | 70.6 | 1.62 | 370.7 |
| 4-4 | 507.4 | <-60 | 1.39 | 83.3 | 1.49 | 369.4 |
| 4-5 | 493.4 | 7.8 | 1.32 | 78.3 | 1.61 | 345.8 |
| 4-6 | 507.4 | <-60 | 1.31 | 80.7 | 1.51 | 350.8 |
| 4-7 | 507.4 | <-60 | 1.32 | 96.5 | 1.37 | 365.8 |
| 4-8 | 521.4 | <-60 | 1.32 | 75.3 | 1.38 | 344.3 |
| 4-9 | 521.4 | <-60 | 1.27 | 82.9 | 1.34 | 355.7 |

In Table 2, Mw represents a mass-average molecular weight, Tm represents a melting point, d represents a degree of density at 25 deg C., C represents a concentration at 25 deg C., η represents a viscosity at 25 deg C., σ represents electrical conductivity at 25 deg C., and Td is a temperature when 10% mass of an initial mass was lost in a thermal mass analysis.

[Evaluation]

LiTFSI of 0.6 mol kg$^{-1}$ was added to the dried ionic liquid (electrolyte solvent) to prepare an electrolyte solution. This operation was conducted in the argon-purged glovebox.

Performance of the electrolyte solution in the use for the lithium ion secondary battery was evaluated with a coin battery. The metal lithium was used for the anode, and the cathode was produced applying, onto a current collector of aluminum, a mixture of the cathode active material (LiFePO$_4$, LiMnPO$_4$, LiCoO$_2$) illustrated in Tables 3-6, acetylene black, and PolyVinylidene DiFluoride (PVDF, dissolved into N-methyl-2-pyrrolidone), whose volume ratio was 8:1:1. An amount of the cathode active material was set to approximately 1.5 mg cm$^{-2}$. This cathode was directly used without application of pressure. As the separator, a glass filter (GF/A from Whattman) of borosilicate glass was used.

The coin battery was assembled in the glovebox. All constructional elements of the coin battery were dried in a vacuum and then put into the glovebox. The coin battery was, after being sealed (assembled by swaging), and prior to the evaluation test of battery performance, left at normal temperature for four hours. Evaluation of battery performance was performed at normal temperature by a constant charge/discharge cycle test by using a charge/discharge test apparatus (LAND Electronic Co., Ltd.)

As the battery performance evaluation, a discharge capacity and coulombic efficiency were evaluated. The following Tables 3-6 illustrate evaluation results.

(Discharge Capacity)

The discharge capacity is a discharge capacity (mAh/g) when a discharge curve at normal temperature reaches 2.5 V.

(Coulombic Efficiency)

The case that an average value of (charge/discharge capacity)×100% in 60-70 cycles at discharge rate of 1C in normal temperature is 95% or more and 100% and less is evaluated as "A", the case of 90% or more and less than 95% is evaluated as "B", the case of 85% or more and less than 90% is evaluated as "C", and the case of less than 85% is evaluated as "D".

TABLE 3

| IONIC LIQUID No. | STRUCTURAL FORMULA | R₁ | R₂ | R₃ | R₄ | CATHODE ACTIVE MATERIAL: LiFePO₄ DISCHARGE CAPACITY (mAh/g) | CATHODE ACTIVE MATERIAL: LiFePO₄ COULUMBIC EFFICIENCY | CATHODE ACTIVE MATERIAL: LiMnPO₄ DISCHARGE CAPACITY | CATHODE ACTIVE MATERIAL: LiMnPO₄ COULUMBIC EFFICIENCY | CATHODE ACTIVE MATERIAL: LiCoO₂ DISCHARGE CAPACITY | CATHODE ACTIVE MATERIAL: LiCoO₂ COULUMBIC EFFICIENCY |
|---|---|---|---|---|---|---|---|---|---|---|---|
| (1) Ammonium cations with two enter groups | | | | | | | | | | | |
| 1-1 | ![quaternary ammonium] | $CH_3CH_2$ | $CH_3CH_2$ | $CH_3O(CH_2)_2$ | $CH_3O(CH_2)_2$ | 65 | A | 70 | B | 30 | C |
| 1-2 | | $CH_3CH_2$ | $CH_3CH_2$ | $CH_3O(CH_2)_2$ | $CH_3CH_2O(CH_2)_2$ | 65 | A | 70 | B | 35 | C |
| 1-3 | | $CH_3CH_2$ | $CH_3CH_2$ | $CH_3CH_2$ | $CH_3CH_2O(CH_2)_2$ | 40 | D | 40 | D | 35 | D |
| 1-4 | ![butyl ammonium] | $CH_3$ | $CH_3(CH_2)_3$ | $CH_3O(CH_2)_2$ | $CH_3O(CH_2)_2$ | 65 | A | 70 | B | 35 | C |
| 1-5 | | $CH_3$ | $CH_3(CH_2)_3$ | $CH_3O(CH_2)_2$ | $CH_3CH_2O(CH_2)_2$ | 65 | A | 70 | B | 30 | C |
| 1-6 | ![pyrrolidinium] | —(CH₂)₄— | | $CH_3O(CH_2)_2$ | $CH_3O(CH_2)_2$ | 90 | A | 95 | B | 45 | C |
| 1-7 | | —(CH₂)₄— | | $CH_3O(CH_2)_2$ | $CH_3CH_2O(CH_2)_2$ | 100 | A | 110 | B | 50 | C |
| 1-8 | ![piperidinium] | —(CH₂)₅— | | $CH_3O(CH_2)_2$ | $CH_3O(CH_2)_2$ | 70 | A | 80 | B | 35 | C |
| 1-9 | | —(CH₂)₅— | | $CH_3O(CH_2)_2$ | $CH_3CH_2O(CH_2)_2$ | 80 | A | 90 | B | 42 | C |
| 1-10 | | —(CH₂)₅— | | $CH_3CH_2$ | $CH_3CH_2O(CH_2)_2$ | 40 | D | 40 | D | 35 | D |
| 1-11 | ![morpholinium] | —CH₂CH₂OCH₂CH₂— | | $CH_3O(CH_2)_2$ | $CH_3O(CH_2)_2$ | 95 | A | 100 | B | 40 | C |
| 1-12 | | —CH₂CH₂OCH₂CH₂— | | $CH_3O(CH_2)_2$ | $CH_3CH_2O(CH_2)_2$ | 90 | A | 95 | B | 40 | C |

TABLE 4

| IONIC LIQUID No. | STRUCTURAL FORMULA | (2)Ammonium cations with three or four enter groups | | | | CATHODE ACTIVE MATERIAL: $LiFePO_4$ | |
|---|---|---|---|---|---|---|---|
| | | $R_1$ | $R_2$ | $R_3$ | $R_4$ | DISCHARGE CAPACITY (mAh/g) | COULUMBIC EFFICIENCY |
| 2-1 | 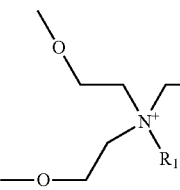 | $CH_3CH_2$ | $CH_3O(CH_2)_2$ | $CH_3O(CH_2)_2$ | $CH_3O(CH_2)_2$ | 80 | A |
| 2-2 | | $CH_3CH_2CH_2$ | $CH_3O(CH_2)_2$ | $CH_3O(CH_2)_2$ | $CH_3O(CH_2)_2$ | 85 | A |
| 2-3 | | $CH_3CH_2CH_2CH_2$ | $CH_3O(CH_2)_2$ | $CH_3O(CH_2)_2$ | $CH_3O(CH_2)_2$ | 85 | A |
| 2-4 | | $CH_3CH_2CH_2CH_2CH_2$ | $CH_3O(CH_2)_2$ | $CH_3O(CH_2)_2$ | $CH_3O(CH_2)_2$ | 80 | A |
| 2-5 | | $CH_3O(CH_2)_2$ | $CH_3O(CH_2)_2$ | $CH_3O(CH_2)_2$ | $CH_3O(CH_2)_2$ | 85 | A |
| 2-6 | | $CH_3CH_2O(CH_2)_2$ | $CH_3O(CH_2)_2$ | $CH_3O(CH_2)_2$ | $CH_3O(CH_2)_2$ | 80 | A |
| 2-7 | | $CH_3O(CH_2)_3$ | $CH_3O(CH_2)_2$ | $CH_3O(CH_2)_2$ | $CH_3O(CH_2)_2$ | 85 | A |

| IONIC LIQUID No. | CATHODE ACTIVE MATERIAL: $LiMnPO_4$ | | CATHODE ACTIVE MATERIAL: $LiCoO_2$ | |
|---|---|---|---|---|
| | DISCHARGE CAPACITY | COULUMBIC EFFICIENCY | DISCHARGE CAPACITY | COULUMBIC EFFICIENCY |
| 2-1 | 90 | B | 40 | C |
| 2-2 | 100 | B | 45 | C |
| 2-3 | 95 | B | 45 | C |
| 2-4 | 90 | B | 40 | C |
| 2-5 | 100 | B | 45 | C |
| 2-6 | 90 | B | 40 | C |
| 2-7 | 100 | B | 45 | C |

TABLE 5

| IONIC LIQUID No. | STRUCTURAL FORMULA | $R_1$ | $R_2$ | $R_3$ | $R_4$ | CATHODE ACTIVE MATERIAL: $LiFePO_4$ | |
|---|---|---|---|---|---|---|---|
| | | | | | | DISCHARGE CAPACITY (mAh/g) | COULUMBIC EFFICIENCY |
| 3-1 | 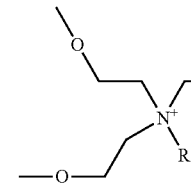 | $CH_3CH_2$ | $CH_3CH_2O(CH_2)_2$ | $CH_3O(CH_2)_2$ | $CH_3O(CH_2)_2$ | 80 | A |
| 3-2 | | $CH_3CH_2CH_2$ | $CH_3CH_2O(CH_2)_2$ | $CH_3O(CH_2)_2$ | $CH_3O(CH_2)_2$ | 80 | A |
| 3-3 | | $CH_3CH_2CH_2CH_2$ | $CH_3CH_2O(CH_2)_2$ | $CH_3O(CH_2)_2$ | $CH_3O(CH_2)_2$ | 85 | A |
| 3-4 | | $CH_3CH_2CH_2CH_2CH_2$ | $CH_3CH_2O(CH_2)_2$ | $CH_3O(CH_2)_2$ | $CH_3O(CH_2)_2$ | 80 | A |
| 3-5 | | $CH_3CH_2O(CH_2)_2$ | $CH_3CH_2O(CH_2)_2$ | $CH_3O(CH_2)_2$ | $CH_3O(CH_2)_2$ | 80 | A |
| 3-6 | | $CH_3O(CH_2)_3$ | $CH_3CH_2O(CH_2)_2$ | $CH_3O(CH_2)_2$ | $CH_3O(CH_2)_2$ | 85 | A |

| IONIC LIQUID No. | CATHODE ACTIVE MATERIAL: $LiMnPO_4$ | | CATHODE ACTIVE MATERIAL: $LiCoO_2$ | |
|---|---|---|---|---|
| | DISCHARGE CAPACITY | COULUMBIC EFFICIENCY | DISCHARGE CAPACITY | COULUMBIC EFFICIENCY |
| 3-1 | 92 | B | 40 | C |
| 3-2 | 90 | B | 40 | C |
| 3-3 | 100 | B | 45 | C |
| 3-4 | 95 | B | 35 | C |
| 3-5 | 95 | B | 40 | C |
| 3-6 | 100 | B | 40 | C |

TABLE 6

| IONIC LIQUID No. | STRUCTURAL FORMULA | R₂ | R₃ | R₄ | CATHODE ACTIVE MATERIAL: LiFePO₄ | | CATHODE ACTIVE MATERIAL: LiMnPO₄ | | CATHODE ACTIVE MATERIAL: LiCoO₂ | |
|---|---|---|---|---|---|---|---|---|---|---|
| | | | | | DISCHARGE CAPACITY (mAh/g) | COULUMBIC EFFICIENCY | DISCHARGE CAPACITY | COULUMBIC EFFICIENCY | DISCHARGE CAPACITY | COULUMBIC EFFICIENCY |
| 4-1 | (imidazolium structure with R₂, R₃, R₄) | $CH_3O(CH_2)_2$ | $CH_3$ | $CH_3O(CH_2)_2$ | 85 | A | 110 | B | 45 | C |
| 4-2 | | $CH_3O(CH_2)_2$ | $CH_3$ | $CH_3O(CH_2)_2$ | 85 | A | 110 | B | 45 | C |
| 4-3 | | $CH_3CH_2O(CH_2)_2$ | $CH_3$ | $CH_3CH_2O(CH_2)_2$ | 85 | A | 110 | B | 45 | C |
| 4-4 | | $CH_3CH_2O(CH_2)_2$ | $CH_3$ | $CH_3O(CH_2)_3$ | 80 | A | 100 | B | 40 | C |
| 4-5 | | $CH_3O(CH_2)_2$ | $CH_3CH_2$ | $CH_3O(CH_2)_2$ | 90 | A | 120 | B | 45 | C |
| 4-6 | | $CH_3O(CH_2)_2$ | $CH_3CH_2$ | $CH_3CH_2O(CH_2)_2$ | 90 | A | 120 | B | 45 | C |
| 4-7 | | $CH_3O(CH_2)_2$ | $CH_3CH_2$ | $CH_3O(CH_2)_3$ | 85 | A | 110 | B | 40 | C |
| 4-8 | | $CH_3CH_2O(CH_2)_2$ | $CH_3CH_2$ | $CH_3CH_2O(CH_2)_2$ | 90 | A | 120 | B | 45 | C |
| 4-9 | | $CH_3CH_2O(CH_2)_2$ | $CH_3CH_2$ | $CH_3O(CH_2)_3$ | 90 | A | 120 | B | 45 | C |

According to the results of Tables 3-6, in the case of using, as the electrolyte solvents, the ionic liquids (ionic liquids [1-1], [1-2], [1-4]-[1-9], [2-1]-[2-7], [3-1]-[3-6], [4-1]-[4-9]) which include ammonium ions each containing two or more alkoxyalkyl groups as substituent groups, excellent discharge capacity and coulombic efficiency were obtained, in comparison with the case of using, as the electrolyte solvents, the ionic liquids (ionic liquids [1-3], [1-10]) which include ammonium ions each containing one(1) alkoxyalkyl group as substituent group.

Moreover, it was recognized that in the case of using lithium oxo acid salt (LiFePO₄, LiMnPO₄) as the cathode active material, especially remarkable effects were obtained in the discharge capacity and coulombic efficiency.

Furthermore, also in the case of using another lithium oxo acid salt (Li₂FeSiO₄, Li₂MnSiO₄), excellent effects were obtained.

INDUSTRIAL APPLICABILITY

The present invention can be applied to the field of lithium ion secondary batteries.

The invention claimed is:

1. A lithium ion secondary battery comprising:
   a cathode material;
   an anode material;
   a separator; and
   an electrolyte solution, wherein
   the cathode material includes lithium oxo acid salt, and the electrolyte solution includes an electrolyte solvent which contains an ammonium ion including two or more alkoxyalkyl groups as substituent groups, and
   each of the alkoxyalkyl groups includes a terminal alkyl group which contains one or two carbons and an alkylene group which contains two carbons and is combined with N.

2. The lithium ion secondary battery according to claim 1, wherein the lithium oxo acid salt is one kind of LiFePO₄, LiMnPO₄, Li₂FeSiO₄, and Li₂MnSiO₄.

3. The lithium ion secondary battery according to claim 1, wherein the ammonium ion is represented by the following general formula (1).

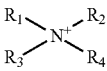

(1)

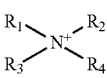

(1)

wherein substituent group R₁ represents an alkyl group including one or more and five or less carbons, or an alkoxyalkyl group including two or more and four or less carbons; substituent group R₂ represents an alkyl group including one or more and five or less carbons, or an alkoxyalkyl group including two or more and four or less carbons; and substituent groups R₃ and R₄ represent the alkoxyalkyl groups including the terminal alkyl group which contains one or two carbons and the alkylene group which contains two carbons and is combined with N.

4. The lithium ion secondary battery according to claim 1, wherein the ammonium ion is represented by the following general formula (2)

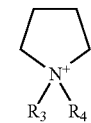

(2)

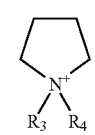

(2)

wherein substituent groups R₃ and R₄ represent the alkoxyalkyl groups.

5. The lithium ion secondary battery according to claim 1, wherein the ammonium ion is represented by the following general formula (3)

(3)

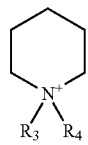

(3)

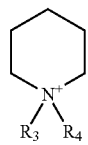

wherein substituent groups $R_3$ and $R_4$ represent the alkoxyalkyl groups.

6. The lithium ion secondary battery according to claim 1, wherein the ammonium ion is represented by the following general formula (4)

(4)

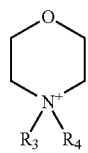

(4)

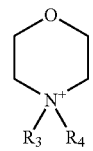

wherein substituent groups $R_3$ and $R_4$ represent the alkoxyalkyl groups.

7. The lithium ion secondary battery according to claim 3, wherein substituent group $R_2$ is an alkoxyalkyl group including three or four carbons.

8. The lithium ion secondary battery according to claim 7, wherein
substituent group $R_1$ is a methoxyethyl group, a methoxypropyl group, an ethoxyethyl group, or an alkyl group including two or more and five or less carbons,
substituent group $R_2$ is a methoxyethyl group or an ethoxyethyl group, and
each of substituent groups $R_3$ and $R_4$ is a methoxyethyl group.

9. The lithium ion secondary battery according to claim 3, wherein
substituent group $R_1$ is a methyl group or an ethyl group,
substituent group $R_2$ is an ethyl group or a butyl group,
substituent group $R_3$ is a methoxyethyl group, and
substituent group $R_4$ is a methoxyethyl group or an ethoxyethyl group.

\* \* \* \* \*